United States Patent
LePoudre

(10) Patent No.: US 11,892,193 B2
(45) Date of Patent: Feb. 6, 2024

(54) DESICCANT ENHANCED EVAPORATIVE COOLING SYSTEMS AND METHODS

(71) Applicant: Nortek Air Solutions Canada, Inc., Saskatoon (CA)

(72) Inventor: Philip Paul LePoudre, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 278 days.

(21) Appl. No.: 16/606,708

(22) PCT Filed: Apr. 18, 2017

(86) PCT No.: PCT/CA2017/050479
§ 371 (c)(1),
(2) Date: Oct. 18, 2019

(87) PCT Pub. No.: WO2018/191806
PCT Pub. Date: Oct. 25, 2018

(65) Prior Publication Data
US 2020/0096212 A1 Mar. 26, 2020

(51) Int. Cl.
*F24F 5/00* (2006.01)
*F24F 11/81* (2018.01)
(Continued)

(52) U.S. Cl.
CPC ............ *F24F 5/0035* (2013.01); *F24F 3/147* (2013.01); *F24F 3/1417* (2013.01);
(Continued)

(58) Field of Classification Search
CPC ........ F24F 5/0035; F24F 11/81; F24F 3/1417; F24F 3/1429; F24F 3/147; F24F 5/0014;
(Continued)

(56) References Cited

U.S. PATENT DOCUMENTS

| 1,015,831 A | 1/1912 | Pielock et al. |
| 2,186,844 A | 1/1940 | Smith |

(Continued)

FOREIGN PATENT DOCUMENTS

| AU | 2011286700 A1 | 12/2012 |
| AU | 2011268661 A1 | 1/2013 |

(Continued)

OTHER PUBLICATIONS

US 10,739,032 B2, 08/2020, LePoudre et al. (withdrawn)

(Continued)

*Primary Examiner* — Schyler S Sanks
(74) *Attorney, Agent, or Firm* — Schwegman Lundberg & Woessner, P.A.

(57) ABSTRACT

Disclosed are systems and methods for conditioning air using a liquid-to-air membrane energy exchanger (LAMEE) as a pre-dryer, in combination with a direct evaporative cooler (DEC). The LAMEE and DEC can be arranged inside a process plenum configured to receive and condition air for delivery to an enclosed space. The LAMEE can circulate a liquid desiccant to remove moisture from the air, before passing the air through the DEC. As a result, the DEC can cool the air to lower temperatures and improve overall efficiency. In an example, a regeneration system can regenerate at least some of the liquid desiccant prior to recirculation through the LAMEE. In an example, the DEC can use removed water recovered in regeneration as make up water for the DEC. In an example, a liquid to air or liquid to liquid heat exchanger can cool the liquid desiccant, prior to recirculation through the LAMEE.

23 Claims, 7 Drawing Sheets

(51) Int. Cl.
*F24F 3/14* (2006.01)
*F24F 3/147* (2006.01)
*F24F 6/02* (2006.01)
*F24F 11/00* (2018.01)
*F24F 110/20* (2018.01)

(52) U.S. Cl.
CPC .......... *F24F 3/1429* (2013.01); *F24F 5/0014* (2013.01); *F24F 6/02* (2013.01); *F24F 11/0001* (2013.01); *F24F 11/81* (2018.01); *F24F 2003/1435* (2013.01); *F24F 2110/20* (2018.01)

(58) Field of Classification Search
CPC ...... F24F 6/02; F24F 11/0001; F24F 2110/20; F24F 2003/1435
See application file for complete search history.

(56) References Cited

U.S. PATENT DOCUMENTS

| | | |
|---|---|---|
| 2,290,465 A | 7/1942 | Crawford et al. |
| 2,562,811 A | 7/1951 | Muffly |
| 2,852,090 A | 9/1958 | Kelley |
| 2,946,201 A | 7/1960 | Munters |
| 2,968,165 A | 1/1961 | Gunnar |
| 3,009,684 A | 11/1961 | Georg |
| 3,018,231 A | 1/1962 | Valentine et al. |
| 3,144,901 A | 8/1964 | Meek |
| 3,247,679 A | 4/1966 | Gershon |
| 3,291,206 A | 12/1966 | Peter |
| 3,401,530 A | 9/1968 | Gershon |
| 3,467,072 A | 9/1969 | Toesca |
| 3,735,559 A | 5/1973 | Salemme |
| 4,011,731 A | 3/1977 | Meckler |
| 4,113,004 A | 9/1978 | Rush et al. |
| 4,171,620 A | 10/1979 | Turner |
| 4,180,985 A | 1/1980 | Northrup, Jr. |
| 4,233,796 A | 11/1980 | Mazzoni et al. |
| 4,235,081 A | 11/1980 | Dowling |
| 4,257,169 A | 3/1981 | Pierce |
| 4,259,849 A | 4/1981 | Griffiths |
| 4,373,347 A | 2/1983 | Howell et al. |
| 4,380,910 A | 4/1983 | Hood et al. |
| 4,430,864 A | 2/1984 | Mathiprakasam |
| 4,434,845 A | 3/1984 | Steeb |
| 4,474,021 A | 10/1984 | Harband |
| 4,532,347 A | 7/1985 | Vaughan |
| 4,538,426 A | 9/1985 | Bock |
| 4,594,860 A | 6/1986 | Coellner et al. |
| 4,691,530 A | 9/1987 | Meckler |
| 4,700,550 A | 10/1987 | Rhodes |
| 4,719,761 A | 1/1988 | Cromer |
| 4,723,417 A | 2/1988 | Meckler |
| 4,729,428 A | 3/1988 | Yasutake et al. |
| 4,729,774 A | 3/1988 | Cohen et al. |
| 4,805,317 A * | 2/1989 | Inglis ................... B01D 53/261 34/259 |
| 4,841,733 A | 6/1989 | Dussault et al. |
| 4,887,438 A | 12/1989 | Meckler |
| 4,900,448 A | 2/1990 | Bonne et al. |
| 4,905,479 A | 3/1990 | Wilkinson |
| 4,909,810 A | 3/1990 | Nakao et al. |
| 4,930,322 A | 6/1990 | Ashley et al. |
| 4,936,107 A | 6/1990 | Kitagaki et al. |
| 4,939,906 A | 7/1990 | Spatz et al. |
| 4,941,324 A | 7/1990 | Peterson et al. |
| 4,982,575 A | 1/1991 | Besik |
| 5,003,961 A | 4/1991 | Besik |
| 5,020,334 A | 6/1991 | Wilkinson |
| 5,020,335 A | 6/1991 | Albers et al. |
| 5,022,241 A | 6/1991 | Wilkinson |
| 5,120,445 A | 6/1992 | Colman |
| 5,131,238 A | 7/1992 | Meckler |
| 5,148,374 A | 9/1992 | Coellner |
| 5,170,633 A | 12/1992 | Kaplan |
| 5,176,005 A | 1/1993 | Kaplan |
| 5,181,387 A | 1/1993 | Meckler |
| 5,191,771 A | 3/1993 | Meckler |
| 5,203,161 A | 4/1993 | Lehto |
| 5,206,002 A | 4/1993 | Skelley et al. |
| 5,297,398 A | 3/1994 | Meckler |
| 5,311,929 A | 5/1994 | Verret |
| 5,325,676 A | 7/1994 | Meckler |
| 5,337,574 A | 8/1994 | Dick |
| 5,351,497 A | 10/1994 | Lowenstein |
| 5,353,606 A | 10/1994 | Yoho et al. |
| 5,373,704 A | 12/1994 | Mcfadden |
| 5,387,376 A | 2/1995 | Gasser |
| 5,448,895 A | 9/1995 | Coellner et al. |
| 5,460,004 A | 10/1995 | Tsimerman |
| 5,471,852 A | 12/1995 | Meckler |
| 5,482,625 A | 1/1996 | Shimizu et al. |
| 5,496,397 A | 3/1996 | Fischer et al. |
| 5,502,975 A | 4/1996 | Brickley et al. |
| 5,517,828 A | 5/1996 | Calton et al. |
| 5,526,651 A | 6/1996 | Worek et al. |
| 5,536,405 A | 7/1996 | Myrna et al. |
| 5,542,968 A | 8/1996 | Belding et al. |
| 5,551,245 A | 9/1996 | Calton et al. |
| 5,564,281 A | 10/1996 | Calton et al. |
| 5,579,647 A | 12/1996 | Calton et al. |
| 5,580,369 A | 12/1996 | Belding et al. |
| 5,632,954 A | 5/1997 | Coellner et al. |
| 5,638,900 A | 6/1997 | Lowenstein et al. |
| 5,649,428 A | 7/1997 | Calton et al. |
| 5,650,221 A | 7/1997 | Belding et al. |
| 5,653,115 A | 8/1997 | Brickley et al. |
| 5,660,048 A * | 8/1997 | Belding ................ F24F 5/0035 62/94 |
| 5,661,983 A | 9/1997 | Groten et al. |
| 5,685,897 A | 11/1997 | Belding et al. |
| 5,701,762 A | 12/1997 | Akamatsu et al. |
| 5,718,286 A | 2/1998 | Damsohn et al. |
| 5,727,394 A | 3/1998 | Belding et al. |
| 5,732,562 A | 3/1998 | Moratalla |
| 5,749,230 A | 5/1998 | Coellner et al. |
| 5,758,508 A | 6/1998 | Belding et al. |
| 5,758,511 A | 6/1998 | Yoho et al. |
| 5,761,915 A | 6/1998 | Rao |
| 5,761,923 A | 6/1998 | Maeda |
| 5,791,153 A | 8/1998 | Belding et al. |
| 5,791,157 A | 8/1998 | Maeda |
| 5,816,065 A | 10/1998 | Maeda |
| 5,825,641 A | 10/1998 | Mangtani |
| 5,826,434 A | 10/1998 | Belding et al. |
| 5,826,641 A | 10/1998 | Bierwirth et al. |
| 5,832,736 A | 11/1998 | Yoshioka et al. |
| 5,860,284 A | 1/1999 | Goland et al. |
| 5,890,372 A | 4/1999 | Belding et al. |
| 5,911,273 A | 6/1999 | Brenner et al. |
| 5,931,016 A | 8/1999 | Yoho |
| 5,943,874 A | 8/1999 | Maeda |
| 5,946,931 A | 9/1999 | Lomax et al. |
| 5,950,447 A | 9/1999 | Maeda et al. |
| 5,992,160 A | 11/1999 | Bussjager et al. |
| 6,003,327 A | 12/1999 | Belding et al. |
| 6,018,953 A | 2/2000 | Belding et al. |
| 6,018,954 A | 2/2000 | Assaf |
| 6,029,462 A | 2/2000 | Denniston |
| 6,029,467 A | 2/2000 | Moratalla |
| 6,050,100 A | 4/2000 | Belding et al. |
| 6,079,481 A | 6/2000 | Lowenstein et al. |
| 6,094,835 A | 8/2000 | Cromer |
| 6,138,470 A | 10/2000 | Potnis et al. |
| 6,141,979 A | 11/2000 | Dunlap |
| 6,145,588 A | 11/2000 | Martin et al. |
| 6,156,102 A | 12/2000 | Conrad et al. |
| 6,176,101 B1 | 1/2001 | Lowenstein |
| 6,176,305 B1 | 1/2001 | Haglid |
| 6,178,762 B1 | 1/2001 | Flax |
| 6,199,388 B1 | 3/2001 | Fischer |
| 6,199,392 B1 | 3/2001 | Maeda |
| 6,237,354 B1 | 5/2001 | Cromer |

(56) References Cited

U.S. PATENT DOCUMENTS

| | | |
|---|---|---|
| 6,269,650 B1 | 8/2001 | Shaw |
| 6,318,106 B1 | 11/2001 | Maeda |
| RE37,464 E | 12/2001 | Meckler |
| 6,363,218 B1 | 3/2002 | Lowenstein et al. |
| 6,412,295 B2 | 7/2002 | Weiss et al. |
| 6,442,951 B1 | 9/2002 | Maeda et al. |
| 6,494,053 B1 | 12/2002 | Forkosh |
| 6,497,107 B2 | 12/2002 | Maisotsenko et al. |
| 6,532,763 B1 | 3/2003 | Gupte |
| 6,546,746 B2 | 4/2003 | Forkosh et al. |
| 6,568,466 B2 | 5/2003 | Lowenstein et al. |
| 6,575,228 B1 | 6/2003 | Ragland et al. |
| 6,598,862 B2 | 7/2003 | Merrill et al. |
| 6,635,104 B2 | 10/2003 | Komkova et al. |
| 6,644,059 B2 | 11/2003 | Maeda et al. |
| 6,684,649 B1 | 2/2004 | Thompson |
| 6,709,492 B1 | 3/2004 | Spadaccini et al. |
| 6,720,990 B1 | 4/2004 | Walker et al. |
| 6,739,142 B2 | 5/2004 | Korin |
| 6,745,826 B2 | 6/2004 | Lowenstein et al. |
| 6,751,964 B2 | 6/2004 | Fischer |
| 6,800,118 B2 | 10/2004 | Kusunose et al. |
| 6,841,601 B2 | 1/2005 | Serpico et al. |
| 6,848,265 B2 | 2/2005 | Lowenstein et al. |
| 6,854,278 B2 | 2/2005 | Maisotsenko et al. |
| 6,864,005 B2 | 3/2005 | Mossman |
| 6,935,416 B1 | 8/2005 | Tsunoda et al. |
| 6,973,795 B1 | 12/2005 | Moffitt |
| 6,976,365 B2 | 12/2005 | Forkosh et al. |
| 6,978,633 B2 | 12/2005 | Yamazaki |
| 7,000,427 B2 | 2/2006 | Mathias et al. |
| 7,017,356 B2 | 3/2006 | Moffitt |
| 7,092,006 B2 | 8/2006 | Walker et al. |
| 7,093,452 B2 | 8/2006 | Chee et al. |
| 7,093,649 B2 | 8/2006 | Dawson |
| RE39,288 E | 9/2006 | Assaf |
| 7,178,355 B2 | 2/2007 | Moffitt |
| 7,181,918 B2 | 2/2007 | Reinders et al. |
| 7,231,967 B2 | 6/2007 | Haglid |
| 7,251,945 B2 | 8/2007 | Tongue |
| 7,269,966 B2 | 9/2007 | Lowenstein et al. |
| 7,306,650 B2 | 12/2007 | Slayzak et al. |
| 7,331,376 B2 | 2/2008 | Gagnon et al. |
| 7,340,906 B2 | 3/2008 | Moffitt |
| 7,389,646 B2 | 6/2008 | Moffitt |
| 7,389,652 B1 | 6/2008 | Fair |
| 7,593,033 B2 | 9/2009 | Walker et al. |
| 7,601,208 B2 | 10/2009 | Tongue |
| 7,602,414 B2 | 10/2009 | Walker et al. |
| 7,605,840 B2 | 10/2009 | Walker et al. |
| 7,717,404 B2 | 5/2010 | Hasegawa et al. |
| 7,719,565 B2 | 5/2010 | Walker et al. |
| 7,737,224 B2 | 6/2010 | Willis et al. |
| 7,753,991 B2 | 7/2010 | Kertzman |
| 7,781,034 B2 | 8/2010 | Yializis et al. |
| 7,817,182 B2 | 10/2010 | Walker et al. |
| D638,925 S | 5/2011 | Charlebois et al. |
| 7,942,387 B2 | 5/2011 | Forkosh |
| 7,966,841 B2 | 6/2011 | Lowenstein et al. |
| 8,002,023 B2 | 8/2011 | Murayama |
| 8,033,532 B2 | 10/2011 | Yabu |
| 3,047,511 A1 | 11/2011 | Miyauchi et al. |
| 8,137,436 B2 | 3/2012 | Calis et al. |
| 8,141,379 B2 | 3/2012 | Al-hadhrami et al. |
| 8,157,891 B2 | 4/2012 | Montie et al. |
| 8,318,824 B2 | 11/2012 | Matsuoka et al. |
| 8,469,782 B1 | 6/2013 | Roy |
| 8,470,071 B2 | 6/2013 | Ehrenberg et al. |
| 8,511,074 B2 | 8/2013 | Kuehnel et al. |
| 8,550,151 B2 | 10/2013 | Murayama et al. |
| 8,685,142 B2 | 4/2014 | Claridge et al. |
| 8,769,971 B2 | 7/2014 | Kozubal et al. |
| 8,783,053 B2 | 7/2014 | McCann |
| 8,887,523 B2 | 11/2014 | Gommed et al. |
| 8,899,061 B2 | 12/2014 | Reytblat |
| 8,915,092 B2 | 12/2014 | Gerber et al. |
| 8,920,699 B2 | 12/2014 | Marutani et al. |
| 8,943,848 B2 | 2/2015 | Phannavong et al. |
| 8,966,924 B2 | 3/2015 | Pichai |
| 9,021,821 B2 | 5/2015 | Dunnavant |
| 9,027,764 B2 | 5/2015 | Murutani et al. |
| 9,109,808 B2 | 8/2015 | Gerber et al. |
| 9,140,460 B2 | 9/2015 | Woods et al. |
| 9,146,040 B2 | 9/2015 | DeValve |
| 9,188,349 B2 | 11/2015 | Warmerdam et al. |
| 9,234,665 B2 | 1/2016 | Erb et al. |
| 9,243,810 B2 | 1/2016 | Vandermeulen et al. |
| 9,273,877 B2 | 3/2016 | Vandermeulen |
| 9,377,207 B2 | 6/2016 | Vandermeulen et al. |
| 9,423,140 B2 | 8/2016 | Betts et al. |
| 9,429,332 B2 | 8/2016 | Vandermeulen et al. |
| 9,429,366 B2 | 8/2016 | Dubois |
| 9,664,452 B2 | 5/2017 | Takada et al. |
| 9,810,439 B2 | 11/2017 | Coutu et al. |
| 9,816,760 B2 | 11/2017 | LePoudre et al. |
| 9,909,768 B2 | 3/2018 | Gerber et al. |
| 10,197,310 B2 | 2/2019 | Ghadiri Moghaddam et al. |
| 10,302,317 B2 | 5/2019 | Besant et al. |
| 10,352,628 B2 | 7/2019 | Erb et al. |
| 10,480,801 B2 | 11/2019 | Gerber et al. |
| 10,584,884 B2 | 3/2020 | Coutu et al. |
| 10,712,024 B2 | 7/2020 | LePoudre et al. |
| 10,782,045 B2 | 9/2020 | LePoudre et al. |
| 10,808,951 B2 | 10/2020 | LePoudre et al. |
| 10,928,082 B2 | 2/2021 | Coutu et al. |
| 10,962,252 B2 | 3/2021 | LePoudre et al. |
| 11,035,618 B2 | 6/2021 | Lepoudre et al. |
| 11,092,349 B2 | 8/2021 | Lepoudre et al. |
| 11,143,430 B2 | 10/2021 | Ghadiri Moghaddam et al. |
| 11,300,364 B2 | 4/2022 | Erb et al. |
| 11,408,681 B2 | 8/2022 | Lepoudre |
| 2001/0003902 A1 | 6/2001 | Kopko |
| 2002/0005271 A1 | 1/2002 | Weiss et al. |
| 2002/0038552 A1 | 4/2002 | Maisotsenko |
| 2002/0074105 A1 | 6/2002 | Hayashi et al. |
| 2002/0158023 A1 | 10/2002 | Wurzburger |
| 2002/0161254 A1 | 10/2002 | Schattenmann |
| 2003/0014983 A1 | 1/2003 | Maisotsenko et al. |
| 2003/0037905 A1 | 2/2003 | Weng |
| 2003/0070787 A1 | 4/2003 | Moffitt |
| 2003/0121271 A1 | 7/2003 | Dinnage et al. |
| 2003/0132166 A1 | 7/2003 | Rey |
| 2004/0000152 A1 | 1/2004 | Fischer |
| 2004/0055329 A1 | 3/2004 | Mathias et al. |
| 2004/0061245 A1 | 4/2004 | Maisotsenko et al. |
| 2004/0134211 A1 | 7/2004 | Lee et al. |
| 2004/0134212 A1 | 7/2004 | Lee et al. |
| 2004/0168462 A1 | 9/2004 | Assaf |
| 2004/0226685 A1 | 11/2004 | Gagnon et al. |
| 2005/0056042 A1 | 3/2005 | Bourne et al. |
| 2005/0072303 A1 | 4/2005 | Weidenmann |
| 2005/0132738 A1* | 6/2005 | Bourne ............... F24F 1/0059 62/310 |
| 2005/0230080 A1 | 10/2005 | Paul et al. |
| 2005/0249901 A1 | 11/2005 | Yializis et al. |
| 2005/0262862 A1 | 12/2005 | Moffitt |
| 2005/0279115 A1 | 12/2005 | Lee et al. |
| 2006/0021615 A1 | 2/2006 | Kertzman |
| 2006/0032258 A1 | 2/2006 | Pruitt et al. |
| 2006/0042295 A1 | 3/2006 | Assaf |
| 2006/0118979 A1 | 6/2006 | Beck et al. |
| 2006/0205301 A1 | 9/2006 | Klare et al. |
| 2007/0029685 A1 | 2/2007 | Lin |
| 2007/0056894 A1 | 3/2007 | Connors, Jr. |
| 2007/0068663 A1 | 3/2007 | Thomer et al. |
| 2007/0095519 A1 | 5/2007 | Hombucher |
| 2007/0234743 A1 | 10/2007 | Assaf |
| 2007/0279861 A1 | 12/2007 | Doll et al. |
| 2008/0023182 A1 | 1/2008 | Beamer et al. |
| 2008/0066888 A1 | 3/2008 | Tong et al. |
| 2008/0085437 A1 | 4/2008 | Dean et al. |
| 2008/0099184 A1 | 5/2008 | Han |
| 2008/0283217 A1 | 11/2008 | Gagnon et al. |
| 2009/0071638 A1 | 3/2009 | Sugiyama et al. |

(56) References Cited

U.S. PATENT DOCUMENTS

| | | |
|---|---|---|
| 2009/0095162 A1 | 4/2009 | Hargis et al. |
| 2009/0126913 A1 | 5/2009 | Lee et al. |
| 2009/0133866 A1 | 5/2009 | Campbell et al. |
| 2009/0193974 A1 | 8/2009 | Montie et al. |
| 2009/0211977 A1 | 8/2009 | Miller |
| 2009/0294110 A1 | 12/2009 | Foust |
| 2009/0324929 A1 | 12/2009 | Yamakawa et al. |
| 2010/0055276 A1 | 3/2010 | Chen |
| 2010/0058778 A1* | 3/2010 | Bhatti .................. F24F 5/0035 62/3.7 |
| 2010/0090356 A1 | 4/2010 | Sines et al. |
| 2010/0170655 A1 | 7/2010 | Kronvall et al. |
| 2010/0170776 A1 | 7/2010 | Ehrenberg et al. |
| 2010/0181062 A1 | 7/2010 | Mccann |
| 2010/0192605 A1 | 8/2010 | Fang et al. |
| 2010/0200068 A1 | 8/2010 | D'arcy et al. |
| 2010/0275629 A1 | 11/2010 | Erickson |
| 2010/0300123 A1 | 12/2010 | Park et al. |
| 2010/0319370 A1 | 12/2010 | Kozubal et al. |
| 2010/0326914 A1 | 12/2010 | Drost et al. |
| 2011/0056384 A1 | 3/2011 | Kadota |
| 2011/0101549 A1 | 5/2011 | Miyauchi et al. |
| 2011/0138832 A1* | 6/2011 | Al-Hadhrami ........ F24F 5/0035 62/235.1 |
| 2011/0192579 A1 | 8/2011 | Sotokawa et al. |
| 2011/0223486 A1 | 9/2011 | Zhang et al. |
| 2011/0232485 A1 | 9/2011 | Ellsworth |
| 2011/0232633 A1 | 9/2011 | Lima |
| 2011/0259572 A1 | 10/2011 | Muratani et al. |
| 2011/0283720 A1 | 11/2011 | Martin |
| 2011/0308265 A1 | 12/2011 | Phannavong et al. |
| 2012/0000227 A1 | 1/2012 | Matsuura et al. |
| 2012/0016700 A1 | 1/2012 | Jabbour et al. |
| 2012/0023988 A1 | 2/2012 | Togano et al. |
| 2012/0031133 A1 | 2/2012 | Kuwabara et al. |
| 2012/0061045 A1 | 3/2012 | Huizing |
| 2012/0073791 A1 | 3/2012 | Dubois |
| 2012/0085112 A1 | 4/2012 | Wintemute |
| 2012/0106073 A1 | 5/2012 | Wu et al. |
| 2012/0125020 A1 | 5/2012 | Vandermeulen et al. |
| 2012/0125021 A1 | 5/2012 | Vandermeulen et al. |
| 2012/0125023 A1 | 5/2012 | Kopko et al. |
| 2012/0125031 A1 | 5/2012 | Vandermeulen et al. |
| 2012/0125405 A1 | 5/2012 | Vandermeulen et al. |
| 2012/0125581 A1 | 5/2012 | Allen et al. |
| 2012/0131934 A1 | 5/2012 | Vandermeulen et al. |
| 2012/0131937 A1 | 5/2012 | Vandermeulen et al. |
| 2012/0131938 A1 | 5/2012 | Vandermeulen et al. |
| 2012/0131939 A1 | 5/2012 | Vandermeulen et al. |
| 2012/0131940 A1 | 5/2012 | Vandermeulen et al. |
| 2012/0132513 A1 | 5/2012 | Vandermeulen et al. |
| 2012/0162918 A1 | 6/2012 | Thyni et al. |
| 2012/0167600 A1 | 7/2012 | Dunnavant |
| 2012/0168369 A1 | 7/2012 | Van Medevoort et al. |
| 2012/0180505 A1 | 7/2012 | Gerber et al. |
| 2012/0186281 A1 | 7/2012 | Vandermeulen et al. |
| 2012/0247132 A1 | 10/2012 | Lakdawala et al. |
| 2012/0298340 A1 | 11/2012 | Al-Otaibi |
| 2013/0056177 A1* | 3/2013 | Coutu .................. F28D 19/042 165/96 |
| 2013/0075066 A1 | 3/2013 | Reytblat |
| 2013/0186121 A1 | 7/2013 | Erb et al. |
| 2013/0199220 A1 | 8/2013 | Ma et al. |
| 2013/0240438 A1 | 9/2013 | Willis et al. |
| 2013/0244046 A1* | 9/2013 | Yaegar .................. C08L 33/10 428/473.5 |
| 2013/0248147 A1 | 9/2013 | Wintemute et al. |
| 2013/0283837 A1 | 10/2013 | Takahashi et al. |
| 2013/0340449 A1 | 12/2013 | Kozubal et al. |
| 2014/0054004 A1 | 2/2014 | LePoudre et al. |
| 2014/0054013 A1 | 2/2014 | Lepoudre et al. |
| 2014/0069134 A1 | 3/2014 | Grabon |
| 2014/0083648 A1 | 3/2014 | Wawryk |
| 2014/0125060 A1 | 5/2014 | Sahm |
| 2014/0150481 A1 | 6/2014 | Vandermeulen |
| 2014/0190037 A1 | 7/2014 | Erb et al. |
| 2014/0190198 A1 | 7/2014 | Slessman et al. |
| 2014/0223947 A1 | 8/2014 | Ranjan et al. |
| 2014/0242900 A1 | 8/2014 | Takada et al. |
| 2014/0138851 A1 | 9/2014 | LePoudre |
| 2014/0245769 A1 | 9/2014 | Vandermeulen et al. |
| 2014/0250935 A1 | 9/2014 | Prochaska et al. |
| 2014/0260367 A1 | 9/2014 | Coutu et al. |
| 2014/0260369 A1 | 9/2014 | Lepoudre et al. |
| 2014/0260373 A1 | 9/2014 | Gerber et al. |
| 2014/0260399 A1 | 9/2014 | Vandermeulen |
| 2014/0262125 A1 | 9/2014 | Erb et al. |
| 2014/0262144 A1 | 9/2014 | Erb et al. |
| 2014/0326433 A1 | 11/2014 | Kozubal |
| 2014/0340842 A1 | 11/2014 | Towner et al. |
| 2015/0068225 A1 | 3/2015 | Laughman et al. |
| 2015/0096714 A1 | 4/2015 | Dagley |
| 2015/0184876 A1 | 7/2015 | Vandermeulen et al. |
| 2015/0233588 A1 | 8/2015 | Betts et al. |
| 2015/0253018 A1 | 9/2015 | Eguchi et al. |
| 2015/0292754 A1 | 10/2015 | Mongar |
| 2015/0323203 A1 | 11/2015 | Gerber et al. |
| 2016/0054012 A1* | 2/2016 | LePoudre ............... F24F 3/147 62/92 |
| 2016/0084512 A1 | 3/2016 | Erb et al. |
| 2016/0187010 A1 | 6/2016 | Vandermeulen |
| 2016/0209087 A1 | 7/2016 | Reytblat et al. |
| 2016/0290666 A1 | 10/2016 | Coutu et al. |
| 2016/0298865 A1 | 10/2016 | Gerber et al. |
| 2016/0327345 A1 | 11/2016 | Lowenstein |
| 2017/0241655 A1 | 8/2017 | Lepoudre et al. |
| 2018/0073753 A1 | 3/2018 | Lepoudre et al. |
| 2018/0128510 A1 | 5/2018 | Lepoudre et al. |
| 2018/0135880 A1 | 5/2018 | Ghadiri Moghaddam et al. |
| 2018/0187918 A1 | 7/2018 | Lepoudre et al. |
| 2019/0113247 A1 | 4/2019 | Lepoudre et al. |
| 2019/0212020 A1 | 7/2019 | Besant et al. |
| 2019/0346212 A1 | 11/2019 | Norman Erb et al. |
| 2020/0063995 A1 | 2/2020 | Lepoudre |
| 2020/0173672 A1 | 6/2020 | Coutu et al. |
| 2021/0231384 A1 | 7/2021 | Lepoudre et al. |
| 2021/0239333 A1 | 8/2021 | Lepoudre et al. |
| 2021/0332993 A1 | 10/2021 | Coutu et al. |
| 2021/0396422 A1 | 12/2021 | Ghadiri Moghaddam et al. |
| 2022/0003436 A1 | 1/2022 | Besant et al. |
| 2022/0003437 A1 | 1/2022 | Lepoudre et al. |
| 2022/0333868 A1 | 10/2022 | Lepoudre |
| 2022/0333869 A1 | 10/2022 | Lepoudre |

FOREIGN PATENT DOCUMENTS

| | | |
|---|---|---|
| AU | 2014231672 B2 | 3/2018 |
| AU | 2015230799 B2 | 3/2018 |
| AU | 2013305427 B2 | 4/2018 |
| AU | 2014231681 B2 | 6/2018 |
| AU | 2013305428 B2 | 9/2018 |
| AU | 2014231668 B2 | 2/2019 |
| AU | 2014231667 B2 | 6/2019 |
| AU | 2017204552 B2 | 7/2019 |
| AU | 2018236791 B2 | 10/2020 |
| AU | 2018204774 B2 | 11/2020 |
| CA | 2283089 A1 | 11/2000 |
| CA | 122381 | 5/2009 |
| CA | 2801352 A1 | 12/2011 |
| CA | 2798928 A1 | 2/2012 |
| CA | 2843763 A1 | 3/2013 |
| CA | 2904224 A1 | 9/2014 |
| CA | 2901483 C | 4/2019 |
| CA | 2880353 C | 9/2020 |
| CA | 3034592 C | 2/2021 |
| CA | 2904224 C | 4/2022 |
| CA | 2901484 C | 7/2022 |
| CA | 2958480 C | 10/2022 |
| CH | 193732 A | 10/1937 |
| CN | 1163389 A | 10/1997 |
| CN | 1343292 A | 4/2002 |
| CN | 1456855 A | 11/2003 |
| CN | 1517610 A | 8/2004 |
| CN | 1518477 A | 8/2004 |

(56) References Cited

FOREIGN PATENT DOCUMENTS

| | | | |
|---|---|---|---|
| CN | 1666081 | A | 9/2005 |
| CN | 1711448 | A | 12/2005 |
| CN | 2821506 | Y | 9/2006 |
| CN | 101014807 | | 8/2007 |
| CN | 201203217 | Y | 10/2007 |
| CN | 2009588220 | Y | 10/2007 |
| CN | 101368754 | A | 2/2009 |
| CN | 101405559 | A | 4/2009 |
| CN | 101421580 | A | 4/2009 |
| CN | 101469090 | A | 7/2009 |
| CN | 101776406 | A | 7/2010 |
| CN | 101900385 | A | 12/2010 |
| CN | 101918777 | A | 12/2010 |
| CN | 102076401 | A | 5/2011 |
| CN | 201906567 | U | 7/2011 |
| CN | 102149979 | A | 8/2011 |
| CN | 102165268 | A | 8/2011 |
| CN | 102232015 | A | 11/2011 |
| CN | 102259570 | | 11/2011 |
| CN | 102345909 | | 2/2012 |
| CN | 102395419 | A | 3/2012 |
| CN | 202202899 | U | 4/2012 |
| CN | 102548727 | A | 7/2012 |
| CN | 102549361 | A | 7/2012 |
| CN | 102667350 | | 9/2012 |
| CN | 102713154 | A | 10/2012 |
| CN | 102721133 | | 10/2012 |
| CN | 102933931 | A | 2/2013 |
| CN | 102939397 | A | 2/2013 |
| CN | 103068246 | A | 4/2013 |
| CN | 103069246 | A | 4/2013 |
| CN | 103245018 | A | 8/2013 |
| CN | 203116208 | U | 8/2013 |
| CN | 103827595 | | 5/2014 |
| CN | 104024748 | | 9/2014 |
| CN | 104048434 | A | 9/2014 |
| CN | 203893703 | U | 10/2014 |
| CN | 104136855 | A | 11/2014 |
| CN | 104541122 | | 4/2015 |
| CN | 104583706 | A | 4/2015 |
| CN | 103261801 | B | 11/2015 |
| CN | 105121965 | | 12/2015 |
| CN | 105121989 | A | 12/2015 |
| CN | 105164474 | A | 12/2015 |
| CN | 105164484 | A | 12/2015 |
| CN | 105202795 | A | 12/2015 |
| CN | 105283715 | | 1/2016 |
| CN | 101512238 | A | 8/2016 |
| CN | 106170660 | | 11/2016 |
| CN | 106471315 | | 3/2017 |
| CN | 103827595 | B | 4/2017 |
| CN | 105164484 | B | 6/2017 |
| CN | 105121989 | B | 9/2017 |
| CN | 107249715 | A | 10/2017 |
| CN | 107300230 | A | 10/2017 |
| CN | 107560482 | A | 1/2018 |
| CN | 107850335 | A | 3/2018 |
| CN | 107923647 | A | 4/2018 |
| CN | 108027221 | A | 5/2018 |
| CN | 109028519 | A | 12/2018 |
| CN | 109073265 | A | 12/2018 |
| CN | 110345803 | A | 10/2019 |
| CN | 107300230 | B | 11/2019 |
| CN | 107560482 | B | 2/2020 |
| CN | 110753819 | | 2/2020 |
| CN | 110785615 | | 2/2020 |
| CN | 110809698 | | 2/2020 |
| CN | 107249715 | B | 11/2020 |
| CN | 107850335 | B | 2/2021 |
| CN | 108027221 | B | 3/2021 |
| CN | 110809698 | | 8/2021 |
| CN | 109073265 | B | 9/2021 |
| CN | 107923647 | B | 12/2021 |
| CN | 114935182 | A | 8/2022 |
| DE | 10143092 | A1 | 3/2003 |
| EP | 0448991 | A2 | 10/1991 |
| EP | 0661502 | A2 | 7/1995 |
| EP | 0678321 | A2 | 10/1995 |
| EP | 1108575 | A1 | 6/2001 |
| EP | 1347260 | A1 | 9/2003 |
| EP | 2351639 | A1 | 8/2011 |
| EP | 2397787 | A2 | 12/2011 |
| EP | 2751493 | B1 | 3/2018 |
| EP | 2893283 | B1 | 12/2018 |
| EP | 2972039 | B1 | 12/2018 |
| EP | 2971993 | B1 | 8/2019 |
| EP | 2971992 | B1 | 1/2020 |
| EP | 3421921 | B1 | 3/2020 |
| EP | 3183051 | B1 | 4/2020 |
| EP | 3486577 | B1 | 4/2020 |
| EP | 2972046 | B1 | 6/2020 |
| EP | 3499168 | B1 | 2/2021 |
| EP | 3314188 | A1 | 5/2021 |
| EP | 3314188 | B1 | 5/2021 |
| EP | 3295089 | B1 | 10/2021 |
| EP | 3295088 | B1 | 1/2022 |
| EP | 3612770 | B1 | 3/2023 |
| EP | 3612771 | B1 | 3/2023 |
| FR | 2291457 | A1 | 6/1976 |
| GB | 1354502 | A | 6/1974 |
| GB | 2015384 | A | 9/1979 |
| HK | 40009311 | A1 | 6/2020 |
| HK | 4009311 | B | 4/2021 |
| IN | 20171704489 | A | 3/2018 |
| IN | 201717044889 | A | 3/2018 |
| IN | 201817002765 | A | 4/2018 |
| IN | 201817037404 | A | 12/2018 |
| IN | 201917046207 | | 1/2020 |
| IN | 201917046210 | | 1/2020 |
| IN | 201917046215 | | 1/2020 |
| JP | 6152594 | A | 3/1986 |
| JP | 05157282 | A | 6/1993 |
| JP | H09113167 | A | 5/1997 |
| JP | 09196482 | A | 7/1997 |
| JP | 10170177 | A | 6/1998 |
| JP | 2004116419 | A | 4/2004 |
| JP | 2004257588 | A | 9/2004 |
| JP | 2008070046 | A | 3/2008 |
| JP | 2009275955 | A | 11/2009 |
| JP | 4870843 | B1 | 11/2011 |
| KR | 10607204 | B1 | 8/2006 |
| KR | 20110092773 | A | 8/2011 |
| KR | 101528640 | | 6/2015 |
| SG | 10201809840VA | | 12/2018 |
| SG | 11201807692V | | 2/2020 |
| SG | 10201913923WA | | 3/2020 |
| TW | I271499 | B | 1/2007 |
| WO | WO-9641107 | A1 | 12/1996 |
| WO | WO-1996041107 | A1 | 12/1996 |
| WO | WO-1999014535 | A1 | 3/1999 |
| WO | WO-0135039 | A1 | 5/2001 |
| WO | WO-0171260 | A1 | 9/2001 |
| WO | WO-0201132 | A2 | 1/2002 |
| WO | WO-03049835 | A1 | 6/2003 |
| WO | WO-2004065875 | A1 | 8/2004 |
| WO | WO-2005100243 | A1 | 10/2005 |
| WO | WO-2006037079 | A1 | 4/2008 |
| WO | WO-2008053357 | A2 | 5/2008 |
| WO | WO-2008089484 | A1 | 7/2008 |
| WO | WO-2009000974 | A1 | 12/2008 |
| WO | WO-2009094032 | A1 | 7/2009 |
| WO | WO-2009158030 | A1 | 12/2009 |
| WO | WO-2010006968 | A1 | 1/2010 |
| WO | WO-2011062808 | A1 | 5/2011 |
| WO | 2011161547 | | 12/2011 |
| WO | WO-2011150081 | A2 | 12/2011 |
| WO | WO-2011161547 | A3 | 12/2011 |
| WO | WO-2012018089 | A1 | 2/2012 |
| WO | WO-2012042553 | A1 | 4/2012 |
| WO | WO-2012050860 | A1 | 4/2012 |
| WO | WO-2012087273 | A1 | 6/2012 |
| WO | WO-2012097445 | A1 | 7/2012 |
| WO | WO 22012156366 | A1 | 12/2012 |
| WO | WO-2013029148 | A1 | 3/2013 |

(56) References Cited

FOREIGN PATENT DOCUMENTS

| WO | WO-2013094206 A1 | 6/2013 |
|---|---|---|
| WO | WO-2013107554 A1 | 7/2013 |
| WO | WO-2013192397 A1 | 12/2013 |
| WO | WO-2014029003 A1 | 2/2014 |
| WO | WO-2014029004 A1 | 2/2014 |
| WO | WO-2014107790 A1 | 7/2014 |
| WO | 2014138851 | 9/2014 |
| WO | WO-2014138846 A1 | 9/2014 |
| WO | WO-2014138847 A1 | 9/2014 |
| WO | WO-2014138859 A1 | 9/2014 |
| WO | WO-2014138860 A1 | 9/2014 |
| WO | WO-2014142277 A1 | 9/2014 |
| WO | 2015123659 | 8/2015 |
| WO | WO-2015192249 A1 | 12/2015 |
| WO | WO-2016026042 A1 | 2/2016 |
| WO | WO-2016074077 A1 | 5/2016 |
| WO | 2016183667 | 11/2016 |
| WO | WO-2016183668 A1 | 11/2016 |
| WO | WO-201620764 A1 | 12/2016 |
| WO | WO-2017152268 A1 | 9/2017 |
| WO | WO-2018191805 A1 | 10/2018 |
| WO | WO-2018191806 A1 | 10/2018 |
| WO | WO-2018191807 A1 | 10/2018 |

OTHER PUBLICATIONS

"International Application Serial No. PCT/CA2017/050478, International Preliminary Report on Patentability dated Oct. 31, 2019", 7 pgs.
"International Application Serial No. PCT/CA2017/050479, International Preliminary Report on Patentability dated Oct. 31, 2019", 6 pgs.
"International Application Serial No. PCT/CA2017/050480, International Preliminary Report on Patentability dated Oct. 31, 2019", 7 pgs.
"Singaporean Application Serial No. 11201909648V, Voluntary Amendment filed Apr. 17, 2020", 10 pgs.
"Singaporean Application Serial No. 11201909681X, Voluntary Amendment filed Apr. 20, 2020", 12 pgs.
"Singaporean Application Serial No. 11201909695X, Voluntary Amendment filed Apr. 17, 2020", 12 pgs.
"European Application Serial No. 17905967.0, Response to Communication Pursuant to Rules 161 and 162 filed Jun. 5, 2020", 5 pgs.
"European Application Serial No. 17906408.4, Response to Communication Pursuant to Rules 161 and 162 filed Jun. 5, 2020", 5 pgs.
"European Application Serial No. 17906575.0, Response to Communication Pursuant to Rules 161 and 162 filed Jun. 5, 2020", 6 pgs.
"Singaporean Application Serial No. 11201909695X, Written Opinion dated Sep. 1, 2020", 6 pgs.
"Singaporean Application Serial No. 11201909648V, Written Opinion dated Sep. 1, 2020", 7 pgs.
"Singaporean Application Serial No. 11201909681X, Written Opinion dated Sep. 1, 2020", 6 pgs.
"European Application Serial No. 17906575.0, Extended European Search Report dated Oct. 16, 2020", 8 pgs.
"Chinese Application Serial No. 201780092237.9, Office Action dated Oct. 30, 2020", w/ English translation, 38 pgs.
"European Application Serial No. 17905967.0, Extended European Search Report dated Nov. 5, 2020", 10 pgs.
"Chinese Application Serial No. 201780092236.4, Office Action dated Nov. 11, 2020", w/ English machine translation, 11 pgs.
"Chinese Application Serial No. 201780092213.3, Office Action dated Nov. 11, 2020", w English Translation, 32 pgs.
"European Application Serial No. 17906408.4, Extended European Search Report dated Nov. 27, 2020", 7 pgs.
"Singaporean Application Serial No. 11201909681X, Response filed Jan. 29, 2021 to Written Opinion dated Sep. 1, 2020", 23 pgs.
"Singaporean Application Serial No. 11201909648V, Response filed Feb. 1, 2021 to Written Opinion dated Sep. 1, 2020", 24 pgs.
"Singaporean Application Serial No. 11201909695X, Response filed Feb. 1, 2021 to Written Opinion dated Sep. 1, 2020", 28 pgs.
"NREL's Energy-Saving Technology for Air Conditioning Cuts Peak Power Loads Without Using Harmful Refrigerants", National Renewable Energy Laboratory, Golden, CO, (Jul. 2012), 2 pgs.
Kozubal, Eric, "Seminar 14—Desiccant Enhanced Air Conditioning", NREL 2013 Winter Conference, Dallas, TX, (2013), 5 pgs.
"Energy Savings Potential and RD&D Opportunities for Non-Vapor Compression HVAC Technologies", (Mar. 1, 2014), 199.
"International Application Serial No. PCT/CA2017/050478, International Search Report dated May 9, 2018", 3 pgs.
"International Application Serial No. PCT/CA2017/050478, Written Opinion dated May 9, 2018", 5 pgs.
"International Application Serial No. PCT/CA2017/050479, International Search Report dated Jan. 9, 2018", 3 pgs.
"International Application Serial No. PCT/CA2017/050479, Written Opinion dated Jan. 9, 2018", 4 pgs.
"International Application Serial No. PCT/CA2017/050480, International Search Report dated Jan. 11, 2018", 3 pgs.
"International Application Serial No. PCT/CA2017/050480, Written Opinion dated Jan. 11, 2018", 5 pgs.
El-Dessouky, H T, et al., "A Novel air conditioning system Membrane Air Drying and Evaporative Cooling", Institution of Chemical EngineersTrans IChemE, vol. 78, Part A, Oct. 2000, (Oct. 2000), 999-1009.
Kassai, M, et al., "Performance investigation of liquid-to-air membrane energy exchanger under low solution/air heat capacity rates ratio conditions", Building services engineering research and technology vol. 36(5), (2015), 535-545.
"U.S. Appl. No. 16/606,673, Non Final Office Action dated Jun. 23, 2021", 13 pgs.
"Chinese Application Serial No. 201780092213.3, Office Action dated Aug. 6, 2021", with English translation, 28 pages.
"Chinese Application Serial No. 201780092213.3, Response filed May 26, 2021 to Office Action dated Nov. 11, 2020", with English claims, 26 pages.
"Chinese Application Serial No. 201780092236.4, Response filed Apr. 14, 2021 to Office Action dated Nov. 11, 2020", with English claims, 21 pages.
"Chinese Application Serial No. 201780092237.9, Office Action dated Jul. 28, 2021", with English translation, 41 pages.
"Chinese Application Serial No. 201780092237.9, Response filed May 14, 2021 to Office Action dated Oct. 30, 2020", with English claims, 35 pages.
"European Application Serial No. 17905967.0, Response filed Jun. 3, 2021 to Extended European Search Report, dated Nov. 5, 2020", 10 pgs.
"European Application Serial No. 17906408.4, Response filed Jun. 22, 2021 to Extended European Search Report dated Nov. 27, 2020", 16 pgs.
"European Application Serial No. 17906575.0, Response filed May 13, 2021 to Extended European Search Report dated Oct. 16, 2020", 21 pgs.
"Indian Application Serial No. 201917046210, First Examination Report dated Jun. 9, 2021", with English translation, 6 pages.
"Indian Application Serial No. 201917046215, First Examination Report dated Sep. 9, 2021", 9 pgs.
"U.S. Appl. No. 16/606,716, Non Final Office Action dated Sep. 17, 2021", 16 pgs.
"Indian Application Serial No. 201917046207, First Examination Report dated Sep. 20, 2021", with English translation, 8 pages.
"U.S. Appl. No. 16/606,673, Response filed Sep. 23, 2021 to Non Final Office Action dated Jun. 23, 2021", 15 pgs.
"U.S. Appl. No. 16/606,673, Final Office Action dated Dec. 10, 2021", 13 pgs.
"Chinese Application Serial No. 201780092213.3, Decision of Rejection dated Dec. 30, 2021", with machine English translation, 19 pages.
"Chinese Application Serial No. 201780092213.3, Response filed Oct. 21, 2021 to Office Action dated Aug. 6, 2021", with English claims, 13 pages.
"U.S. Appl. No. 16/606,716, Response filed Jan. 18, 2022 to Non Final Office Action dated Sep. 17, 2021", 13 pgs.

(56) References Cited

OTHER PUBLICATIONS

"Chinese Application Serial No. 201780092237.9, Decision of Rejection dated Jan. 21, 2022", with Concise Statement of Relevance, 12 pages.
"Chinese Application Serial No. 201780092237.9, Response filed Oct. 12, 2021 to Office Action dated Jul. 28, 2021", with English claims, 16 pages.
Al-Sulaiman, "Liquid Desiccant based two-stage evaporative cooling system using reverse osmosis (RO) process for regeneration", Applied Thermal Engineering, vol. 27, Issues 14-15, (Oct. 2007), 2449-2452.
"Aaonaire Energy Recovery Units Users Information Manual", AAON, Inc., (Aug. 2006), 16 pgs.
"Advances in Desiccant-Based Dehumidification", American Standard, Trane Engineers Newsletter, vol. 34-4, (2005), 8 pgs.
"U.S. Appl. No. 14/190,715, Response filed Jul. 20, 2018 to Final Office Action dated Feb. 20, 2018", 14 pgs.
"U.S. Appl. No. 10/048,797, Amendment and Response filed Apr. 29, 2003 to Non-Final Office dated Mar. 11, 2003", 10 pgs.
"U.S. Appl. No. 10/048,797, Non-Final Office dated Mar. 11, 2003", 4 pgs.
"U.S. Appl. No. 10/048,797, Notice of Allowance dated May 13, 2003", 5 pgs.
"U.S. Appl. No. 13/350,902, Appeal Brief filed Apr. 4, 2014", 24 pgs.
"U.S. Appl. No. 13/350,902, Appeal Decision mailed Sep. 30, 2016", 6 pgs.
"U.S. Appl. No. 13/350,902, Examiner's Answer dated Jun. 16, 2014", 17 pgs.
"U.S. Appl. No. 13/350,902, Final Office Action dated Dec. 30, 2013", 13 pgs.
"U.S. Appl. No. 13/350,902, Non Final Office Action dated Oct. 1, 2013", 13 pgs.
"U.S. Appl. No. 13/350,902, Notice of Allowance dated Mar. 1, 2017", 7 pgs.
"U.S. Appl. No. 13/350,902, Notice of Allowance dated Nov. 9, 2016", 9 pgs.
"U.S. Appl. No. 13/350,902, Reply Brief filed Jul. 8, 2014", 9 pgs.
"U.S. Appl. No. 13/350,902, Response filed Aug. 5, 2013 to Restriction Requirement dated Jul. 23, 2013", 2 pgs.
"U.S. Appl. No. 13/350,902, Response filed Oct. 29, 2013 to Non Final Office Action dated Oct. 1, 2013", 15 pgs.
"U.S. Appl. No. 13/350,902, Restriction Requirement dated Jul. 23, 2013", 8 pgs.
"U.S. Appl. No. 13/449,598, Final Office Action dated Feb. 4, 2016", 23 pgs.
"U.S. Appl. No. 13/449,598, Non Final Office Action dated Apr. 24, 2015", 18 pgs.
"U.S. Appl. No. 13/449,598, Non Final Office Action dated Aug. 27, 2015", 20 pgs.
"U.S. Appl. No. 13/449,598, Notice of Allowance dated Mar. 10, 2017", 7 pgs.
"U.S. Appl. No. 13/449,598, Notice of Allowance dated Jul. 6, 2017", 7 pgs.
"U.S. Appl. No. 13/449,598, Notice of Allowance dated Nov. 4, 2016", 9 pgs.
"U.S. Appl. No. 13/449,598, Response filed Jan. 29, 2015 to Restriction Requirement dated Jan. 5, 2015", 2 pgs.
"U.S. Appl. No. 13/449,598, Response filed Jul. 17, 2015 to Non Final Office Action dated Apr. 24, 2015", 17 pgs.
"U.S. Appl. No. 13/449,598, Response filed Nov. 16, 2015 to Non Final Office Action dated Aug. 27, 2015", 18 pgs.
"U.S. Appl. No. 13/449,598, Restriction Requirement dated Jan. 5, 2015", 10 pgs.
"U.S. Appl. No. 13/702,596, Appeal Brief filed Jun. 15, 2015", 82 pgs.
"U.S. Appl. No. 13/702,596, Final Office Action dated Jan. 30, 2015", 15 pgs.
"U.S. Appl. No. 13/702,596, Non Final Office Action dated Oct. 30, 2014", 16 pgs.
"U.S. Appl. No. 13/702,596, Notice of Allowance dated Oct. 1, 2015", 7 pgs.
"U.S. Appl. No. 13/702,596, Notice of Allowance dated Nov. 25, 2015", 2 pgs.
"U.S. Appl. No. 13/702,596, Post Allowance Amendment filed Oct. 7, 2015", 13 pgs.
"U.S. Appl. No. 13/702,596, PTO Response to Rule 312 Communication dated Oct. 19, 2015", 2 pgs.
"U.S. Appl. No. 13/702,596, Response filed Dec. 15, 2014 to Non Final Office Action dated Oct. 30, 2014", 21 pgs.
"U.S. Appl. No. 13/797,062, Appeal Decision dated Jun. 18, 2021", 12 pgs.
"U.S. Appl. No. 13/797,062, Amendment and Response Under 37 C.F.R. 1.116 filed Jan. 22, 2018 to Final Office Action dated Feb. 24, 2016", 11 pgs.
"U.S. Appl. No. 13/797,062, Appeal Brief filed Mar. 25, 2020", 27 pgs.
"U.S. Appl. No. 13/797,062, Appeal Brief filed Jun. 9, 2016", 33 pgs.
"U.S. Appl. No. 13/797,062, Appeal Decision dated Nov. 22, 2017", 15 pgs.
"U.S. Appl. No. 13/797,062, Final Office Action dated Feb. 24, 2016", 29 pgs.
"U.S. Appl. No. 13/797,062, Final Office Action dated Jul. 13, 2018", 22 pgs.
"U.S. Appl. No. 13/797,062, Final Office Action dated Jul. 25, 2019", 50 pgs.
"U.S. Appl. No. 13/797,062, Non Final Office Action dated Feb. 21, 2018", 21 pgs.
"U.S. Appl. No. 13/797,062, Non Final Office Action dated May 7, 2015", 19 pgs.
"U.S. Appl. No. 13/797,062, Non Final Office Action dated Sep. 25, 2015", 24 pgs.
"U.S. Appl. No. 13/797,062, Non Final Office Action dated Dec. 28, 2018", 50 pgs.
"U.S. Appl. No. 13/797,062, Respnose filed Jun. 28, 2019 to Non Final Office Action dated Jun. 28, 2019", 12 pgs.
"U.S. Appl. No. 13/797,062, Response filed Apr. 23, 2015 to Restriction Requirement dated Mar. 13, 2015", 3 pgs.
"U.S. Appl. No. 13/797,062, Response filed Jul. 17, 2015 to Non Final Office Action dated May 7, 2015", 16 pgs.
"U.S. Appl. No. 13/797,062, Response filed Nov. 30, 2015 to Non Final Office Action dated Sep. 25, 2015", 16 pgs.
"U.S. Appl. No. 13/797,062, Response filed Dec. 13, 2018 to Final Office Action dated Jul. 13, 2018", 12 pgs.
"U.S. Appl. No. 13/797,062, Response filed May 21, 2018 to Non Final Office Action dated Feb. 21, 2018", 12 pgs.
"U.S. Appl. No. 13/797,062, Restriction Requirement dated Mar. 13, 2015", 8 pgs.
"U.S. Appl. No. 13/797,152, Appeal Brief filed Jun. 9, 2016", 29 pgs.
"U.S. Appl. No. 13/797,152, Corrected Notice of Allowance dated Mar. 9, 2017", 7 pgs.
"U.S. Appl. No. 13/797,152, Final Office Action dated Feb. 25, 2016", 14 pgs.
"U.S. Appl. No. 13/797, 152, Non Final Office Action dated Aug. 25, 2015", 10 pgs.
"U.S. Appl. No. 13/797, 152, Notice of Allowance dated Mar. 9, 2017", 7 pgs.
"U.S. Appl. No. 13/797,152, Notice of Allowance dated Jun. 27, 2017", 8 pgs.
"U.S. Appl. No. 13/797,152, Notice of Allowance dated Oct. 31, 2016", 7 pgs.
"U.S. Appl. No. 13/797,152, Response filed Nov. 20, 2015 to Non Final Office Action dated Aug. 25, 2015", 12 pgs.
"U.S. Appl. No. 13/801,280, 312 Amendment filed Jun. 18, 2015", 8 pgs.
"U.S. Appl. No. 13/801,280, Non Final Office Action dated Feb. 12, 2015", 7 pgs.
"U.S. Appl. No. 13/801,280, Notice of Allowance dated May 19, 2015", 7 pgs.
"U.S. Appl. No. 13/801,280, PTO Response to 312 Amendment dated Jul. 9, 2015", 2 pgs.

(56) References Cited

OTHER PUBLICATIONS

"U.S. Appl. No. 13/801,280, Response filed Jan. 7, 2015 to Restriction Requirement dated Dec. 10, 2014", 1 pg.
"U.S. Appl. No. 13/801,280, Response filed Mar. 31, 2015 to Non Final Office Action dated Feb. 12, 2015", 9 pgs.
"U.S. Appl. No. 13/801,280, Restriction Requirement dated Dec. 10, 2014", 9 pgs.
"U.S. Appl. No. 14/171,951, Advisory Action dated Nov. 10, 2016", 3 pgs.
"U.S. Appl. No. 14/171,951, Final Office Action dated Jun. 28, 2016", 36 pgs.
"U.S. Appl. No. 14/171,951, Non Final Office Action dated Jan. 5, 2016", 20 pgs.
"U.S. Appl. No. 14/171,951, Non Final Office Action dated May 2, 2016", 35 pgs.
"U.S. Appl. No. 14/171,951, Notice of Allowability dated Jul. 18, 2018", 2 pgs.
"U.S. Appl. No. 14/171,951, Notice of Allowance dated Jan. 9, 2019", 6 pgs.
"U.S. Appl. No. 14/171,951, Notice of Allowance dated Jan. 19, 2018", 5 pgs.
"U.S. Appl. No. 14/171,951, Notice of Allowance dated Feb. 3, 2017", 5 pgs.
"U.S. Appl. No. 14/171,951, Notice of Allowance dated May 23, 2018", 5 pgs.
"U.S. Appl. No. 14/171,951, Notice of Allowance dated Jun. 8, 2017", 5 pgs.
"U.S. Appl. No. 14/171,951, Notice of Allowance dated Oct. 3, 2017", 5 pgs.
"U.S. Appl. No. 14/171,951, Notice of Allowance dated Nov. 6, 2019", 6 pgs.
"U.S. Appl. No. 14/171,951, Response filed Mar. 28, 2016 to Non Final Office Action dated Jan. 5, 2016", 18 pgs.
"U.S. Appl. No. 14/171,951, Response filed Jun. 9, 2016 to Non Final Office Action dated May 2, 2016", 24 pgs.
"U.S. Appl. No. 14/171,951, Response filed Oct. 28, 2016 to Final Office Action dated Jun. 28, 2016", 15 pgs.
"U.S. Appl. No. 14/171,951, Response filed Dec. 3, 2015 to Restriction Requirement dated Nov. 16, 2015", 6 pgs.
"U.S. Appl. No. 14/171,951, Response filed Dec. 15, 2016 to Advisory Action dated Nov. 10, 2016", 16 pgs.
"U.S. Appl. No. 14/171,951, Restriction Requirement dated Nov. 16, 2015", 13 pgs.
"U.S. Appl. No. 14/186,420, Notice of Allowance dated Jan. 27, 2017", 7 pgs.
"U.S. Appl. No. 14/187,413 Response to Non-Final Office Action filed Jun. 2, 2020", 25 pgs.
"U.S. Appl. No. 14/187,413, Advisory Action dated Nov. 10, 2016", 4 pgs.
"U.S. Appl. No. 14/187,413, Advisory Action dated Dec. 17, 2018", 5 pgs.
"U.S. Appl. No. 14/187,413, Amendment and Response filed Nov. 30, 2018 to Final Office Action dated Jul. 26, 2018", 19 pgs.
"U.S. Appl. No. 14/187,413, Appeal Decision dated Mar. 10, 2022", 11 pgs.
"U.S. Appl. No. 14/187,413, Examiner's Answer dated Jun. 11, 2021", 10 pgs.
"U.S. Appl. No. 14/187,413, Final Office Action dated Jun. 15, 2020", 19 pgs.
"U.S. Appl. No. 14/187,413, Final Office Action dated Jun. 27, 2017", 16 pgs.
"U.S. Appl. No. 14/187,413, Final Office Action dated Jul. 26, 2018", 16 pgs.
"U.S. Appl. No. 14/187,413, Non Final Office Action dated Feb. 8, 2017", 15 pgs.
"U.S. Appl. No. 14/187,413, Final Office Action dated Jul. 28, 2016", 20 pgs.
"U.S. Appl. No. 14/187,413, Non Final Office Action dated Mar. 17, 2016", 15 pgs.
"U.S. Appl. No. 14/187,413, Non Final Office Action dated Jul. 31, 2019", 22 pgs.
"U.S. Appl. No. 14/187,413, Non Final Office Action dated Dec. 18, 2017", 20 pgs.
"U.S. Appl. No. 14/187,413, Notice of Allowance dated Mar. 29, 2022", 7 pgs.
"U.S. Appl. No. 14/187,413, Response filed Feb. 25, 2015 to Restriction Requirement dated Feb. 16, 2016", 3 pgs.
"U.S. Appl. No. 14/187,413, Response filed May 26, 2016 to Non Final Office Action dated Mar. 17, 2016", 15 pgs.
"U.S. Appl. No. 14/187,413, Response filed Jun. 8, 2017 to Non Final Office Action dated Feb. 8, 2017", 15 pgs.
"U.S. Appl. No. 14/187,413, Response filed Oct. 28, 2016 to Final Office Action dated Jul. 28, 2016", 17 pgs.
"U.S. Appl. No. 14/187,413, Response filed Nov. 27, 2017 to Final Office Action dated Jun. 27, 2017", 14 pgs.
"U.S. Appl. No. 14/187,413, Response filed Dec. 21, 2016 to Final Office Action dated Jul. 28, 2016 and Advisory Action dated Nov. 10, 2016", 15 pgs.
"U.S. Appl. No. 14/187,413, Restriction Requirement dated Feb. 16, 2016", 6 pgs.
"U.S. Appl. No. 14/190,715, Advisory Action dated Aug. 16, 2018", 6 pgs.
"U.S. Appl. No. 14/190,715, Examiner Interview Summary dated Oct. 31, 2018", 3 pgs.
"U.S. Appl. No. 14/190,715, Final Office Action dated Feb. 20, 2018", 9 pgs.
"U.S. Appl. No. 14/190,715, Non Final Office Action dated Aug. 10, 2017", 9 pgs.
"U.S. Appl. No. 14/190,715, Notice of Allowance dated Mar. 4, 2019", 7 pgs.
"U.S. Appl. No. 14/190,715, Response filed Jul. 12, 2017 to Restriction Requirement dated Apr. 12, 2017", 7 pgs.
"U.S. Appl. No. 14/190,715, Response filed Nov. 9, 2017 to Non Final Office Action dated Aug. 10, 2017", 10 pgs.
"U.S. Appl. No. 14/190,715, Restriction Requirement dated Apr. 13, 2017", 7 pgs.
"U.S. Appl. No. 14/192,019, Final Office Action dated Jan. 10, 2019", 16 pgs.
"U.S. Appl. No. 14/192,019, Final Office Action dated Nov. 28, 2017", 16 pgs.
"U.S. Appl. No. 14/192,019, Non Final Office Action dated May 11, 2018", 16 pgs.
"U.S. Appl. No. 14/192,019, Non Final Office Action dated May 19, 2017", 15 pgs.
"U.S. Appl. No. 14/192,019, Non Final Office Action dated Jun. 25, 2019", 13 pgs.
"U.S. Appl. No. 14/192,019, Response filed Jun. 10, 2019 to Final Office Action dated Jan. 20, 2019", 10 pgs.
"U.S. Appl. No. 14/192,019, Response filed Aug. 21, 2017 to Non Final Office Action dated May 19, 2017", 13 pgs.
"U.S. Appl. No. 14/192,019, Response filed Sep. 11, 2018 to Non Final Office Action dated May 11, 2018", 12 pgs.
"U.S. Appl. No. 14/192,019, Response filed Apr. 27, 2018 to Final Office Action dated Nov. 28, 2017", 11 pgs.
"U.S. Appl. No. 14/804,953, Corrected Notice of Allowance dated Jan. 25, 2018", 4 pgs.
"U.S. Appl. No. 14/804,953, Non Final Office Action dated Sep. 15, 2016", 8 pgs.
"U.S. Appl. No. 14/804,953, Notice of Allowance dated Feb. 27, 2017", 7 pgs.
"U.S. Appl. No. 14/804,953, Notice of Allowance dated May 9, 2017", 7 pgs.
"U.S. Appl. No. 14/804,953, Notice of Allowance dated Sep. 7, 2017", 7 pgs.
"U.S. Appl. No. 14/804,953, Response filed Dec. 15, 2016 to Non Final Office Action dated Sep. 15, 2016", 7 pgs.
"U.S. Appl. No. 14/830,492, Corrected Notice of Allowability dated Jun. 15, 2020", 2 pgs.
"U.S. Appl. No. 14/830,492, Final Office Action dated Dec. 28, 2018", 9 pgs.
"U.S. Appl. No. 14/830,492, Non-Final Action dated Mar. 15, 2018", 9 pgs.

(56) References Cited

OTHER PUBLICATIONS

"U.S. Appl. No. 14/830,492, Notice of Allowance dated Feb. 27, 2020", 5 pgs.
"U.S. Appl. No. 14/830,492, Notice of Allowance dated Sep. 24, 2019", 7 pgs.
"U.S. Appl. No. 14/830,492, Response filed Feb. 15, 2018 to Restriction Requirement dated Dec. 15, 2017", 7 pgs.
"U.S. Appl. No. 14/830,492, Response filed Jun. 29, 2019 to Final Office Action dated Dec. 28, 2018", 6 pgs.
"U.S. Appl. No. 14/830,492, Response filed Aug. 15, 2018 to Non Final Office Action dated Mar. 15, 2018", 12 pgs.
"U.S. Appl. No. 14/830,492, Restriction Requirement dated Dec. 15, 2017", 6 pgs.
"U.S. Appl. No. 14/957,795, Corrected Notice of Allowability dated Feb. 1, 2019", 4 pgs.
"U.S. Appl. No. 14/957,795, Corrected Notice of Allowance dated May 16, 2018", 4 pgs.
"U.S. Appl. No. 14/957,795, Final Office Action dated Nov. 6, 2017", 17 pgs.
"U.S. Appl. No. 14/957,795, Non Final Office Action dated Apr. 3, 2017", 19 pgs.
"U.S. Appl. No. 14/957,795, Notice of Allowance dated Jan. 17, 2019", 7 pgs.
"U.S. Appl. No. 14/957,795, Notice of Allowance dated Apr. 27, 2018", 8 pgs.
"U.S. Appl. No. 14/957,795, Notice of Allowance dated Sep. 11, 2018", 9 pgs.
"U.S. Appl. No. 14/957,795, Response filed Apr. 3, 2018 to Final Office Action dated Nov. 6, 2017", 11 pgs.
"U.S. Appl. No. 14/957,795, Response filed Aug. 3, 2017 to Non Final Office Action dated Apr. 3, 2017", 17 pgs.
"U.S. Appl. No. 15/185,155, Corrected Notice of Allowability dated May 15, 2019", 2 pgs.
"U.S. Appl. No. 15/185,155, Corrected Notice of Allowability dated May 22, 2019", 2 pgs.
"U.S. Appl. No. 15/185,155, Examiner Interview Summary dated Feb. 21, 2019", 3 pgs.
"U.S. Appl. No. 15/185,155, Final Office Action dated Dec. 5, 2018", 11 pgs.
"U.S. Appl. No. 15/185,155, Non Final Office Action dated Apr. 10, 2018", 13 pgs.
"U.S. Appl. No. 15/185,155, Notice of Allowance dated Mar. 25, 2019", 7 pgs.
"U.S. Appl. No. 15/185,155, Notice of Allowance dated Jul. 17, 2019", 8 pgs.
"U.S. Appl. No. 15/185,155, Response filed Aug. 6, 2018 to Non Final Office Action dated Apr. 10, 2018", 10 pgs.
"U.S. Appl. No. 15/185,155, Response filed Mar. 5, 2019 to Final Office Action dated Dec. 5, 2018", 9 pgs.
"U.S. Appl. No. 15/185,180, Final Office Action dated Jul. 31, 2019", 15 pgs.
"U.S. Appl. No. 15/185,180, Non Final Office Action dated Jan. 8, 2019", 14 pgs.
"U.S. Appl. No. 15/185,180, Notice of Allowance dated Oct. 15, 2020", 6 pgs.
"U.S. Appl. No. 15/185,180, Response filed Nov. 19, 2018 to Restriction Requirement dated Jun. 21, 2018", 9 pgs.
"U.S. Appl. No. 15/185,180, Response filed May 1, 2019 to Non Final Office Action dated Jan. 8, 2019", 11 pgs.
"U.S. Appl. No. 15/185,180, Restriction Requirement dated Jun. 21, 2018", 10 pgs.
"U.S. Appl. No. 15/574,201, Non Final Office Action dated Jan. 15, 2020", 8 pgs.
"U.S. Appl. No. 15/574,201, Non Final Office Action dated Jan. 26, 2021", 8 pgs.
"U.S. Appl. No. 15/574,201, Non Final Office Action dated Jan. 29, 2019", 6 pgs.
"U.S. Appl. No. 15/574,201, Notice of Allowability dated Jun. 18, 2021", 3 pgs.
"U.S. Appl. No. 15/574,201, Notice of Allowance dated May 21, 2020", 5 pgs.
"U.S. Appl. No. 15/574,201, Notice of Allowance dated Jun. 4, 2021", 5 pgs.
"U.S. Appl. No. 15/574,201, Notice of Allowance dated Aug. 20, 2019", 7 pgs.
"U.S. Appl. No. 15/574,201, Notice of Allowance dated Sep. 10, 2020", 6 pgs.
"U.S. Appl. No. 15/574,201, Response filed Jan. 7, 2019 to Restriction Requirement dated Sep. 5, 2018", 8 pgs.
"U.S. Appl. No. 15/574,201, Response filed May 15, 2020 to Non Final Office Action dated Jan. 15, 2020", 13 pgs.
"U.S. Appl. No. 15/574,201, Response filed May 26, 2021 to Non Final Office Action dated Jan. 26, 2021", 10 pgs.
"U.S. Appl. No. 15/574,201, Response filed Jul. 29, 2019 to Non-Final Office Action dated Jan. 29, 2019", 12 pgs.
"U.S. Appl. No. 15/574,201, Restriction Requirement dated Sep. 5, 2018", 6 pgs.
"U.S. Appl. No. 15/574,205, Corrected Notice of Allowability dated Apr. 17, 2020", 2 pgs.
"U.S. Appl. No. 15/574,205, Non Final Office Action dated Jun. 17, 2019", 3 pgs.
"U.S. Appl. No. 15/574,205, Non Final Office Action dated Sep. 11, 2018", 6 pgs.
"U.S. Appl. No. 15/574,205, Notice of Allowance dated Feb. 13, 2019", 6 pgs.
"U.S. Appl. No. 15/574,205, Notice of Allowance dated Apr. 9, 2020", 5 pgs.
"U.S. Appl. No. 15/574,205, Notice of Allowance dated Dec. 2, 2019", 5 pgs.
"U.S. Appl. No. 15/574,205, Response filed Jan. 11, 2019 to Non-Final Office Action dated Sep. 11, 2018", 12 pgs.
"U.S. Appl. No. 15/574,205, Response filed Nov. 18, 2019 to Non-Final Office Action dated Jun. 17, 2019", 8 pgs.
"U.S. Appl. No. 15/590,685, Advisory Action dated Dec. 12, 2018", 3 pgs.
"U.S. Appl. No. 15/590,685, Examiner Interview Summary dated Dec. 11, 2020", 3 pgs.
"U.S. Appl. No. 15/590,685, Final Office Action dated Jun. 7, 2018", 12 pgs.
"U.S. Appl. No. 15/590,685, Final Office Action dated Jun. 26, 2019", 14 pgs.
"U.S. Appl. No. 15/590,685, Non Final Office Action dated Jan. 7, 2020", 15 pgs.
"U.S. Appl. No. 15/590,685, Non Final Office Action dated Jan. 11, 2019", 13 pgs.
"U.S. Appl. No. 15/590,685, Non Final Office Action dated Oct. 6, 2017", 11 pgs.
"U.S. Appl. No. 15/590,685, Notice of Allowance dated Feb. 9, 2021", 6 pgs.
"U.S. Appl. No. 15/590,685, PTO Response to Rule 312 Communication dated Apr. 27, 2021", 2 pgs.
"U.S. Appl. No. 15/590,685, Response filed Feb. 20, 2018 to Non Final Office Action dated Oct. 6, 2017", 7 pgs.
"U.S. Appl. No. 15/590,685, Response filed Apr. 18, 2019 to NonFinal Office Action dated Jan. 11, 2019", 11 pgs.
"U.S. Appl. No. 15/590,685, Response filed Nov. 30, 2018 to Final Office Action dated Jun. 7, 2018", 10 pgs.
"U.S. Appl. No. 15/590,685, Response filed Dec. 19, 2019 to Final Office Action dated Jun. 26, 2019", 11 pgs.
"U.S. Appl. No. 15/739,016, Corrected Notice of Allowability dated Jul. 1, 2020", 2 pgs.
"U.S. Appl. No. 15/739,016, Non Final Office Action dated Feb. 13, 2019", 6 pgs.
"U.S. Appl. No. 15/739,016, Notice of Allowance dated Mar. 25, 2020", 5 pgs.
"U.S. Appl. No. 15/739,016, Notice of Allowance dated Aug. 1, 2019", 6 pgs.
"U.S. Appl. No. 15/739,016, Notice of Allowance dated Nov. 20, 2019", 7 pgs.
"U.S. Appl. No. 15/739,016, Response filed Jan. 28, 2019 to Restriction Requirement dated Nov. 26, 2018", 8 pgs.

(56) References Cited

OTHER PUBLICATIONS

"U.S. Appl. No. 15/739,016, Restriction Requirement dated Nov. 26, 2018", 5 pgs.
"U.S. Appl. No. 15/814,153, Corrected Notice of Allowability dated May 13, 2021", 3 pgs.
"U.S. Appl. No. 15/814,153, Corrected Notice of Allowability dated May 27, 2021", 3 pgs.
"U.S. Appl. No. 15/814,153, Corrected Notice of Allowability dated Jul. 15, 2021", 2 pgs.
"U.S. Appl. No. 15/814,153, Non Final Office Action dated Jul. 6, 2020", 12 pgs.
"U.S. Appl. No. 15/814,153, Non Final Office Action dated Oct. 9, 2019", 16 pgs.
"U.S. Appl. No. 15/814,153, Notice of Allowance dated Apr. 8, 2021", 10 pgs.
"U.S. Appl. No. 15/814, 153, Response filed Jan. 6, 2021 to Non Final Office Action dated Jul. 6, 2020", 12 pgs.
"U.S. Appl. No. 15/814,153, Response filed Apr. 9, 2020 to Non Final Office Action dated Oct. 9, 2019", 15 pgs.
"U.S. Appl. No. 15/814,153, Response filed Jul. 15, 2019 to Restriction Requirement dated May 15, 2019", 9 pgs.
"U.S. Appl. No. 15/814,153, Restriction Requirement dated May 15, 2019", 6 pgs.
"U.S. Appl. No. 16/083,280, Corrected Notice of Allowability dated Aug. 3, 2020", 2 pgs.
"U.S. Appl. No. 16/083,280, Corrected Notice of Allowability dated Sep. 18, 2020", 2 pgs.
"U.S. Appl. No. 16/083,280, Non Final Office Action dated Jan. 28, 2020", 6 pgs.
"U.S. Appl. No. 16/083,280, Notice of Allowance dated Jun. 12, 2020", 5 pgs.
"U.S. Appl. No. 16/083,280, Response filed May 28, 2020 to Non Final Office Action dated Jan. 28, 2020", 8 pgs.
"U.S. Appl. No. 16/351,046, Non Final Office Action dated Dec. 21, 2020", 8 pgs.
"U.S. Appl. No. 16/431,397, Notice of Allowance dated Dec. 10, 2021", 11 pgs.
"U.S. Appl. No. 16/431,397, Response filed Aug. 23, 2021 to Restriction Requirement dated Jun. 23, 2021", 7 pgs.
"U.S. Appl. No. 16/431,397, Restriction Requirement dated Jun. 23, 2021", 6 pgs.
"U.S. Appl. No. 16/431,397, Supplemental Notice of Allowability dated Dec. 24, 2021", 2 pgs.
"U.S. Appl. No. 16/431,397, Supplemental Preliminary Amendment filed Aug. 2, 2019", 6 pgs.
"U.S. Appl. No. 16/606,673, Advisory Action dated Mar. 4, 2022", 3 pgs.
"U.S. Appl. No. 16/606,673, Appeal Brief filed Aug. 29, 2022", 23 pgs.
"U.S. Appl. No. 16/606,673, Decision on Pre-Appeal Brief Request for Review dated Jun. 27, 2022", 2 pgs.
"U.S. Appl. No. 16/606,673, Examiner's Answer dated Nov. 21, 2022", 9 pgs.
"U.S. Appl. No. 16/606,673, Pre-Appeal Brief Request for Review filed May 10, 2022", 4 pgs.
"U.S. Appl. No. 16/606,673, Response filed Feb. 9, 2022 to Final Office Action dated Dec. 10, 2021", 12 pgs.
"U.S. Appl. No. 16/606,716, Appeal Brief filed Sep. 6, 2022", 25 pgs.
"U.S. Appl. No. 16/606,716, Examiner's Answer dated Oct. 28, 2022", 11 pgs.
"U.S. Appl. No. 16/606,716, Final Office Action dated Feb. 4, 2022", 15 pgs.
"U.S. Appl. No. 16/606,716, Response filed May 4, 2022 to Final Office Action dated Feb. 4, 2022", 20 pgs.
"U.S. Appl. No. 16/784,822, Final Office Action dated Jul. 26, 2022", 7 pgs.
"U.S. Appl. No. 16/784,822, Non Final Office Action dated Mar. 14, 2022", 9 pgs.

"U.S. Appl. No. 16/784,822, Notice of Allowance dated Nov. 9, 2022", 5 pgs.
"U.S. Appl. No. 16/784,822, Response filed Feb. 28, 2022 to Restriction Requirement dated Dec. 27, 2021", 6 pgs.
"U.S. Appl. No. 16/784,822, Response filed Jul. 11, 2022 to Non Final Office Action dated Mar. 14, 2022", 9 pgs.
"U.S. Appl. No. 16/784,822, Response filed Oct. 25, 2022 to Final Office Action dated Jul. 26, 2022", 5 pgs.
"U.S. Appl. No. 16/784,822, Restriction Requirement dated Dec. 27, 2021", 6 pgs.
"U.S. Appl. No. 16/784,822, Supplemental Preliminary Amendment filed Feb. 14, 2020", 6 pgs.
"U.S. Appl. No. 17/168,928, Response filed Feb. 27, 22023 to Restriction Requirement dated Nov. 25, 2022", 8 pgs.
"U.S. Appl. No. 17/168,928, Restriction Requirement dated Nov. 25, 2022", 9 pgs.
"U.S. Appl. No. 17/168,928, Supplemental Preliminary Amendment filed Aug. 12, 2021", 5 pages.
"U.S. Appl. No. 17/231,634, Corrected Notice of Allowability dated Feb. 10, 2023", 2 pgs.
"U.S. Appl. No. 17/231,634, Notice of Allowance dated Jan. 11, 2023", 8 pgs.
"U.S. Appl. No. 17/305,681, Preliminary Amendment filed Oct. 15, 2021".
"U.S. Appl. No. 17/345,852 Preliminary Amendment filed with Application", 3 pgs.
"U.S. Appl. No. 17/345,852 Supplemental Preliminary Amendment", 6 pgs.
"U.S. Appl. No. 17/345,852, Non Final Office Action dated Feb. 23, 2023", 12 pgs.
"U.S. Appl. No. 17/855,344 Preliminary Amendment filed with Application", 7 pgs.
"U.S. Appl. No. 17/855,344, Final Office Action dated Jul. 17, 2023", 13 pgs.
"U.S. Appl. No. 17/855,344, Non Final Office Action dated Jan. 27, 2023", 15 pgs.
"U.S. Appl. No. 17/855,344, Response filed Jun. 27, 2023 to Non Final Office Action dated Jan. 27, 2023", 13 pgs.
"U.S. Appl. No. 17/855,413 Preliminary Amendment Filed with Application", 7 pgs.
"U.S. Appl. No. 17/855,413, Non Final Office Action dated Jan. 27, 2023", 15 pgs.
"Australian Application Serial No. 2011268661, First Examiner Report dated Sep. 24, 2014", 5 pgs.
"Australian Application Serial No. 2011268661, Response filed Jul. 20, 2015 to First Examiner Report dated Sep. 24, 2014", 8 pgs.
"Australian Application Serial No. 2011268661, Response filed Sep. 23, 2015 to Second Examiner Report dated Aug. 18, 2015", 5 pgs.
"Australian Application Serial No. 2011268661, Second Examiner Report dated Aug. 18, 2015", 16 pgs.
"Australian Application Serial No. 2012208921, First Examiner Report dated Jun. 2, 2016", 7 pgs.
"Australian Application Serial No. 2012304223, First Examiner Report dated Aug. 5, 2016", 4 pgs.
"Australian Application Serial No. 2012304223, Response filed Feb. 16, 2017 to First Examiner Report dated Aug. 5, 2016", 25 pgs.
"Australian Application Serial No. 2013305427, Examination Report dated Mar. 3, 2017", 4 pgs.
"Australian Application Serial No. 2013305427, Response filed Oct. 10, 2017 to Examination Report dated Mar. 3, 2017", 30 pgs.
"Australian Application Serial No. 2013305428, Office Action dated May 30, 2017", 5 pgs.
"Australian Application Serial No. 2013305428, Response filed May 15, 2018 to Office Action dated May 30, 2017", 23 pgs.
"Australian Application Serial No. 2014231667, First Examination Report dated Apr. 5, 2018", 4 pgs.
"Australian Application Serial No. 2014231667, Response filed Jan. 15, 2019 to Subsequent Examiners Report dated Aug. 29, 2018", 12 pgs.
"Australian Application Serial No. 2014231667, Response filed Jul. 20, 2018 to First Examination Report dated Apr. 5, 2018", 19 pgs.

(56) References Cited

OTHER PUBLICATIONS

"Australian Application Serial No. 2014231667, Subsequent Examiners Report dated Aug. 29, 2018", 4 pgs.
"Australian Application Serial No. 2014231668, First Examination Report dated Dec. 6, 2017", 6 pgs.
"Australian Application Serial No. 2014231668, Response filed Mar. 14, 2018 to First Examination Report dated Dec. 6, 2017", 31 pgs.
"Australian Application Serial No. 2014231668, Subsequent Examiners Report dated Apr. 5, 2018", 3 pgs.
"Australian Application Serial No. 2014231672, First Examiners Report dated Jul. 14, 2017", 4 pgs.
"Australian Application Serial No. 2014231672, Response filed Oct. 9, 2017 to First Examiners Report dated Jul. 14, 2017", 24 pgs.
"Australian Application Serial No. 2014231680, First Examiners Report dated Aug. 4, 2017", 4 pgs.
"Australian Application Serial No. 2014231681, First Examiners Report dated Jul. 12, 2017", 4 pgs.
"Australian Application Serial No. 2014231681, Response filed Jan. 30, 2018 to Subsequent Examiners Report dated Sep. 26, 2017", 15 pgs.
"Australian Application Serial No. 2014231681, Response filed Apr. 26, 2018 to Subsequent Examiners Report dated Mar. 13, 2018", 3 pgs.
"Australian Application Serial No. 2014231681, Response filed Sep. 15, 2017 to First Examiners Report dated Jul. 12, 2017", 9 pgs.
"Australian Application Serial No. 2014231681, Subsequent Examiners Report dated Mar. 13, 2018", 4 pgs.
"Australian Application Serial No. 2014231681, Subsequent Examiners Report dated Sep. 27, 2017", 4 pgs.
"Australian Application Serial No. 2015230799, First Examiner Report dated Mar. 27, 2017", 10 pgs.
"Australian Application Serial No. 2015230799, Response filed Feb. 16, 2018 to First Examiner Report dated Mar. 27, 2017", 24 pgs.
"Australian Application Serial No. 2015306040, First Examination Report dated Nov. 8, 2019", 4 pgs.
"Australian Application Serial No. 2016265882, First Examination Report dated Aug. 5, 2020", 4 pgs.
"Australian Application Serial No. 2016265883, First Examination Report dated Sep. 22, 2020", 4 pgs.
"Australian Application Serial No. 2016281963, First Examination Report dated Oct. 15, 2020", 5 pgs.
"Australian Application Serial No. 2017204552, First Examination Report dated Oct. 9, 2018", 3 pgs.
"Australian Application Serial No. 2017228937, First Examination Report dated Jan. 6, 2022", 3 pgs.
"Australian Application Serial No. 2018202342, First Examination Report dated Jun. 17, 2019", 5 pgs.
"Australian Application Serial No. 2018202342, Response filed Aug. 1, 2019 to First Examination Report dated Jun. 17, 2019", 17 pgs.
"Australian Application Serial No. 2018202342, Subsequent Examiners Report dated Aug. 23, 2019", 4 pgs.
"Australian Application Serial No. 2018204774, First Examination Report dated Jul. 18, 2019", 4 pgs.
"Australian Application Serial No. 2018204774, Response filed May 28, 2020 to First Examination Report dated Jul. 18, 2019", 14 pgs.
"Australian Application Serial No. 2018226496, First Examination Report dated Jul. 25, 2019", 4 pgs.
"Australian Application Serial No. 2018236791, First Examination Report dated Mar. 2, 2020", 3 pgs.
"Australian Application Serial No. 2018236791, Response filed Jun. 9, 2020 to First Examination Report dated Mar. 2, 2020", 12 pgs.
"Australian Application Serial No. 2018236791, Voluntary Amendment filed Dec. 3, 2018", 8 pgs.
"Australian Application Serial No. 2019201063, First Examination Report dated Aug. 6, 2019", 7 pgs.
"Australian Application Serial No. 2019250148, First Examination Report dated Nov. 23, 2020", 5 pgs.
"Canadian Application Serial No. 2,801,352, Office Action dated Jul. 4, 2017", 3 pgs.
"Canadian Application Serial No. 2,801,352, Office Action dated Aug. 2, 2018", 3 pgs.
"Canadian Application Serial No. 2,801,352, Office Action dated Aug. 15, 2016", 3 pgs.
"Canadian Application Serial No. 2,801,352, Response filed Jan. 29, 2019 to Office Action dated Aug. 2, 2018", 12 pgs.
"Canadian Application Serial No. 2,801,352, Response filed Feb. 8, 2017 to Office Action dated Aug. 15, 2016", 89 pgs.
"Canadian Application Serial No. 2,801,352, Response filed Dec. 18, 2017 to Office Action dated Jul. 4, 2017", 8 pgs.
"Canadian Application Serial No. 2,843,763, Office Action dated Dec. 4, 2014", 3 pgs.
"Canadian Application Serial No. 2,843,763, Response filed May 12, 2015 to Office Action dated Dec. 4, 2014", 31 pgs.
"Canadian Application Serial No. 2,880,350 Examiner's Rule 86 2 Requisition dated Jun. 20, 2022", 3 pgs.
"Canadian Application Serial No. 2,880,350, Examiner's Rule 30(2) Requisition dated May 1, 2019", 4 pgs.
"Canadian Application Serial No. 2,880,350, Response filed Oct. 6, 2022 to Examiner's Rule 86 2 Requisition dated Jun. 20, 2022", 25 pgs.
"Canadian Application Serial No. 2,880,350, Response filed Oct. 28, 2020 to Examiner's Rule 30(2) Requisition dated May 1, 2019", 36 pgs.
"Canadian Application Serial No. 2,880,350, Voluntary Amendment filed Apr. 29, 2021", 7 pgs.
"Canadian Application Serial No. 2,880,353, Office Action dated Apr. 29, 2019", 4 pgs.
"Canadian Application Serial No. 2,880,353, Response filed Oct. 29, 2019 to Office Action dated Apr. 29, 2019", 28 pgs.
"Canadian Application Serial No. 2,901,483, Office Action dated Jul. 19, 2017", 3 pgs.
"Canadian Application Serial No. 2,901,483, Office Action dated Nov. 23, 2016", 4 pgs.
"Canadian Application Serial No. 2,901,483, Response filed Jan. 16, 2018 to Office Action dated Jul. 19, 2017", 28 pgs.
"Canadian Application Serial No. 2,901,483, Response filed May 23, 2017 to Office Action dated Nov. 23, 2016", 40 pgs.
"Canadian Application Serial No. 2,901,484, Office Action dated Apr. 27, 2021", 4 pgs.
"Canadian Application Serial No. 2,901,484, Office Action dated Jun. 5, 2020", 6 pgs.
"Canadian Application Serial No. 2,901,484, Office Action dated Dec. 11, 2019", 6 pgs.
"Canadian Application Serial No. 2,901,484, Response filed Apr. 7, 2020 to Office Action dated Dec. 11, 2019", 25 pgs.
"Canadian Application Serial No. 2,901,484, Response filed Aug. 26, 2021 to Office Action dated Apr. 27, 2021", 9 pgs.
"Canadian Application Serial No. 2,901,484, Response filed Sep. 29, 2020 to Office Action dated Jun. 5, 2020", 20 pgs.
"Canadian Application Serial No. 2,901,492, Office Action dated Jan. 29, 2020", 4 pgs.
"Canadian Application Serial No. 2,901,495, Office Action dated Jan. 29, 2020", 4 pgs.
"Canadian Application Serial No. 2,901,495, Response filed May 13, 2021 to Office Action dated Jan. 29, 2020", 23 pgs.
"Canadian Application Serial No. 2,904,224, Office Action dated Jan. 3, 2020", 4 pgs.
"Canadian Application Serial No. 2,904,224, Response filed May 11, 2021 to Office Action dated Jan. 3, 2020", 36 pgs.
"Canadian Application Serial No. 2,958,480, Office Action dated Sep. 16, 2021", 4 pgs.
"Canadian Application Serial No. 2,958,480, Response filed Jan. 17, 2022 to Office Action dated Sep. 16, 2021", 12 pgs.
"Canadian Application Serial No. 2,986,055, Office Action dated Dec. 12, 2022", 5 pgs.
"Canadian Application Serial No. 2,986,058, Office Action dated Jul. 27, 2022", 3 pgs.

(56) References Cited

OTHER PUBLICATIONS

"Canadian Application Serial No. 3,016,808, Non Final Office Action dated Mar. 9, 2022", 3 pgs.
"Canadian Application Serial No. 3,016,808, Response filed Jul. 11, 2022 to Non Final Office Action dated Mar. 9, 2022", w/o Claims, 2 pgs.
"Canadian Application Serial No. 3,016,808, Voluntary Amendment dated Feb. 11, 2022.", 31 pgs.
"Canadian Application Serial No. 3,034,592, Office Action dated Mar. 17, 2020", 5 pgs.
"Canadian Application Serial No. 3,034,592, Response filed Jul. 14, 2020 to Office Action dated Mar. 17, 2020", 20 pgs.
"Canadian Application Serial No. 3,046,529, Office Action dated Mar. 5, 2020", 4 pgs.
"Canadian Application Serial No. 3,046,529, Office Action dated Sep. 18, 2019", 6 pgs.
"Canadian Application Serial No. 3,046,529, Response filed Aug. 26, 2021 to Office Action dated Mar. 5, 2020", 15 pgs.
"Canadian Application Serial No. 3,046,529, Response filed Nov. 14, 2019 to Office Action dated Sep. 18, 2019", 9 pgs.
"Canadian Application Serial No. 3,060,328, Examiners Rule 86(2) Report dated Jun. 12, 2023", 3 pgs.
"Canadian Application Serial No. 3,060,332, Examiners Rule 86(2) Report dated Jun. 13, 2023", 4 pgs.
"Canadian Application Serial No. 3, 167,769, Examiners Rule 86(2) Requisition dated Jan. 13, 2023", 4 pgs.
"Canadian Application Serial No. 3129123 Examiner's Rule 86 2 Report dated Nov. 25, 2022", 3 pgs.
"Canadian Application Serial No. 3148296, Examiners Rule 86(2) Requisition dated Dec. 9, 2022", 3 pgs.
"Canadian Application Serial No. 3148296, Voluntary Amendment filed Jun. 30, 2022", 17 pgs.
"Chapter 8—Heating, Ventilating, and Air Conditioning (HVAC) Demonstration", HVAC Demonstration, (published prior to Feb. 21, 2014), 16 pgs.
"Chinese Application Serial No. 201280006006.9, Office Action dated Feb. 2, 2016", w/ English Summary, 19 pgs.
"Chinese Application Serial No. 201280006006.9, Response filed Apr. 8, 2016 to Office Action dated Feb. 2, 2016", w/ English Translation of Claims, 64 pgs.
"Chinese Application Serial No. 201280006006.9, Voluntary Amendment filed Apr. 14, 2014", w/ English Translation of Claims, 83 pgs.
"Chinese Application Serial No. 201180031103.9, Office Action dated Feb. 11, 2015", w/ English Translation, 16 pgs.
"Chinese Application Serial No. 201180031103.9, Office Action dated Jun. 13, 2014", w/ English Translation, 19 pgs.
"Chinese Application Serial No. 201180031103.9, Office Action dated Sep. 9, 2015", w/ English Translation, 7 pgs.
"Chinese Application Serial No. 201180031103.9, Office Action dated Nov. 6, 2015", w/ English Translation, 5 pgs.
"Chinese Application Serial No. 201180031103.9, Response filed Apr. 27, 2015 to Office Action dated Feb. 11, 2015", w/ English Translation, 15 pgs.
"Chinese Application Serial No. 201180031103.9, Response filed Sep. 26, 2014 to Office Action dated Jun. 13, 2014", w/ English Translation, 12 pgs.
"Chinese Application Serial No. 201180031103.9, Response filed Sep. 29, 2015 to Office Action dated Sep. 9, 2015", w/ English Translation, 78 pgs.
"Chinese Application Serial No. 201280006006.9, Office Action dated May 13, 2015", w/ English Translation, 7 pgs.
"Chinese Application Serial No. 201280006006.9, Office Action dated Aug. 15, 2016", w/ English Translation, 18 pgs.
"Chinese Application Serial No. 201280006006.9, Response filed Sep. 28, 2015 to Office Action dated May 13, 2015", w/ English Translation of Claims, 71 pgs.
"Chinese Application Serial No. 201280006006.9, Response filed Dec. 30, 2016 to Office Action dated Aug. 15, 2016", w/ English Translation of Claims, 69 pgs.

"Chinese Application Serial No. 201280042778.8, Office Action dated Feb. 3, 2016", w/ English Translation, 9 pgs.
"Chinese Application Serial No. 201280042778.8, Office Action dated Sep. 7, 2016", w/ English Translation of Claims, 17 pgs.
"Chinese Application Serial No. 201280042778.8, Response filed May 25, 2016 to Office Action dated Feb. 3, 2016", w/ English Translation, 11 pgs.
"Chinese Application Serial No. 201280042778.8, Response filed Nov. 16, 2016 to Office Action dated Sep. 7, 2016", w/ English Translation, 44 pgs.
"Chinese Application Serial No. 201380042926.0, Decision of Reexamination—Upholding Decision of Rejection dated Mar. 15, 2019", w/ English Translation, 18 pgs.
"Chinese Application Serial No. 201380042926.0, Decision of Rejection dated Jan. 5, 2018", w/ English Claims, 11 pgs.
"Chinese Application Serial No. 201380042926.0, Notice of Reexamination dated Aug. 23, 2018", w/ English Machine Translation, 18 pgs.
"Chinese Application Serial No. 201380042926.0, Office Action dated Feb. 26, 2016", w/ English Translation, 15 pgs.
"Chinese Application Serial No. 201380042926.0, Office Action dated May 11, 2017", W/ English Translation, 13 pgs.
"Chinese Application Serial No. 201380042926.0, Office Action dated Sep. 28, 2016", w/ English Translation, 12 pgs.
"Chinese Application Serial No. 201380042926.0, Request for Reexamination filed Apr. 20, 2018 to Decision of Rejection dated Jan. 5, 2018", w/ English claims, 52 pgs.
"Chinese Application Serial No. 201380042926.0, Response filed Feb. 13, 2017 to Office Action dated Sep. 28, 2016", w/ English Translation of Amended Claims, 56 pgs.
"Chinese Application Serial No. 201380042926.0, Response filed Jul. 7, 2016 to Office Action dated Feb. 26, 2016", w/ English Translation of Claims, 40 pgs.
"Chinese Application Serial No. 201380042926.0, Response filed Sep. 26, 2017 to Office Action dated May 11, 2017", w/ English Translation of Claims (not amended), 13 pgs.
"Chinese Application Serial No. 201380042926.0, Response filed Dec. 7, 2018 to Notice of Reexamination dated Aug. 23, 2018", w/ English Translation, 15 pgs.
"Chinese Application Serial No. 201380044484.3, Examiner Interview Summary Jan. 3, 2018", w/ English Translation, 1 pg.
"Chinese Application Serial No. 201380044484.3, Office Action dated Jan. 13, 2017", w/ English Translation, 16 pgs.
"Chinese Application Serial No. 201380044484.3, Office Action dated Mar. 28, 2016", w/ English Translation, 16 pgs.
"Chinese Application Serial No. 201380044484.3, Office Action dated Jul. 31, 2017", w/ English Translation, 21 pgs.
"Chinese Application Serial No. 201380044484.3, Response filed Jan. 3, 2018 to Examiner Interview Summary Jan. 3, 2018", w/ English claims, 53 pgs.
"Chinese Application Serial No. 201380044484.3, Response filed Mar. 28, 2017 to Office Action dated Jan. 13, 2017", w/ English Translation of Claims, 58 pgs.
"Chinese Application Serial No. 201380044484.3, Response filed Oct. 12, 2016 to Office Action dated Mar. 28, 2016", w/ English Translation of Claims, 54 pgs.
"Chinese Application Serial No. 201380044484.3, Response filed Oct. 12, 2017 to Office Action dated Jul. 31, 2017", w/ English Translation of Claims, 54 pgs.
"Chinese Application Serial No. 201480014783.7, Office Action dated Mar. 26, 2018", w/ English Translation, 16 pgs.
"Chinese Application Serial No. 201480014783.7, Office Action dated Jun. 30, 2017", w/ English Translation, 19 pgs.
"Chinese Application Serial No. 201480014783.7, Response filed Jun. 11, 2018 to Office Action dated Mar. 26, 2018", w/ English claims, 18 pgs.
"Chinese Application Serial No. 201480014783.7, Response filed Nov. 10, 2017 to Office Action dated Jun. 30, 2017", w/ English Claims, 48 pgs.
"Chinese Application Serial No. 201480015355.6, Decision of Rejection mailed Mar. 18, 2019", w/ English Translation, 7 pgs.
"Chinese Application Serial No. 201480015355.6, Office Action dated Jun. 14, 2018", w/ English Translation, 16 pgs.

(56) References Cited

OTHER PUBLICATIONS

"Chinese Application Serial No. 201480015355.6, Office Action dated Oct. 13, 2017", w/ English Translation, 18 pgs.
"Chinese Application Serial No. 201480015355.6, Office Action dated Nov. 28, 2016", w/ English Translation, 16 pgs.
"Chinese Application Serial No. 201480015355.6, Response filed Feb. 28, 2018 to Office Action dated Oct. 13, 2017", w/ English claims, 36 pgs.
"Chinese Application Serial No. 201480015355.6, Response filed Jun. 13, 2017 to Office Action dated Nov. 28, 2016", w/ English Translation of Claims, 36 pgs.
"Chinese Application Serial No. 201480015355.6, Response filed Dec. 4, 2018 to Office Action dated Jun. 14, 2018", w/ English claims, 16 pgs.
"Chinese Application Serial No. 201480015422.4, Office Action dated Nov. 1, 2016", w/ English Translation, 13 pgs.
"Chinese Application Serial No. 201480015422.4, Response filed May 12, 2017 to Office Action dated Nov. 1, 2016", w/ English Translation of Claims, 47 pgs.
"Chinese Application Serial No. 201480015766.5, Office Action dated Oct. 19, 2016", w/ English Translation, 9 pgs.
"Chinese Application Serial No. 201480015766.5, Response filed Jan. 20, 2017 to Office Action dated Oct. 19, 2016", w/ English Translation of Claims, 52 pgs.
"Chinese Application Serial No. 201480016150.X, Office Action dated Jun. 19, 2017", w/ English Translation, 22 pgs.
"Chinese Application Serial No. 201480016150.X, Response filed Nov. 2, 2017 to Office Action dated Jun. 19, 2017", w/ English Claims, 82 pgs.
"Chinese Application Serial No. 201580053421.3, Office Action dated Sep. 17, 2019", w/ English Translation, 31 pgs.
"Chinese Application Serial No. 201680038134.X, Office Action dated Apr. 7, 2020", with English translation, 29 pages.
"Chinese Application Serial No. 201680038134.X, Office Action dated Jul. 8, 2019", w/ English Translation, 30 pgs.
"Chinese Application Serial No. 201680038134.X, Response filed Jan. 23, 2020 to Office Action dated Jul. 8, 2019", with English claims, 32 pages.
"Chinese Application Serial No. 201680038134.X, Response filed Aug. 24, 2020 to Office Action dated Apr. 7, 2020", with English claims, 24 pages.
"Chinese Application Serial No. 201680038134.X, Response to Examiner Telephone Interview filed Oct. 20, 2020", with English claims, 26 pages.
"Chinese Application Serial No. 201680038135.4, Office Action dated Apr. 8, 2021", with English Machine Translation, 7 pages.
"Chinese Application Serial No. 201680038135.4, Office Action dated Jun. 28, 2020", with English translation, 25 pages.
"Chinese Application Serial No. 201680038135.4, Office Action dated Aug. 26, 2019", w/ English Translation, 23 pgs.
"Chinese Application Serial No. 201680038135.4, Response filed Mar. 10, 2020 to First Office Action dated Aug. 26, 2019", with English claims, 12 pages.
"Chinese Application Serial No. 201680038135.4, Response filed Nov. 13, 2020 to Office Action dated Jun. 28, 2020", with current English claims, claims not amended in response filed, 8 pages.
"Chinese Application Serial No. 201680048895.3, Office Action dated Apr. 15, 2020", with English translation, 12 pages.
"Chinese Application Serial No. 201680048895.3, Office Action dated Apr. 17, 2019", w/ English Translation, 33 pgs.
"Chinese Application Serial No. 201680048895.3, Response filed Aug. 31, 2020 to Office Action dated Apr. 15, 2020", with English claims, 25 pages.
"Chinese Application Serial No. 201680048895.3, Response filed Nov. 4, 2019 to Office Action dated Apr. 17, 2019", with English claims, 29 pages.
"Chinese Application Serial No. 201680048895.3, Response to Examiner Telephone Interview filed Oct. 2022, 20", with English claims, 22 pages.

"Chinese Application Serial No. 201710339973.1, Office Action dated Apr. 26, 2019", w/ English Translation, 9 pgs.
"Chinese Application Serial No. 201710339973.1, Response filed Jul. 3, 2019 to Office Action dated Apr. 26, 2019", w/ English Claims, 14 pgs.
"Chinese Application Serial No. 201710708143.1, Office Action dated Aug. 16, 2019", w/ English Translation, 10 pgs.
"Chinese Application Serial No. 201710708143.1, Office Action dated Dec. 29, 2018", w/ English Translation, 9 pgs.
"Chinese Application Serial No. 201710708143.1, Response filed Apr. 29, 2019 to Office Action dated Dec. 29, 2018", w/ English Claims, 10 pgs.
"Chinese Application Serial No. 201710708143.1, Response filed Sep. 27, 2019 to Office Action dated Aug. 16, 2019", with English claims, 10 pages.
"Chinese Application Serial No. 201780027034.1, Office Action dated Mar. 5, 2021", with English translation, 7 pages.
"Chinese Application Serial No. 201780027034.1, Office Action dated Apr. 13, 2020", with English translation, 35 pages.
"Chinese Application Serial No. 201780027034.1, Response filed Oct. 28, 2020 to Office Action dated Apr. 13, 2020", with English claims, 46 pages.
"Chinese Application Serial No. 201780027034.1, Response filed Oct. 28, 2020 to Office Action dated Apr. 13, 2020", with English claims, 39 pages.
"Chinese Application Serial No. 201780092213.3, Response Filed Apr. 14, 2022 to Decision of Rejection mailed Dec. 30, 2021", 6 pgs.
"Chinese Application Serial No. 201810432187.0, Office Action dated Jan. 16, 2020", with English translation, 12 pages.
"Chinese Application Serial No. 201910516006.7, Office Action dated Mar. 1, 2021", with English Summary, 9 pages.
"Chinese Application Serial No. 201910516006.7, Office Action dated Jul. 2, 2020", with English translation, 16 pages.
"Chinese Application Serial No. 201910516006.7, Response filed Jan. 18, 2021 to Office Action dated Jul. 2, 2020", with English claims, 21 pages.
"Chinese Application Serial No. 201910516006.7, Voluntary Amendment filed Feb. 10, 2020", with English claims, 15 pages.
"Chinese Application Serial No. 202210506642.3, Voluntary Amendment filed Dec. 13, 2022", w/ English Claims, 40 pgs.
"Dehumidification Solutions", Des Champs Laboratories, Inc., (2001), 18 pgs.
"Desi-WringerTM Precision Desiccant Dehumidification Systems", Des Champs Technologies, (2007), 12 pgs.
"Energy Recovery—Fresh In Air Quality", SEMCO Inc., (published before Apr. 12, 2012), 131 pgs.
"European Application Serial No. 11797695.1, Communication Pursuant to Article 94(3) EPC dated Jan. 12, 2022", 7 pgs.
"European Application Serial No. 11797695.1, Communication Pursuant to Article 94(3) EPC dated Aug. 24, 2018", 5 pgs.
"European Application Serial No. 11797695.1, Communication Pursuant to Article 94(3) EPC dated Nov. 19, 2020", 5 pgs.
"European Application Serial No. 11797695.1, Extended European Search Report dated Jan. 25, 2016", 11 pgs.
"European Application Serial No. 11797695.1, Partial Supplementary European Search Report dated Oct. 7, 2015", 6 pgs.
"European Application Serial No. 11797695.1, Response filed Jan. 9, 2019 to Communication Pursuant to Article 94(3) EPC dated Aug. 24, 2018", 11 pgs.
"European Application Serial No. 11797695.1, Response filed Mar. 26, 2021 to Communication Pursuant to Article 94(3) EPC dated Nov. 19, 2020", 3 pgs.
"European Application Serial No. 11797695.1, Response filed Jul. 20, 2022 to Communication Pursuant to Article 94(3) EPC dated Jan. 12, 2022", 10 pgs.
"European Application Serial No. 11797695.1, Response filed Aug. 22, 2016 to Office Action dated Feb. 11, 2016", 9 pgs.
"European Application Serial No. 12736074.1, Extended European Search Report dated Jul. 13, 2015", 8 pgs.
"European Application Serial No. 12736074.1, Response filed Oct. 2, 2015 to Extended European Search Report dated Jul. 13, 2015", 10 pgs.

(56) References Cited

OTHER PUBLICATIONS

"European Application Serial No. 12827918.9, Extended European Search Report dated Jul. 6, 2015", 6 pgs.

"European Application Serial No. 12827918.9, Response filed Sep. 28, 2015 to Extended European Search Report dated Jul. 6, 2015", 8 pgs.

"European Application Serial No. 13830357.3, Extended European Search Report dated Jun. 8, 2016", 5 pgs.

"European Application Serial No. 13830357.3, Response filed Dec. 23, 2016 to Extended European Search Report dated Jun. 8, 2016", 11 pgs.

"European Application Serial No. 13830940.6, Extended European Search Report dated Jul. 4, 2016", 5 pgs.

"European Application Serial No. 13830940.6, Response filed Jan. 16, 2017 to Communication Pursuant to Rules 70(2) and 70a(2) EPC dated Jul. 21, 2016", 1 pg.

"European Application Serial No. 14764192.2, Extended European Search Report dated Oct. 27, 2016", 7 pgs.

"European Application Serial No. 14764192.2, Response filed Jan. 30, 2017 to Extended European Search Report dated Oct. 27, 2016", 19 pgs.

"European Application Serial No. 14764192.2, Response filed Apr. 13, 2016 to Communication Pursuant Rules 161(2) and 162 EPC dated Nov. 19, 2015", 9 pgs.

"European Application Serial No. 14764305.0, Communication Pursuant to Article 94(3) EPC dated Feb. 14, 2019", 4 pgs.

"European Application Serial No. 14764305.0, Extended European Search Report dated Apr. 4, 2017", 8 pgs.

"European Application Serial No. 14764305.0, Response filed Apr. 13, 2016 to Communication Pursuant to Article 94(3) EPC dated Oct. 8, 2015", 10 pgs.

"European Application Serial No. 14764305.0, Response filed Jun. 21, 2019 to Communication Pursuant to Article 94(3) EPC dated Feb. 14, 2019", 24 pgs.

"European Application Serial No. 14764305.0, Response filed Oct. 31, 2017 to Extended European Search Report dated Apr. 4, 2017", 7 pgs.

"European Application Serial No. 14764318.3, Extended European Search Report dated Mar. 15, 2017", 10 pgs.

"European Application Serial No. 14764318.3, Response filed Jan. 28, 2016 to Communication pursuant to Rules 161(1) and 162 EPC dated Nov. 19, 2015", 17 pgs.

"European Application Serial No. 14764318.3, Response filed Oct. 10, 2017 to Extended European Search Report dated Mar. 15, 2017", 11 pgs.

"European Application Serial No. 14764713.5, Communication pursuant to Article 94(3) EPC dated Dec. 18, 2018", 3 pgs.

"European Application Serial No. 14764713.5, Extended European Search Report dated Dec. 9, 2016", 6 pgs.

"European Application Serial No. 14764713.5, Response filed Jan. 28, 2016 to Communication pursuant to Rules 161(1) and 162 EPC dated Dec. 2, 2015", 9 pgs.

"European Application Serial No. 14764713.5, Response filed Jun. 28, 2019 to Communication pursuant to Article 94(3) EPC dated Dec. 18, 2018", 8 pgs.

"European Application Serial No. 14764713.5, Response filed Jul. 13, 2017 to Extended European Search Report dated Dec. 9, 2016", 9 pgs.

"European Application Serial No. 14765396.8, Communication Pursuant to Article 94(3) EPC dated Dec. 5, 2018", 4 pgs.

"European Application Serial No. 14765396.8, Extended European Search Report dated Oct. 28, 2016", 6 pgs.

"European Application Serial No. 14765396.8, Office Action dated Nov. 20, 2015", 2 pgs.

"European Application Serial No. 14765396.8, Response filed Jan. 29, 2016 to Office Action dated Nov. 20, 2015", 12 pgs.

"European Application Serial No. 14765396.8, Response filed May 23, 2019 to Communication Pursuant to Article 94(3) EPC dated Dec. 5, 2018", 16 pgs.

"European Application Serial No. 14765396.8, Response filed May 25, 2017 to Extended European Search Report dated Oct. 28, 2016", 5 pgs.

"European Application Serial No. 15834201.4, Extended European Search Report dated Mar. 16, 2018", 8 pgs.

"European Application Serial No. 15834201.4, Response filed Oct. 9, 2017 to Communication Pursuant to Rules 161(2) and 162 EPC dated Mar. 29, 2017", 15 pgs.

"European Application Serial No. 15834201.4, Response filed Oct. 15, 2018 to Extended European Search Report dated Mar. 16, 2018", 17 pgs.

"European Application Serial No. 16795581.4, Extended European Search Report dated Feb. 12, 2019", 9 pgs.

"European Application Serial No. 16795581.4, Response filed Aug. 6, 2018 to Communication Pursuant to Rules 161(2) and 162 EPC dated Jan. 26, 2018", 16 pgs.

"European Application Serial No. 16795581.4, Response filed Sep. 11, 2019 to Extended European Search Report dated Feb. 12, 2019", 14 pgs.

"European Application Serial No. 16795582.2, Extended European Search Report dated Nov. 20, 2018", 8 pgs.

"European Application Serial No. 16795582.2, Response filed Jun. 17, 2019 to Extended European Search Report dated Nov. 20, 2018", 16 pgs.

"European Application Serial No. 16795582.2, Response filed Jul. 17, 2018 to Communication Pursuant to Rules 161(2) and 162 EPC dated Jan. 8, 2018", 12 pgs.

"European Application Serial No. 16813836.0, Communication Pursuant to Article 94(3) EPC dated Mar. 24, 2020", 5 pgs.

"European Application Serial No. 16813836.0, Extended European Search Report dated Mar. 25, 2019", 9 pgs.

"European Application Serial No. 16813836.0, Partial Supplementary European Search Report dated Dec. 5, 2018", 11 pgs.

"European Application Serial No. 16813836.0, Response filed Aug. 3, 2020 to Communication Pursuant to Article 94(3) EPC dated Mar. 24, 2020", 8 pgs.

"European Application Serial No. 16813836.0, Response filed Aug. 21, 2018 to Communication Pursuant to Rules 161(2) and 162 EPC dated Feb. 13, 2018", 37 pgs.

"European Application Serial No. 16813836.0, Response to Extended European Search Report dated Mar. 25, 2019", 11 pgs.

"European Application Serial No. 17762365.9, Communication Pursuant to Article 94(3) EPC dated Dec. 9, 2021", 6 pgs.

"European Application Serial No. 17762365.9, Extended European Search Report dated Oct. 17, 2019", 8 pgs.

"European Application Serial No. 17762365.9, Response filed Apr. 19, 2022 to Communication Pursuant to Article 94(3) EPC dated Dec. 9, 2021", 29 pgs.

"European Application Serial No. 17762365.9, Response filed Apr. 25, 2019 to Communication Pursuant to Rules 161 and 162 dated Oct. 16, 2018", 12 pgs.

"European Application Serial No. 17762365.9, Response filed May 15, 2020 to Extended European Search Report dated Oct. 17, 2019", 13 pgs.

"European Application Serial No. 17906575.0, Communication Pursuant to Article 94(3) EPC dated Oct. 31, 2022", 4 pgs.

"European Application Serial No. 17906575.0, Response filed Mar. 8, 2023 to Communication Pursuant to Article 94(3) EPC dated Oct. 31, 2022", 17 pgs.

"European Application Serial No. 18153408.2, Communication Pursuant to Rule 55 EPC dated May 17, 2018", 2 pgs.

"European Application Serial No. 18153408.2, Extended European Search Report dated Dec. 4, 2018", 5 pgs.

"European Application Serial No. 18153408.2, Response filed Jul. 2, 2019 to Extended European Search Report dated Dec. 4, 2018", 12 pgs.

"European Application Serial No. 18160812.6, Communication Pursuant to Article 94(3) EPC dated Nov. 19, 2020", 4 pgs.

"European Application Serial No. 18160812.6, Extended European Search Report dated Feb. 11, 2019", 6 pgs.

"European Application Serial No. 18160812.6, Response filed Mar. 2, 2021 to Communication Pursuant to Article 94(3) EPC dated Nov. 19, 2020", 2 pgs.

(56) References Cited

OTHER PUBLICATIONS

"European Application Serial No. 18160812.6, Response filed Aug. 6, 2019 to Extended European Search Report dated Feb. 11, 2019", 23 pgs.
"European Application Serial No. 18211142.7, Extended European Search Report dated Apr. 11, 2019", 6 pgs.
"European Application Serial No. 18211142.7, Response filed Aug. 8, 2019 to Extended European Search Report dated Apr. 11, 2019", 10 pgs.
"European Application Serial No. 18214518.5, Extended European Search Report dated Apr. 17, 2019", 5 pgs.
"European Application Serial No. 18214518.5, Response filed Jul. 16, 2019 to Extended European Search Report dated Apr. 17, 2019", 3 pgs.
"European Application Serial No. 20180081.0, Extended European Search Report dated Sep. 28, 2020", 7 pgs.
"European Application Serial No. 20180081.0, Response filed Apr. 20, 2021 to Extended European Search Report dated Sep. 28, 2020", 11 pgs.
"European Application Serial No. 21154403.6, Extended European Search Report dated Apr. 26, 2021", 8 pgs.
"European Application Serial No. 21154403.6, Response filed Dec. 9, 2021 to Extended European Search Report dated Apr. 26, 2021", 15 pgs.
"European Application Serial No. 21212796.3, Extended European Search Report dated Aug. 1, 2022", 11 pgs.
"European Application Serial No. 23155095.5, Extended European Search Report dated Mar. 31, 2023", 11 pgs.
"Indian Application Serial No. 201717044889, First Examination Report dated Dec. 17, 2020", with English translation, 6 pages.
"Indian Application Serial No. 201717044889, Response filed Jun. 14, 2021 to First Examination Report dated Dec. 17, 2020", with English translation, 82 pages.
"Indian Application Serial No. 201717044890, First Examination Report dated Oct. 23, 2020", with English translation, 6 pages.
"Indian Application Serial No. 201817002765, First Examination Report dated Dec. 24, 2019", with English translation, 6 pages.
"Indian Application Serial No. 201817002765, Response filed Sep. 24, 2020 to First Examination Report dated Dec. 24, 2019", with English translation, 30 pages.
"Indian Application Serial No. 201817037404, First Examination Report dated Feb. 19, 2021", with English translation, 7 pages.
"Indian Application Serial No. 201817037404, Response filed Aug. 16, 2021 to First Examination Report dated Feb. 19, 2021", 24 pgs.
"Indian Application Serial No. 201917046207, Response filed Jul. 20, 2022 to First Examination Report dated Sep. 20, 2021", 34 pgs.
"Indian Application Serial No. 201917046210, Response filed Oct. 4, 2021 to First Examination Report dated Jun. 9, 2021", 26 pgs.
"Indian Application Serial No. 201917046215, Response filed Mar. 31, 2022 to First Examination Report dated Sep. 9, 2021", 50 pgs.
"International Application Serial No. PCT/CA2012/000055, International Preliminary Report on Patentability dated Aug. 1, 2013", 9 pgs.
"International Application Serial No. PCT/CA2012/000055, International Search Report dated May 24, 2012", 4 pgs.
"International Application Serial No. PCT/CA2012/000055, Invitation to Pay Add'l Fees and Partial Search Report dated Mar. 23, 2012", 2 pgs.
"International Application Serial No. PCT/CA2012/000055, Written Opinion dated May 24, 2012", 7 pgs.
"International Application Serial No. PCT/CA2012/00055, International Preliminary Report on Patentability dated Aug. 1, 2013", 9 pgs.
"International Application Serial No. PCT/CA2012/00055, International Search Report dated May 24, 2012", 4 pgs.
"International Application Serial No. PCT/CA2012/00055, Written Opinion dated May 24, 2012", 7 pgs.
"International Application Serial No. PCT/CA2012/000749, International Search Report dated Oct. 26, 2012", 3 pgs.
"International Application Serial No. PCT/CA2012/000749, Written Opinion dated Oct. 26, 2012", 5 pgs.
"International Application Serial No. PCT/CA2013/000608, International Preliminary Report on Patentability dated Mar. 5, 2015", 7 pgs.
"International Application Serial No. PCT/CA2013/000608, International Search Report dated Sep. 23, 2013", 3 pgs.
"International Application Serial No. PCT/CA2013/000608, Written Opinion dated Sep. 23, 2013", 5 pgs.
"International Application Serial No. PCT/CA2013/000609, International Preliminary Report on Patentability dated Mar. 5, 2015", 7 pgs.
"International Application Serial No. PCT/CA2013/000609, International Search Report dated Sep. 17, 2013", 3 pgs.
"International Application Serial No. PCT/CA2013/000609, Written Opinion dated Sep. 17, 2013", 5 pgs.
"International Application Serial No. PCT/CA2013/000964, International Search Report dated Feb. 7, 2014", 3 pgs.
"International Application Serial No. PCT/CA2013/000964, Written Opinion dated Feb. 7, 2014", 6 pgs.
"International Application Serial No. PCT/CA2014/000048, International Preliminary Report on Patentability dated Sep. 24, 2015", 8 pgs.
"International Application Serial No. PCT/CA2014/000048, International Search Report dated Apr. 29, 2014", 3 pgs.
"International Application Serial No. PCT/CA2014/000048, Written Opinion dated Apr. 29, 2014", 6 pgs.
"International Application Serial No. PCT/CA2014/000083, International Preliminary Report on Patentability dated Sep. 24, 2015", 9 pgs.
"International Application Serial No. PCT/CA2014/000083, International Search Report dated May 14, 2014", 3 pgs.
"International Application Serial No. PCT/CA2014/000083, Written Opinion dated May 14, 2014", 7 pgs.
"International Application Serial No. PCT/CA2014/000148, International Preliminary Report on Patentability dated Sep. 24, 2015", 5 pgs.
"International Application Serial No. PCT/CA2014/000148, International Search Report dated May 9, 2014", 4 pgs.
"International Application Serial No. PCT/CA2014/000148, Written Opinion dated May 9, 2014", 3 pgs.
"International Application Serial No. PCT/CA2014/000169, International Preliminary Report on Patentability dated Sep. 24, 2015", 8 pgs.
"International Application Serial No. PCT/CA2014/000169, International Search Report dated May 27, 2014", 3 pgs.
"International Application Serial No. PCT/CA2014/000169, Written Opinion dated May 27, 2014", 6 pgs.
"International Application Serial No. PCT/CA2014/000171, International Preliminary Report on Patentability dated Sep. 24, 2015", 7 pgs.
"International Application Serial No. PCT/CA2014/000171, International Search Report dated May 27, 2014", 3 pgs.
"International Application Serial No. PCT/CA2014/000171, Written Opinion dated May 27, 2014", 5 pgs.
"International Application Serial No. PCT/CA2015/050570, International Search Report dated Sep. 1, 2015", 5 pgs.
"International Application Serial No. PCT/CA2015/050570, Written Opinion dated Sep. 1, 2015", 4 pgs.
"International Application Serial No. PCT/CA2015/050787, International Search Report dated Nov. 4, 2015", 3 pgs.
"International Application Serial No. PCT/CA2015/050787, Written Opinion dated Nov. 4, 2015", 3 pgs.
"International Application Serial No. PCT/CA2016/050252, International Preliminary Report on Patentability dated Nov. 30, 2017", 6 pgs.
"International Application Serial No. PCT/CA2016/050252, International Search Report dated May 26, 2016", 3 pgs.
"International Application Serial No. PCT/CA2016/050252, Written Opinion dated May 26, 2016", 4 pgs.
"International Application Serial No. PCT/CA2016/050507, International Preliminary Report on Patentability dated Nov. 30, 2017", 5 pgs.

(56) References Cited

OTHER PUBLICATIONS

"International Application Serial No. PCT/CA2016/050507, International Search Report dated Jul. 21, 2016", 3 pgs.
"International Application Serial No. PCT/CA2016/050507, Written Opinion dated Jul. 21, 2016", 3 pgs.
"International Application Serial No. PCT/CA2017/050180, International Preliminary Report on Patentability dated Sep. 20, 2018", 6 pgs.
"International Application Serial No. PCT/CA2017/050180, International Search Report dated Apr. 26, 2017", 3 pgs.
"International Application Serial No. PCT/CA2017/050180, Written Opinion dated Apr. 26, 2017", 4 pgs.
"International Application Serial No. PCT/IB2011/002145, International Preliminary Report on Patentability dated Jan. 10, 2013", 13 pgs.
"International Application Serial No. PCT/IB2011/002145, International Search Report dated Feb. 15, 2012", 7 pgs.
"International Application Serial No. PCT/IB2011/002145, Written Opinion dated Feb. 15, 2012", 11 pgs.
"International Application Serial No. PCT/IB2016/053799, International Preliminary Report on Patentability dated Jan. 4, 2018", 8 pgs.
"International Application Serial No. PCT/IB2016/053799, International Search Report dated Aug. 26, 2016", 3 pgs.
"International Application Serial No. PCT/IB2016/053799, Written Opinion dated Aug. 26, 2016", 6 pgs.
"International Application Serial No. PCT/US00/02956, International Preliminary Report on Patentability dated Jul. 9, 2001", 3 pgs.
"International Application Serial No. PCT/US00/02956, International Search Report dated Nov. 8, 2000", 1 pg.
"Machine Translation of JP 09113167 A", Espacenet Patent Translate, [Online] Retrieved from the internet: <URL: https://worldwide.espacenet.com/publicationDetails/description?CC=JP&NR=H09113167A&KC=A&FT=D&ND=3&date=19970502&DB=&locale=en_EP>, (retrieved Dec. 24, 2018), 7 pgs.
"Meeting Programs", ASHRAE Technical Committee, (1997-2001), 13 pgs.
"Munters PFC Polymer Fluid Cooler", Munters Corp., (Sep. 2015), 2 pgs.
"Oasis PFC Polymer Fluid Cooler Product Information", Munters Corp., (Nov. 2013), 2 pgs.
"Plane plate membrane contactor prototypes", University of Genoa, (Published prior to Mar. 28, 2013), 1 pg.
"Singapore Application Serial No. 11201710777Y, Office Action dated Jan. 31, 2019", in English, 7 pgs.
"Singapore Application Serial No. 11201710777Y, Response filed Jul. 1, 2019 to Office Action dated Jan. 31, 2019", in English, 31 pgs.
"Singaporean Application Serial No. 11201709404P, Response filed Jul. 22, 2019 to Written Opinion dated Feb. 22, 2019", in English, 62 pgs.
"Singaporean Application Serial No. 11201709404P, Written Opinion dated Feb. 22, 2019", in English, 8 pgs.
"Singaporean Application Serial No. 11201909648V, Response filed Jan. 25, 2022 to Written Opinion dated Aug. 25, 2021", 16 pgs.
"Singaporean Application Serial No. 11201909695X, Response Filed Jan. 26, 2022 to Written Opinion dated Aug. 26, 2021", W/out English Claims, 6 pgs.
"Translation of CN 201906567 U", Espacenet Patent Translate, [Online] Retrieved from the internet: <URL: http://translationportal.epo.org/emtp/translate/?ACTION=description-retrieval&COUNTRY=CN&ENGINE=google&FORMAT=docdb&KIND=U&LOCALE=en_EP&NUMBER=201906567&OPS=ops.epo.org/3.2&SRCLANG=zh&TRGLANG=en>, (Feb. 2, 2018), 4 pgs.
"Two-Wheel Desiccant Dehumidification System—Technology for Dehumidification and Improving Indoor Air Quality", Federal Technology Alert, (Apr. 1997), 24 pgs.

Abdel-Salam, Mohamed R.H., et al., "Design and testing of a novel 3-fluid liquid-to-air membrane energy exchanger (3-fluid LAMEE)", International Journal of Heat and Mass Transfer 92, (2016), 312-329.
Abdel-Salam, Mohamed R. H., et al., "Experimental Study of Effects of Phase-Change Energy and Operating Parameters on Performances of Two-Fluid and Three-Fluid Liquid-to-Air Membrane Energy Exchangers", ASHRAE Transactions, vol. 122, Part 1, (Jan. 2016), 134-145.
Abdel-Salam, Mohamed R. H., et al., "Performance testing of 2-fluid and 3-fluid liquid- to-air membrane energy exchangers for HVAC applications in cold-dry climates", International Journal of Heat and Mass Transfer, 106, (2017), 12 pgs.
Abdel-Salam, Mohamed R.H., et al., "Performance Testing of a Novel 3-Fluid Liquid-to-Air Membrane Energy Exchanger (3-Fluid LAMEE) for HVAC Applications", 28th Intl. Conference on Efficiency, Cost, Optimization, Simulation and Environmental Impact of Energy Systems (ECOS), Pau, France, (Jun. 30, 2015), 12 pgs.
Abdel-Salam, Mohamed R. H., et al., "Performance testing of a novel 3-fluid liquid-to-air membrane energy exchanger (3-fluid LAMEE) under desiccant solution regeneration operating conditions", International Journal of Heat and Mass Transfer, 95, (2015), 14 pgs.
Acker, William, "Industrial Dehumidification: Water Vapor Load Calculations And System Descriptions", HPAC Heating/Piping/Air Conditioning, (Mar. 1999), 49-59.
Bellia, L., et al., "Air Conditioning Systems With Desiccant Wheel for Italian Climates", International Journal on Architectural Science, vol. 1 No. 4, (2000), 193-213.
Bergero, Stefano, et al., "On the performances of a hybrid air-conditioning system in different climatic conditions", Energy 36(8), (2011), 13 pgs.
Bergero, Stefano, et al., "Performance analysis of a liquid desiccant and membrane contactor hybrid air-conditioning system", Energy and Buildings 42, (2010), 11 pgs.
Chant, Eileen E., et al., "A Steady-State Simulation Of An Advanced Desiccant-Enhanced Cooling And Dehumidification System", ASHRAE Transactions: Research, (Jul. 1992), 339-347.
Coad, William J., "Conditioning Ventilation Air for Improved Performance and Air Quality", HPAC Heating/Piping/Air Conditioning, (Sep. 1999), 6 pgs.
DiBlasio, Robert, "Desiccants in Hospitals—Conditioning A Research Facility", Engineered Systems, (Sep. 1995), 4 pgs.
Downing, et al., "Operation and Maintenance for Quality Indoor Air", Proc. of the 7th Symposium On Improving Building Systems in Hot and Humid Climates, Ft. Worth, TX, (Oct. 9, 1990), 5 pgs.
Downing, Chris, "Humidity Control—No Place Like Home", Engineered Systems, (1996), 4 pgs.
ERB, Blake, et al., "Experimental Measurements of a Run-Around Membrane Energy Exchanger (RAMEE) with Comparison to a Numerical Model", ASHRAE Transactions, vol. 115, Part 2, (2009), 689-705.
Fischer, J., et al., "Active Desiccant Dehumidification Module Integration With Rooftop Packaged HVAC Units—Final Report Phase 3B", Oak Ridge National Laboratory, Final Report: Phase 3B, (Mar. 2002), 36 pgs.
Fischer, John C., "Optimizing IAQ, Humidity Control, and Energy Efficiency In School Environments Through The Application Of Desiccant-Based Total Energy Recovery Systems", IAQ Atlanta: Paths to Better Building Environments/Environmental Effects on Heath and Productivity, (1996), 16 pgs.
Harriman, III, et al., "Dehumidification and Cooling Loads From Ventilation Air", ASHRAE Journal, (Nov. 1997), 7 pgs.
Harriman, III, et al., "Evaluating Active Desiccant Systems For Ventilating Commercial Buildings", ASHRAE Journal, (Oct. 1999), 7 pgs.
Harriman, III, et al., "New Weather Data For Energy Calculations", ASHRAE Journal, (Mar. 1999), 7 pgs.
Jeong, et al., "Energy Conservation Benefits of a Dedicated Outdoor Air System with Parallel Sensible Cooling By Ceiling Radiant Panels", ASHRAE Transactions; vol. 109. Part 2, (2003), 10 pgs.

(56) References Cited

OTHER PUBLICATIONS

Karniadakis, George E., et al., "Minimum-dissipation transport enhancement by flow destabilization: Reynolds' analogy revisited", J. Fluid Mech vol. 192, (1988), 365-391.

Kosar, Douglas R., et al., "Dehumidification Issues of Standard 62-1989", ASHRAE Journal, (Mar. 1998), 71-75.

Larson, Michael D., et al., "The elastic and moisture transfer properties of polyethylene and polypropylene membranes for use in liquid-to-air energy exchangers", Journal of Membrane Science 302, (2007), 14 pgs.

Larson, Michael David, et al., "The Performance of Membranes in a Newly Proposed Run-Around Heat and Moisture Exchanger", MS Thesis in Mechanical Engineering, University of Saskatchewan, Saskatoon, Canada, [Online] Retrieved from the internet: <URL: http://libran.usask.ca/theses/available/etd-12192006-094159/umestricted/LarsonThesis.pdf>, (Dec. 2006), 177 pgs.

Lepoudre, P., et al., "Channel Flow with Sinusoidal Screen Insert", Dept. of Mech Engineering, Univ. of Saskatchewan, Proceedings of the 19th Annual Conference of the CFD Society of Canada, Montreal, (Apr. 2011), 6 pgs.

Mahmud, Khizir, "Design and Performance Testing of Counter-Cross-Flow Run-Around Membrane Energy Exchanger System", MS Thesis in Mechanical Engineering, University of Saskatchewan, Saskatoon, Canada, [Online] Retrieved form the internet: <URL: http://libranusask.ca/theses/ available/ etd-09092009-223833/umestricted/KhizirMahmud2009-Sep-28a.pdf>, (Sep. 2009), 168 pgs.

Mahmud, Khizir, et al., "Performance testing of a counter-cross-flow run-around membrane energy exchanger (RAMEE) system for HVAC applications", Energy and Buildings, 42, (2010), 9 pgs.

McGahey, Kevin, et al., "Desiccants: Benefits for the Second Century of Air Conditioning", Proceedings of the 10th Symposium On Improving Building Systems In Hot and Humid Climates, Ft. Worth, Texas, (May 14, 1996), 9 pgs.

McGahey, Kevin, "New Commercial Applications For Desiccant-Based Cooling", ASHRAE Journal, (Jul. 1998), 41-45.

Mumma, Stanley A., et al., "Achieving Dry Outside Air in an Energy-Efficient Manner", ASHRAE Transactions 2001, vol. 107, Part 1, (2001), 8 pgs.

Mumma, Stanley A., "Dedicated Outdoor Air-Dual Wheel System Control Requirements", ASHRAE Transactions, vol. 107, Part 1, (2001), 9 pgs.

Mumma, Stanley A., et al., "Extension of the Multiple Spaces Concept of Ash Rae Standard 62 to Include Infiltration, Exhaust/Exfiltration, Interzonal Transfer, and Additional Short-Circuit Paths", ASHRAE Transactions: Symposia, (1998), 1232-1241.

Mumma, Stanley A, "Overview of Integrating Dedicated Outdoor Air Systems With Parallel Terminal Systems", ASHRAE Transactions vol. 107, Part 1, (2001), 7 pgs.

Nimmo, B. G., et al., "DEAC: Desiccant Enhancement of Cooling-Based Dehumidification", ASHRAE Transactions: Symposia, (1993), 842-848.

Philip, Lepoudre, et al., "U.S. Appl. No. 15/574,205", Specification, (Nov. 15, 2017), 32 pgs.

Philip, Lepoudre, et al., "U.S. Appl. No. 15/574,205", Drawings, (Nov. 15, 2017), 9 pgs.

Philip, Lepoudre, et al., "U.S. Appl. No. 15/574,205", Claims, (Nov. 15, 2017), 5 pgs.

Qin, C. K., et al., "Engine-driven Desiccant-assisted Hybrid Airconditioning System", 23rd World Gas Conference, Amsterdam, (2006), 15 pgs.

Ryan, K., et al., "Three-dimensional transition in the wake of bluff elongated cylinders", J. Fluid Mech., vol. 538, (2005), 29 pgs.

Scofield, C. Mike, et al., "HVAC Design for Classrooms: Divide and Conquer", Heating/Piping/Air Conditioning, (May 1993), 53-59.

Sevigny, Scoot P., et al., "Air Handling Unit Direct Digital Control System Retrofit To Provide Acceptable Indoor Air Quality And Global Energy Optimization", Energy Engineering, vol. 94, No. 5, (1997), 24-43.

Shank, Kurt M., et al., "Selecting the Supply Air Conditions for a Dedicated Outdoor Air System Working in Parallel with Distributed Sensible Cooling Terminal Equipment", ASHRAE Transactions, vol. 107, Part 1, (2001), 10 pgs.

Smith, Christopher S., et al., "Outdoor Air, Heat Wheels and JC Penny: A New Approach to Retail Ventilation", Proc. of the 11th Symposium On Improving Building Systems In Hot and Humid Climates, Ft. Worth, Texas, (Jun. 2, 1998), 1 pg.

Smith, James C., "Schools Resolve IAQ/Humidity Problems with Desiccant Preconditioning", Heating/Piping/Air Conditioning, (Apr. 1996), 6 pgs.

Sonin, Ain A., et al., "Optimization of Flow Design in Forced Flow Electrochemical Systems, with Special Application to Electrodialysis", Ind. Eng. Chem, Process Des. Develop vol. 13, No. 3, (1974), 8 pgs.

Swails, James F., et al., "A Cure for Growing Pains", Consulting Specifying Engineer, [Online] Retrieved from the internet: <URL: https://www.csemag.com>, (Jun. 1997), 4 pgs.

Turpin, Joanna, "Dehumidification: The Problem No One Wants To Talk About", [Online] Retrieved from the internet: <URL: http//www.esmagazine.com/copyrighVde12c1c879ba8010VgnVCM100000f932a8c0_?>, (Apr. 5, 2000), 6 pgs.

Vali, Alireza, "Modeling a Run-Around Heat and Moisture Exchanger Using Two Counter/Cross Flow Exchangers", MS Thesis in Mechanical Engineering, University of Saskatchewan, Saskatoon, Canada, [Online] Retrieved from the internet: <URL: http://library.usask.ca/theses/mailable/etd-06032009-15-J.6-J.-1./unrestricted/Vali.AlirezaThesis.pdf>, (2009), 193 pgs.

Vali, Alireza, et al., "Numerical model and effectiveness correlations for a run-around heat recovery system with combined counter and cross flow exchangers", International Journal of Heat and Mass Transfer 52, (2009), 14 pgs.

Woods, J, et al., "Desiccant Enhanced Evaporative Air Conditioning: Parametric Analysis and Design", 2nd International Conference on Building Energy and Environment (COBEE), (Oct. 2012), 10 pgs.

Yborra, Stephen C., "Field Evaluation of Desiccant-Integrated HVAC Systems: A Review of Case Studies in Multiple Commercial/Institutional Building Types", Proc. of the 11th Symposium On Improving Building Systems In Hot and Humid Climates, Ft. Worth, Texas, (Jun. 2, 1998), 10 pgs.

"Chinese Application Serial No. 202210506642.3, Office Action dated Sep. 12, 2023", w English Translation, 73 pgs.

"Canadian Application Serial No. 3,060,323, Examiners Rule 86(2) Report dated Sep. 13, 2023", 3 pgs.

"Canadian Application Serial No. 3,060,332, Response filed Oct. 10, 2023 to Examiners Rule 86(2) Report dated Jun. 13, 2023", 31 pgs.

"Canadian Application Serial No. 3,060,328, Response filed Oct. 5, 2023 to Examiners Rule 86(2) Report dated Jun. 12, 2023", 21 pgs.

"Chinese Application Serial No. 201780092213.3, Notice of Reexamination dated Oct. 27, 2023", With English machine translation, 27 pgs.

\* cited by examiner

DESICCANT ENHANCED EVAPORATIVE COOLING SYSTEMS AND METHODS

CLAIM OF PRIORITY

This application is a U.S. National Stage Filing under 35 U.S.C. § 371 from International Patent Application No. PCT/CA2017/050479, titled "DESICCANT ENHANCED EVAPORATIVE COOLING SYSTEMS AND METHODS," filed on Apr. 18, 2017 and published as WO 2018/191806 A1 on Oct. 25, 2018, the benefit of priority of which is claimed hereby, and which is incorporated by reference herein in its entirety.

BACKGROUND

There are many applications for which controlling the environmental conditions within an enclosed space is important—for example, cooling data centers. A data center usually consists of computers and associated components operating 24 hours a day, 7 days a week. The electrical components in data centers produce a lot of heat, which needs to be removed from the space. Air-conditioning systems in data centers can consume as much as 40% of the total energy.

Comfort cooling of residential, commercial and institutional buildings is predominantly done using vapor-compression cooling equipment. Many process applications, such as data centers, also use mechanical cooling for primary or supplemental cooling. In most of these applications, the required cooling temperature is moderate (for example, 50° F.-85° F.; 10° C.-30° C.). Mechanical cooling equipment can produce high cooling capacities, operate reliably and can have acceptable cost due to mass production of compressors, exchangers and other components. However, these systems require significant amounts of high grade electrical energy to operate. For example, about 15% of the total annual US domestic electricity production is consumed by air conditioning units. Moreover, about one-third of the peak demand in hot summer months is driven by air conditioning units, leading to issues with power grid loading and stability. The production of electricity remains carbon intensive, so electricity driven cooling systems can contribute significantly to emissions and global warming.

Thermoelectric power production requires vast amounts of water for cooling, and the US average water consumption (evaporated water) for combined thermoelectric and hydroelectric power production is about 2 gallons/kWh. The water consumed to produce the electricity required by an EER 11 air conditioner is about equivalent to the water consumed by a good efficiency evaporative cooling system producing an equivalent amount of cooling. However, evaporative cooling systems consume far less electricity. Vapor-compression also typically requires synthetic refrigerants operating at high pressures. The deployment of large quantities of refrigerants in air conditioning and refrigeration systems has resulted in safety, health and environmental concerns. Modern high efficiency refrigerants, such as HFCs, can have high global warming potential and are being phased out. There is currently no direct replacement refrigerant option that has all the desired properties in terms of efficiency, stability, flammability, toxicity, and environmental impact.

Evaporative cooling systems are used successfully in many applications, especially in dry climates. Direct evaporative coolers (DEC) can be simple in design and efficient, compared to, for example, vapor compression systems. However, conventional DECs can have some drawbacks. The supply air temperature coming out of the cooler may be challenging to control and is dependent on the outdoor air temperature and humidity level. The supply air may be excessively humid. These systems need careful maintenance to ensure that bacteria, algae, fungi and other contaminants do not proliferate in the water system and transfer into the supply air stream. Since these systems utilize direct contact between the evaporating liquid water and supply air, carry-over of contaminants into the air stream can occur, which can, in turn, lead to reduced indoor air quality, odors and "sick building syndrome." Also, buildup of mineral deposits in the unit and on the evaporative pads can reduce performance and require maintenance.

Indirect evaporative coolers address the humidity problem but typically operate at lower wet bulb efficiencies. State-of-the-art dew-point evaporative coolers can deliver lower cooling temperatures than conventional direct or indirect evaporative systems and can maintain cooling power to higher outdoor wet bulb temperatures. However, all evaporative cooling technologies lose cooling performance as the working air humidity rises and cannot be used in humid climates without supplemental (usually vapor compression) cooling equipment. The water usage efficiency of evaporative cooling systems also varies widely depending on the system design and control characteristics. The water usage of evaporative coolers can be a problem, or at least a perceived problem. For example, large scale data centers may consume large quantities of potable water. Moreover, for those locations in which evaporative cooling works best (dry climates), the water demand may not be sustainable.

Absorption chillers are increasingly being adopted for comfort and process cooling, especially when waste heat is available. These systems have been successfully commercialized for larger scale applications and can be a good alternative to mechanical cooling in integrated building designs where the required technical and maintenance support is available. Single-effect absorptions chillers have a COP less than one, so significant quantities of heat are required to drive the system. Current absorption chiller designs are intended to replace electric chillers and deliver comparable cooling temperatures (40° F.-50° F.; 4.4° C.-10° C.). This requires the use of specialized materials (alloy metals), vacuum vessels, multiple heat exchangers, relatively high grade heat input for the generator, control methods to prevent crystallization, etc. Higher efficiency double and triple effect designs are increasingly complex and expensive. The complexity, cost and maintenance requirements of absorption systems may limit their widespread acceptance as an alternative to mechanical cooling, especially in light commercial and residential applications.

There remains a need for alternative cooling technologies for comfort conditioning applications, which can largely replace mechanical cooling. The growing awareness of environmental impacts, electricity consumption and increasing regulatory pressure on refrigerants are pressing challenges for current HVAC cooling equipment. There is a need for a commercially viable design which meets requirements for capital and installation costs, operating costs, performance, reliability, size/weight restrictions, etc., while avoiding the creation of any new resource utilization problems, such as excessive water or gas consumption. The design should have good cooling performance and compactness, make use of low cost materials, and avoid the use of any environmentally harmful or toxic substances. From a thermodynamic perspective, the system should operate near atmospheric pressures with low grade heat input, employ moderate temperature changes and exchange fluxes to minimize irreversibility in the system and improve second law efficiency. Comfort conditioning may only require low grade cooling, and an exergy analysis shows how wasteful it is to use precious high grade energy sources such as electricity to drive cooling equipment.

BRIEF DESCRIPTION OF THE DRAWINGS

In the drawings, which are not necessarily drawn to scale, like numerals may describe similar components in different views. Like numerals having different letter suffixes may represent different instances of similar components, sub-components of a larger logical or physical system, or the like. The drawings illustrate generally, by way of example, but not by way of limitation, various examples described in the present disclosure.

OVERVIEW

Figure 1:
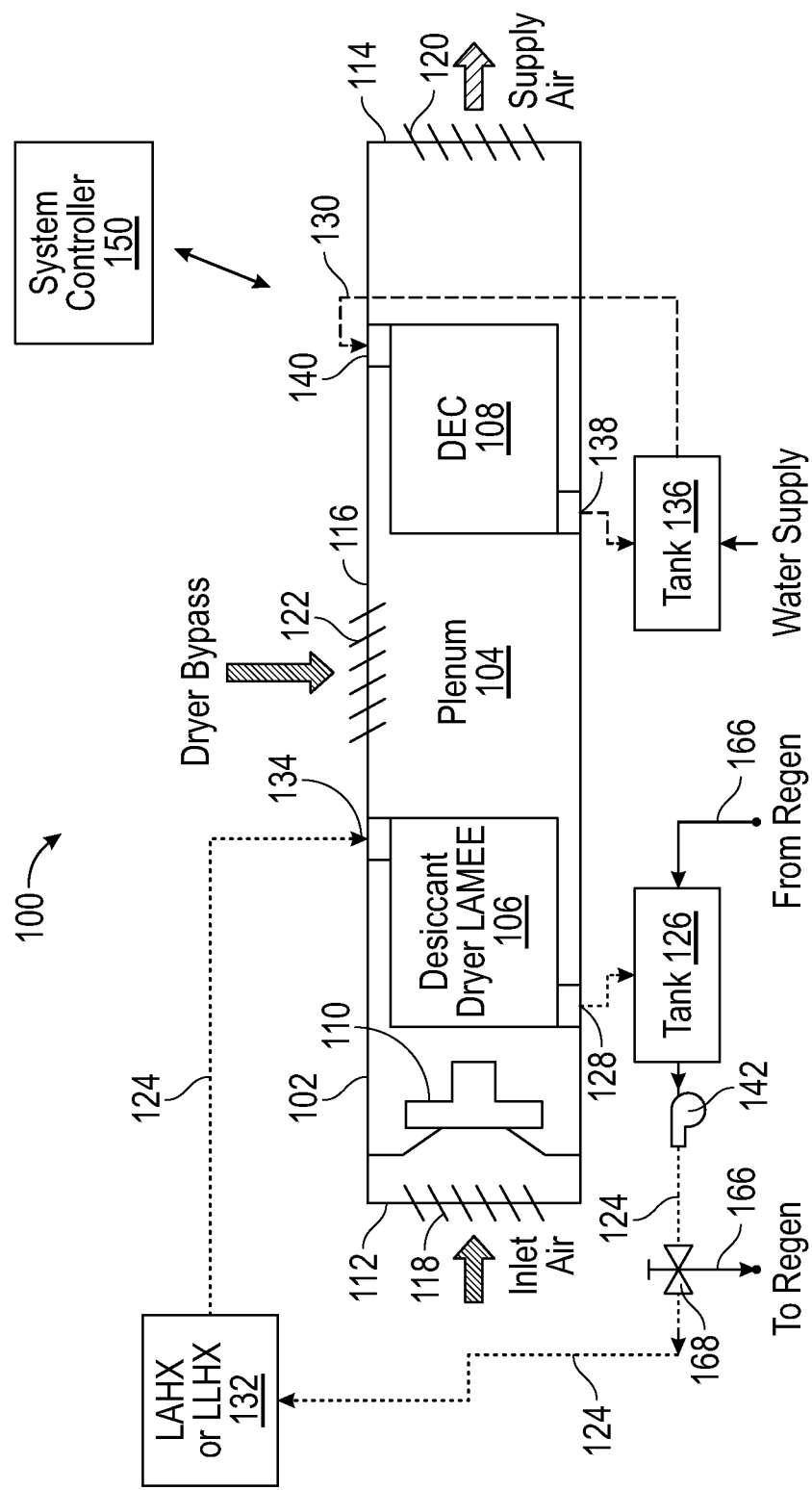
FIG. 1 schematically depicts an example conditioning system with a single working air stream, a desiccant dryer LAMEE and a direct evaporative cooler (DEC).

The inventor(s) recognize, among other things, an opportunity for improved performance in providing cooling to an enclosed space through design of a conditioning system using a first Liquid-to-Air Membrane Energy Exchanger (LAMEE) as a dehumidifier to dry the air in an air stream passing through the first LAMEE, thus lowering the enthalpy and dew point of the air, and then passing the air through a second LAMEE (or another type of direct evaporative cooler (DEC)) to evaporatively cool the air. The inventor(s) also recognize an opportunity to use the water removed from the air stream by the first LAMEE as a source of water supply for evaporative coolers in the system, including, for example, the second LAMEE/DEC, to reduce or eliminate the need for an external water supply.

Examples according to the present application can include systems for conditioning air for an enclosed space. A conditioning system can include a process plenum configured to direct air from a plenum inlet to a plenum outlet. A LAMEE can be arranged inside the process plenum and a DEC can be arranged inside the process plenum downstream of the LAMEE. The LAMEE can function as a pre-dryer and can be configured to circulate a desiccant through a desiccant flow path to remove at least one of water and heat from the air passing through the LAMEE. A membrane in the LAMEE can separate the desiccant from the air. Essentially all of the energy removed from the air in the LAMEE can be transferred to the desiccant. The DEC downstream of the LAMEE can be used to cool the air prior to delivering the air to the enclosed space.

In an example, the DEC can be a direct-contact DEC such that the evaporative fluid (water) in the DEC directly contacts the air for evaporative cooling. In an example, the DEC can be a non-contact DEC, in which case the evaporative fluid does not directly contact the air. An example of a non-contact DEC is a LAMEE functioning as an evaporative cooler. In such an example, the dryer LAMEE can be a first LAMEE and the DEC can be a second LAMEE.

In an example, the air passing through the plenum can be hot process air from the enclosed space. Once it exits the plenum, the air can be delivered to the enclosed space as conditioned air. In an example, the air passing through the plenum can be outdoor air that is conditioned inside the plenum such that the air can then be delivered to the enclosed space. In an example, the air passing through the plenum can be a combination of hot process air and outdoor air. In an example, the enclosed space can be a data center.

In an example, the conditioning system can include a regenerator to regenerate at least a portion of a dilute desiccant exiting the LAMEE, prior to recirculating the desiccant through the LAMEE. The regenerator can remove at least a portion of the water from the desiccant such that the regenerator can output a concentrated desiccant stream and a distilled water stream. In an example, the distilled water can be used as make up water for the DEC. The system can operate effectively with only a portion of the dilute desiccant from the LAMEE being regenerated.

Examples according to the present application can include a system for conditioning air for an enclosed space and the system can include a first LAMEE arranged inside a process plenum and a second LAMEE arranged inside the process plenum downstream of the first LAMEE. The first LAMEE can be configured to reduce the humidity of an air stream flowing there through and the second LAMEE can be configured to cool the air stream. In an example, the system can include a pre-cooler arranged inside the plenum between the first LAMEE and the second LAMEE.

In an example, the conditioning system can receive a mixture of hot process air from the enclosed space and outdoor air. In an example, the system can further comprise an exhaust plenum in fluid connection with the process plenum. A portion of the air in the process plenum can be diverted to the process plenum downstream of the first LAMEE. The air in the exhaust plenum can be used to provide cooling to water from an evaporative cooler in the process plenum, such as the pre-cooler arranged between the first and second LAMEEs. In an example, the exhaust plenum can include a third LAMEE, also referred to herein as an exhaust LAMEE.

In an example, the conditioning system can be used for commercial or residential applications. In an example, the enclosed space can be a residential home. In an example, the enclosed space can be a data center.

Examples according to the present application can include a method of conditioning air for an enclosed space and the method can include directing air through a LAMEE arranged inside a plenum and directing desiccant through the LAMEE. The LAMEE can be configured such that the desiccant can remove at least one of moisture and heat from the air. The air exiting the LAMEE can have a reduced moisture content relative to the air at an inlet of the LAMEE. The method can further include directing the air through a DEC arranged inside the plenum downstream of the LAMEE. The DEC can cool the air such that the air can be delivered to the enclosed space as reduced temperature or reduced humidity air.

In an example, the method can include regenerating at least a portion of the desiccant exiting the LAMEE. In an example, the method can include using the water recovered from the desiccant as make up water for operation of one or more evaporative coolers in the conditioning system.

This overview is intended to provide an overview of subject matter of the present patent application. It is not intended to provide an exclusive or exhaustive explanation of the invention. The detailed description is included to provide further information about the present patent application.

DETAILED DESCRIPTION

The present application relates to systems and methods for conditioning air for an enclosed space, and includes using a liquid to air membrane energy exchanger (LAMEE) as a desiccant dryer in combination with a direct evaporative cooler (DEC) located downstream of the desiccant dryer LAMEE. The desiccant dryer LAMEE can circulate a liquid desiccant, such as, for example, lithium chloride. The liquid desiccant and the LAMEE are described in further detail below. In an example, the DEC can be a LAMEE that operates as an evaporative cooler. The evaporative cooler LAMEE is an example of a non-contact DEC, as described below, since the evaporative fluid (water) and air are separated by a membrane. In an example, the DEC can be a direct contact DEC in which the water directly contacts the air.

In an example, the desiccant dryer LAMEE and DEC can be included in a system configured to condition hot process air (return air) from an enclosed space and return the process air to the enclosed space as cold, or reduced temperature process air (supply air). The desiccant dryer LAMEE can remove moisture from the hot process air, prior to passing the process air through the DEC. Dehumidification of the process air upstream of the DEC can facilitate efficient operation of the overall system and enable the DEC to cool the process air to lower temperatures. In another example, the desiccant dryer LAMEE and DEC can condition outdoor air and deliver the conditioned air to an enclosed space. In yet another example, the desiccant dryer LAMEE and DEC can condition a combination of process air and outdoor (makeup) air for delivery to an enclosed space. The system can be used to control or condition both a temperature and a humidity of the air stream being provided to the enclosed space.

A liquid to air membrane energy exchanger (LAMEE) can be used as part of a conditioning system to transfer heat and moisture between a liquid and an air stream, both flowing through the LAMEE, in order to condition the temperature and humidity of the air or to reduce a temperature of the liquid. In an example, the membrane in the LAMEE can be a non-porous film having selective permeability for water, but not for other constituents that may be present in the liquid. Many different types of liquids can be used in combination with the non-porous membrane, including, for example, water, liquid desiccants, glycols. In an example, the membrane in the LAMEE can be semi-permeable or vapor permeable, and generally anything in a gas phase can pass through the membrane and generally anything in a liquid phase cannot pass through the membrane. In an example, the membrane in the LAMEE can be micro-porous such that one or more gases can pass through the membrane. In an example, the membrane can be a selectively-permeable membrane such that some constituents, but not others, can pass through the membrane. It is recognized that the LAMEEs included in the conditioning systems disclosed herein can use any type of membrane suitable for use with an evaporative cooler LAMEE or a desiccant dryer LAMEE.

In an example, the LAMEE can use a flexible polymer membrane, which is vapor permeable, to separate air and water. Relative to other systems/devices, the water flow rate and air flow rate through the LAMEE may not be limited by concerns such as droplet carryover at high face velocities. In addition, the LAMEE can operate with water flow rates that enable the transport of thermal energy into the cooler similar to a cooling tower, and the elevated inlet water temperatures can boost the evaporative cooling power of the LAMEE.

The desiccant dryer LAMEE can circulate any type of liquid desiccant suitable for removing moisture from the air. In an example, the cooling fluid is a liquid desiccant that is a high concentration salt solution. The presence of salt can sanitize the cooling fluid to prevent microbial growth. In addition, the desiccant salt can affect the vapor pressure of the solution and allow the cooling fluid to either release or absorb moisture from the air. Examples of salt-based desiccants usable herein include lithium chloride, magnesium chloride, calcium chloride, lithium bromide, lithium iodide, potassium fluoride, zinc bromide, zinc iodide, calcium bromide, sodium iodide and sodium bromide. In an example, the liquid desiccant can include an acetate salt, such as, but not limited to, an aqueous potassium acetate and an aqueous sodium acetate.

In an example, the liquid desiccant can include a glycol or glycol-water solution. Glycols can be unsuitable for use in a direct contact exchanger because the glycol can evaporate into the air stream. A glycol based liquid desiccant can be used here with a non-porous membrane since the membrane can prevent the transfer of the glycol into the air. In an example, the liquid desiccant can include glycols, or glycol-based solutions, such as triethylene glycol and propylene glycol, which are non-toxic, compatible with most metals and comparatively low in cost. Glycols can be strongly hygroscopic at higher concentrations. For example, a 95% solution of triethylene glycol has a comparable drying/dehumidification potential to lithium chloride near saturation. Triethylene glycol and tripropylene glycol can have low vapor pressures, but can be expensive. Less expensive and higher vapor pressure glycols, such as ethylene glycol, diethylene glycol, propylene glycol and dipropylene glycol, can be used herein.

Other examples of liquid desiccants usable in the desiccant dryer LAMEE described herein include, but are not limited to, hygroscopic polyol based solutions, sulfuric acid and phosphoric acid. Glycerol is an example of a hygroscopic polyol usable herein. It is recognized that mixtures of desiccants can be used as the liquid desiccant in the desiccant dryer LAMEEs described herein. In addition to the desiccants listed above, the liquid desiccant can include, but is not limited to, an acetate salt solution, a halide salt solution, a hygroscopic polyol based solution, a glycol based solution, a sulfuric acid solution, a phosphoric acid solution, and any combinations thereof.

In an example, the conditioning system can include a regeneration system configured to increase a concentration of the liquid desiccant exiting the desiccant dryer LAMEE, prior to recirculating the liquid desiccant through the desiccant dryer LAMEE. The present application discloses systems and methods for recovering the water from the air stream (which is absorbed by the liquid desiccant in the desiccant dryer LAMEE) and using the recovered water as make up water for one or more cooling devices in the system, including, for example, the DEC. The systems and methods disclosed herein can eliminate or markedly reduce an external water consumption of the DEC.

In an example, a LAMEE can circulate an evaporative cooling fluid through the LAMEE and the LAMEE can operate as an evaporative cooler, using the cooling potential in both air and the cooling fluid (for example, water) to reject heat. As described above, the DEC located downstream of the desiccant dryer LAMEE can be an evaporative cooler LAMEE. In an example in which the LAMEE is an evaporative cooler, as air flows through the LAMEE, water, or both the air and the water, can be cooled to temperatures approaching the inlet air wet bulb (WB) temperature. Due to the evaporative cooling process in the LAMEE, a temperature of the water at the outlet of the LAMEE can be less than a temperature of the water at the inlet, or the temperature of the water may not be changed, but the air may be cooled. In an example, the cooling fluid in the LAMEE can be water or predominantly water. Other types of evaporative cooling fluids, including those listed above, can be used in combination with water or as an alternative to water.

A LAMEE can offer advantages over conventional cooling systems, such as cooling towers, for example. The membrane separation layer in the LAMEE can reduce maintenance, can eliminate the requirement for chemical treatments, and can reduce the potential for contaminant transfer to the liquid loop. The use of LAMEEs along with an upstream and/or downstream cooling coil (or other LAHX) can result in a lower temperature of the water leaving the LAMEE and a higher cooling potential. Various configurations of conditioning systems having one or more LAMEEs are described herein and can boost performance in many climates.

FIG. 1 depicts an example conditioning system 100, which can be configured to condition air for delivery to an enclosed space, such as, for example, a data center. The conditioning system 100 can be used in commercial and industrial applications, as well as residential applications. The conditioning system 100 can be used for cooling air that is hot because of surrounding equipment and conditions in the enclosed space. The conditioning system 100 can be used for comfort cooling in residential and commercial applications. The conditioning system 100 can receive hot process air from the enclosed space and condition the process air such that it can be returned to the enclosed space as reduced-temperature or reduced-humidity supply air. The conditioning system 100 can receive outdoor air and condition the outdoor air prior to delivering the outdoor air to the enclosed space. In other examples, the conditioning system 100 can receive a mix or combination of outdoor air and process air.

In an example in which the conditioning system receives process air from the enclosed space, the conditioning system 100 can sometimes be referred to as a 100% recirculation system, which generally means that the air within the enclosed space recirculates through the conditioning system 100 in a continuous cycle of being cooled by the system 100 to a target supply air temperature, supplied to the space, heated by elements in the space (for example, computers, servers, and other electronics), and returned to the system 100 for cooling. Although not shown or described in detail, in such an example, the conditioning system 100 can include a make-up air unit or system, to continuously or periodically refresh the air within the space to satisfy ventilation requirements.

The conditioning system 100 can include a system cabinet 102 that can house a process plenum 104. A desiccant dryer LAMEE 106 and a direct evaporative cooler (DEC) 108 can be arranged inside the process plenum 104. A fan 110 can be arranged inside the process plenum 104 upstream of the desiccant dryer LAMEE 106 or in some other location. The process plenum 104 can include a plenum inlet 112, a plenum outlet 114, and a bypass inlet 116. Associated and generally collocated with each of inlet 112, outlet 114 and bypass inlet 116 can be dampers 118, 120 and 122, respectively.

The DEC 108 can be any type of direct evaporative cooler suitable for use inside the process plenum 104 to cool the air stream passing there through. Direct evaporative coolers can be defined for purposes herein as direct-contact DECs and non-contact DECs. In an example, the DEC 108 can be a LAMEE, also referred to herein as an evaporative cooler LAMEE. The evaporative cooler LAMEE is a non-contact DEC because the membrane in the LAMEE separates and (maintains separation) between the evaporative fluid (water) and the air. In such an example in which the DEC 108 is a LAMEE, the desiccant dryer LAMEE 106 can also be referred to herein as a first LAMEE 106 and the evaporative cooler LAMEE 108 can also be referred to herein as a second LAMEE 108. In other examples, the DEC 108 can include, but is not limited to, a wetted media or spray atomizer system, both of which are examples of direct-contact DECs since the evaporative fluid (water) directly contacts the air to cool the air.

Inlet air can enter the process plenum 104 at a first temperature through the plenum inlet 112. In an example, the air entering the process plenum 104 has been heated in the enclosed space and requires cooling to a target supply air temperature, which, in an example, can generally be determined based on the amount and characteristics of equipment housed in the enclosed space, for example, computing, networking, data storage and other equipment. In another example, the air entering the process plenum 104 can be outdoor air. In yet another example, the air entering the process plenum 104 can be a mixture of outdoor air and process air from the enclosed space.

In an example, the target supply air temperature can be based on a comfort cooling set point in a residential or commercial application. Air exiting the process plenum 104 at the plenum outlet 114 can be at a second temperature lower than the first temperate and can be supplied to the enclosed space as cooled process air (supply air). The second temperature can be at or within an acceptable tolerance of the target supply air temperature. As described below, the moisture content of the air at the outlet 114 can be controlled or maintained. In an example, a moisture content of the air at the inlet 112 can be about equal to a moisture content of the air at the outlet 114. In another example, the moisture content of the air at the inlet 112 can be less than or greater than the moisture content of the air at the outlet 114.

The system 100 can include a first desiccant circuit 124 configured to circulate a liquid desiccant through the desiccant dryer LAMEE 106. A desiccant tank or a first tank 126 can be part of the first desiccant circuit 124 and can receive the desiccant exiting the LAMEE 106 at a LAMEE outlet 128. A liquid to air heat exchanger (LAHX) or a liquid to liquid heat exchanger (LLHX) 132 can be part of the first desiccant circuit 124 and can cool the desiccant prior to passing the desiccant into the LAMEE 106 at a LAMEE inlet 134 for continued circulation through the LAMEE 106.

The system 100 can include a second desiccant circuit 166 for regeneration of the liquid desiccant. As shown in FIG. 1, the liquid desiccant in the desiccant circuit 124 exiting the tank 126 can be transported or delivered to at least one of the heat exchanger 132 (via the circuit 124) and a regeneration system (via the second desiccant circuit 166). In an example, a modulating valve 168 can control a distribution of the liquid desiccant to the heat exchanger 132 and to regeneration. A regeneration system for the liquid desiccant is described further below and shown in FIGS. 3 and 5. As shown in FIG. 1, the liquid desiccant in the second desiccant circuit 166 can be returned to the tank 126 (as concentrated desiccant) from the regeneration system.

The system 100 can be designed such that only a portion of the desiccant is regenerated. Thus, in an example, the system 100 can continue operating efficiently without requiring all of the desiccant to flow through the regenerator. As shown in FIG. 1, the valve 168 can direct all or a portion of the desiccant from the tank 126 directly back to the LAMEE 106. This is a result in part to the mixing in the tank 126 of concentrated desiccant from the regeneration system with dilute desiccant from the LAMEE 106. This is also a result of the design of the LAMEE 106 which operates at high flow rates of liquid desiccant through the LAMEE 106. Because the flow rate of liquid desiccant through the LAMEE 106 is high, a concentration decrease of the desiccant in the desiccant stream between the inlet 134 and the outlet 128 of the LAMEE 106 is small, compared to if the flow rate was low. As such, in an example, only a minor portion of the desiccant from the tank 126 can be diverted for regeneration.

The LAMEE 106 is configured such that the desiccant removes at least one of water and heat from the air stream. It is recognized that if the desiccant only removes water from the air (i.e. the air remains at a generally constant temperature between the LAMEE inlet and outlet), a temperature of the desiccant at an outlet of the LAMEE 106 can still be higher than a temperature of the desiccant at an inlet of the LAMEE 106. The temperature increase of the desiccant is due to the latent heat of condensation of the moisture from the air.

The design of the LAMEE 106 allows for the desiccant to not only remove water from the air stream, but the desiccant can also remove heat from the air stream. The LAMEE 106 can be configured such that essentially all of the energy removed from the air stream is transferred to the desiccant stream. In other words, an energy reduction of the air in the air stream between the LAMEE inlet and outlet can be about equal to an energy gain of the liquid desiccant in the desiccant stream between the LAMEE inlet and outlet. It is recognized that there may be some loss inherent in the system and 100% of the energy removed from the air stream may not be transferred to the desiccant stream. For purposes herein, the term "essentially all of the energy" or "all of the energy" recognizes and accounts for such losses in the system. Similarly, for purposes herein, "about equal" in reference to the energy reduction of the air relative to the energy gain of the desiccant recognizes and accounts for the system not being 100% efficient and having some loss. The LAMEE 106 can be configured such that a single fluid (the desiccant) can be used to remove heat and water from the air. Thus the LAMEE 106 can be a two-fluid design—the first fluid is the air stream and the second fluid is the desiccant. Additional fluids are not included for reducing the energy of the air, and the single desiccant stream in the LAMEE 106 can sufficiently remove heat and water from the air stream passing there through. The heat from the air stream can primarily be latent heat, although some sensible heat can also be removed from the air by the desiccant. Because the flow rate of liquid desiccant through the LAMEE 106 is high, a temperature increase of the desiccant stream between the inlet 134 and the outlet 128 of the LAMEE 106 is small, compared to if the flow rate was low.

The system 100 can include a first water circuit 130 configured to circulate a cooling fluid (such as water) through the DEC 108. A cooling fluid tank or a second tank 136 can receive the cooling fluid exiting the DEC 108 at an outlet 138. The cooling fluid can be recirculated from the tank 136 back to an inlet 140 of the DEC 108. The tank 136 can include a water supply; a portion of the water supply can be water recovered from the liquid desiccant during regeneration. Thus the water recovered in regeneration can be used as make up water for operation of the DEC 108. This is described below and shown in FIGS. 3 and 5.

The DEC 108 can be configured to adiabatically cool the air flowing through the DEC 108. A cooling potential of the DEC 108 may be limited by a humidity level of the air stream. The LAMEE 106, located upstream of the DEC 108, can reduce the humidity of the air stream such that dry air, as compared to the air's moisture content at the plenum inlet 112, enters the DEC 108. Dehumidification of the air upstream of the DEC 108 can allow for reaching lower air temperatures in the DEC 108 and thus can provide the ability to efficiently supply the air to the enclosed space at the set point temperature.

The desiccant dryer LAMEE 106 may be similar in construction to an evaporative cooler LAMEE. In an example, the desiccant dryer LAMEE 106 can circulate a liquid desiccant which can be a different composition than the cooling fluid used within an evaporative cooler LAMEE. In an example, the liquid desiccant can be a lithium chloride solution (or another liquid desiccant solution known in the art), while the cooling fluid in an evaporative cooler LAMEE can be pure water or predominately water. In an example, the liquid desiccant can be naturally-occurring, non-toxic, environmentally benign, low cost and an abundantly available substance. The liquid desiccant can absorb both heat and moisture from the air stream passing through the desiccant dryer LAMEE 106.

The liquid desiccant can be discharged from the LAMEE 106 at the LAMEE outlet 128 and into the desiccant tank 126. After the liquid desiccant exits the LAMEE outlet 128, the liquid desiccant can be diluted due to absorbed moisture from the air, which reduces the concentration of the desiccant and thereby reduces the drying ability of the LAMEE 106. The conditioning system 100 can include a regeneration system to concentrate the liquid desiccant, prior to recirculating the desiccant. The desiccant can be transported from the tank 126, via a pump 142, to the regeneration system described below and shown in FIGS. 3 and 5. The regeneration system can control the concentration of the liquid desiccant entering the LAMEE 106 at the LAMEE inlet 134. A concentration of the desiccant at the inlet 134 can impact a capacity of the liquid desiccant to decrease the humidity of the air passing through the LAMEE 106.

The LAHX or LLHX 132 can be configured to cool the liquid desiccant prior to recirculating the liquid desiccant through the LAMEE 106. In an example, the liquid desiccant can be transported from the tank 126 to the LAHX or LLHX 132, which is described further below. The desiccant can then be delivered to the LAMEE inlet 134 at a reduced temperature, relative to the temperature of the liquid desiccant in the tank 126. The LAHX or LLHX 132 can include any type of heat exchanger or combination of heat exchangers suitable for cooling the liquid desiccant. In an example, the LAHX or LLHX 132 can include a liquid to air heat exchanger that uses the outdoor air to provide cooling to the liquid desiccant. In another example, the LAHX or LLHX 132 can include a liquid to liquid heat exchanger that uses another cooling fluid to cool the desiccant. Such cooling fluid can be cooled in a dry cooler, a cooling tower or any other type of evaporative cooler or hybrid cooler, or a combination thereof.

In an example, the conditioning system 100 can operate with the liquid desiccant in the first desiccant circuit 124 at higher temperatures, as compared to if water cooling were used as an alternative to the desiccant dryer LAMEE 106. In water cooling applications, such as a chilled water coil, water circulating through the circuit 124 would need to be at lower temperatures to achieve comparable results. (For example, a chilled water coil operates at a temperature colder than the dew point temperature of the air passing through the coil; such water temperature can be markedly colder than an operating temperature of the liquid desiccant in the first desiccant circuit 124.) In an example, a set point temperature of the desiccant entering the LAMEE 106 at the inlet 134 can be higher than an outdoor ambient dry bulb temperature. As such, in an example, heat can be released from the desiccant using an air cooler for the LAHX 132. In another example, the set point temperature of the desiccant entering the LAMEE 106 can be higher than an outdoor ambient wet bulb temperature, and the heat can be released from the desiccant using an evaporative assisted cooler for the LAHX 132.

Because the liquid desiccant in the circuit 124 can circulate at markedly higher temperatures (compared to water cooling), it can be easy to reject the heat from the desiccant to ambient air using "free cooling" methods, which can include direct sensible air cooling or evaporatively-assisted air cooling using only ambient air. Because conventional chilled water systems have to run at lower temperatures by comparison, those systems typically require mechanical cooling equipment, at least during portions of the year when ambient conditions are high.

A primary function of the LAMEE 106 is to lower the moisture content, as well as the enthalpy, of the air passing through the LAMEE 106. As such, a moisture level of the air exiting the LAMEE 106 can be significant lower than a moisture level of the air entering the LAMEE. Similarly, an enthalpy of the air exiting the LAMEE 106 can be significantly lower than an enthalpy of the air entering the LAMEE 106. In an example, a temperature of the air exiting the LAMEE 106 can be about equal to or lower than a temperature of the air entering the LAMEE 106. In another example, a temperature of the air exiting the LAMEE 106 can be higher than a temperature of the air entering the LAMEE 106.

The air can flow through the DEC 108, which as an evaporative cooler can adiabatically cool the air using evaporation. Thus the process air exiting the DEC 108 can be at a lower temperature than the air entering the DEC 108. After exiting the DEC 108, the air can be directed to the outlet 114 of the process plenum 104 and can be delivered to the enclosed space as supply air. In an example, in which the DEC 108 is a LAMEE functioning as an evaporative cooler, the LAMEE 108 can adiabatically cool the air in a similar manner described above.

In an example, the system 100 can be controlled such that a moisture content of the air exiting the DEC 108 can be about equal to a moisture content of the air entering the process plenum 104 at the inlet 112. In another example, the moisture content of the air exiting the DEC 108 can be lower or higher than the moisture content of the air at the inlet 112.

In an example, the conditioning system 100 can utilize the bypass damper 122 to bypass the desiccant dryer LAMEE 106. The bypass damper 122 can be open (and the damper 118 can be closed), for example, when the inlet air entering the plenum 104 is dry or cold. In an example, the dampers 118 and 122 can be modulated to mix the air streams (i.e. some inlet air going through LAMEE 106 and some inlet air bypassing the LAMEE 106) to achieve desired conditions. Although not shown in FIG. 1, the conditioning system 100 can include other components (such as one or more fans) to direct the air into and through the process plenum 104 downstream of the LAMEE 106.

The design of the conditioning system 100 can facilitate cooling the air to the discharge set point temperature over a large range of humidity levels. The conditioning system 100 can replace vapor-compression cooling equipment in comfort cooling applications (residential or commercial) or in process cooling applications, like a data center. The conditioning system 100 can facilitate DX-free (direct expansion free) cooling in a wide range of climates.

The conditioning system 100 can achieve cooling comparable to an absorption chiller. However, in contrast to an absorption chiller, the conditioning system 100 can operate at or near atmospheric pressure and does not require sealed chambers under vacuum. This can eliminate the need for special materials and complexity resulting from operating the system 100, or components thereof, under vacuum. As compared to a DX system, which may require high operating pressures (for example, 400 psi), the conditioning system 100 can advantageously operate at or near atmospheric pressure.

The conditioning system 100 can directly cool the air stream and thus can be configured with a single working air stream. This can result in a compact system with a lower footprint and reduced costs. The conditioning system 100 can utilize moisture from the air and thus can operate effectively when there is moisture in the air.

The design of the conditioning system 100, using the desiccant dryer LAMEE 106, can facilitate collection of a significant amount of water from the air. Such water is contained within the dilute desiccant exiting the LAMEE 106 at the outlet 128. As described under the regeneration system of FIG. 5, the water can be separated from the desiccant and transported to other parts of the system 100. In an example, the water can be transported to the tank 136 for use by the DEC 108. The design of the conditioning system 100 can markedly reduce or eliminate external water consumption of the DEC 108 and of the system 100 overall.

The conditioning system 100 can include the fan (or fan array) 110 to drive the air into and through the process plenum 104. Example conditioning system 100 and other example systems in accordance with this disclosure can include more or fewer fans than what is shown in FIG. 1. Moreover, the fans can be located in different locations within the system 100 relative to what is shown in FIG. 1. For example, the fan 110 can be configured as a single fan or multiple fans, including a fan array, such as, for example, FANWALL® Systems provided by Nortek Air Solutions. Although not shown in the figures, example conditioning systems in accordance with this disclosure can include one or more filters disposed in the process plenum 104.

In the example of FIG. 1, the fan 110 can be arranged inside the process plenum 104 upstream of the LAMEE 106. In this position, some heat generated by the fan 110 can be removed. In other examples, the fan 110 can be located at different positions within/along the process plenum 104.

The conditioning system 100 can include a system controller 150, which can include hardware, software, and combinations thereof to implement the functions attributed to the controller herein. The system controller 150 can be an analog, digital, or combination analog and digital controller including a number of components. As examples, the controller 150 can include ICB(s), PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry. Storage devices, in some examples, are described as a computer-readable storage medium. In some examples, storage devices include a temporary memory, meaning that a primary purpose of one or more storage devices is not long-term storage. Storage devices are, in some examples, described as a volatile memory, meaning that storage devices do not maintain stored contents when the computer is turned off. Examples of volatile memories include random access memories (RAM), dynamic random access memories (DRAM), static random access memories (SRAM), and other forms of volatile memories known in the art. The data storage devices can be used to store program instructions for execution by processor(s) of the controller 150. The storage devices, for example, are used by software, applications, algorithms, as examples, running on and/or executed by the controller 150. The storage devices can include short-term and/or long-term memory, and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories.

The system controller 150 can be configured to communicate with conditioning system 100 and components thereof via various wired or wireless communications technologies and components using various public and/or proprietary standards and/or protocols. For example, a power and/or communications network of some kind may be employed to facilitate communication and control between the controller 150 and the conditioning system 100. In one example, the system controller 150 may communicate with the conditioning system 100 via a private or public local area network (LAN), which can include wired and/or wireless elements functioning in accordance with one or more standards and/or via one or more transport mediums. In one example, the system 100 can be configured to use wireless communications according to one of the 802.11 or Bluetooth specification sets, or another standard or proprietary wireless communication protocol. Data transmitted to and from components of the system 100, including the controller 150, can be formatted in accordance with a variety of different communications protocols. For example, all or a portion of the communications can be via a packet-based, Internet Protocol (IP) network that communicates data in Transmission Control Protocol/Internet Protocol (TCP/IP) packets, over, for example, Category 5, Ethernet cables.

The system controller 150 can include one or more programs, circuits, algorithms or other mechanisms for controlling the operation of the conditioning system 100. For example, the system controller 150 can be configured to modulate the speed of the fan 110 and/or control actuation of one or more of the dampers 118, 120 and 122. The system controller 150 can also be configured to operate the system 100 in a bypass mode in which the LAMEE 106 can be off and the air can still pass there through; alternatively, the damper 118 can be closed and the damper 122 can be open to direct the air into the plenum 104 downstream of the LAMEE 106.

Figure 2:
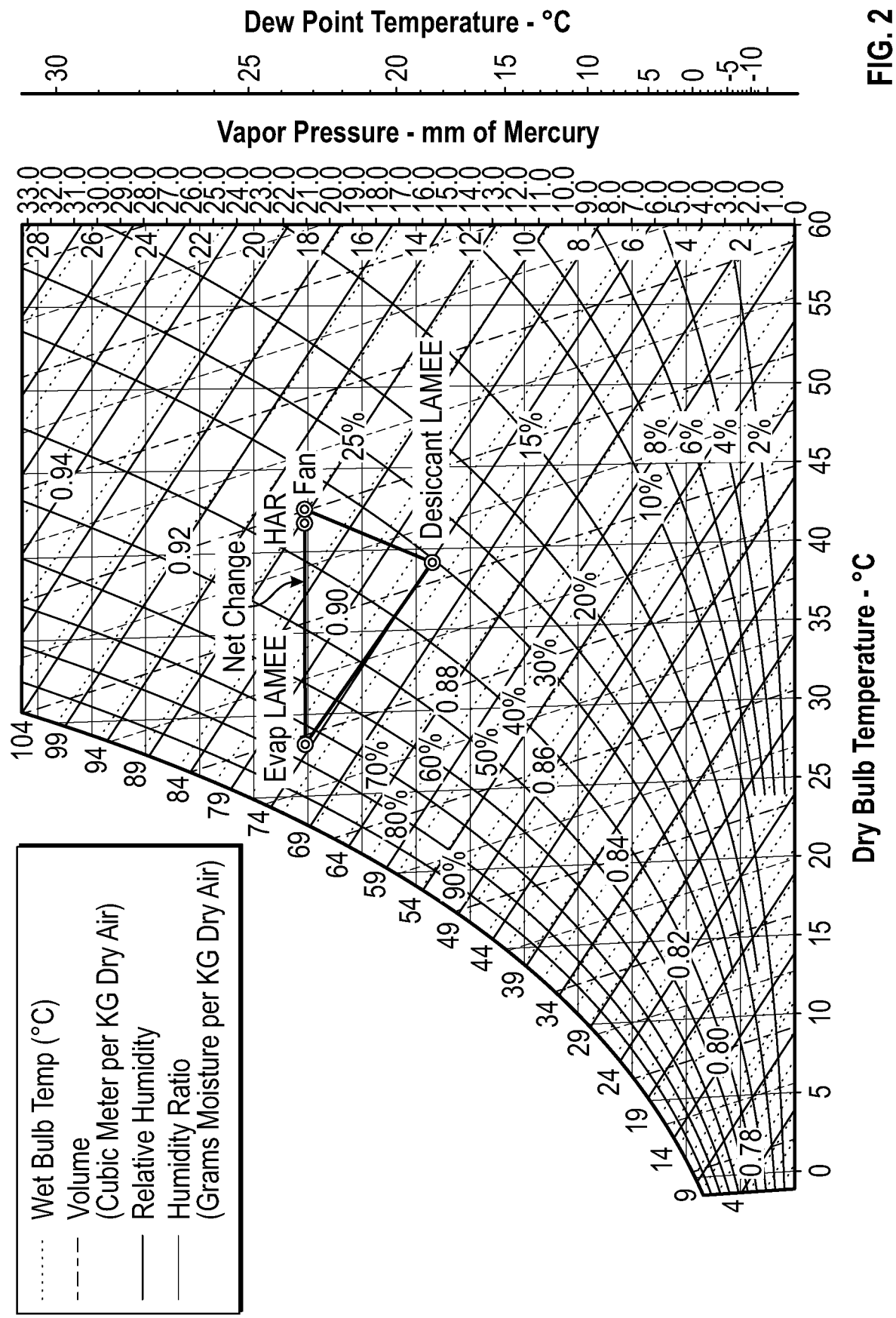
FIG. 2 is a psychometric chart for a modeled conditioning system similar to the conditioning system of FIG. 1.

FIG. 2 is a psychometric chart for a theoretical system substantially similar to example conditioning system 100 of FIG. 1. In the example represented by FIG. 2, the inlet air is a hot process air stream from an enclosed space. The psychometric chart illustrates the conditions of a modeled conditioning system, and in particular, conditions of the working fluid(s) thereof at different components of the system and/or at different points during operation. The various components of the modeled system are designated below using the reference labels of the system 100 of FIG. 1. The chart depicted in FIG. 2 was created using various numerical, analytical, algorithmic, etc. methods, tools, etc. to estimate the physical characteristics of a system in accordance with this disclosure when operated under certain initial conditions.

The example modeled system is operated at ambient conditions including an outdoor air dry bulb temperature of 32.2 degrees Celsius, an outdoor air wet bulb temperature of 29.4 degrees Celsius and a relative humidity of 81.6%. The altitude of the modeled system is sea level (0 meters), the barometric pressure is 760 mm Hg, and the atmospheric pressure is 101.325 kPa. The target temperature for the air being delivered to the enclosed space (from outlet 114) is about 28 degrees Celsius. The liquid desiccant employed in the LAMEE 106 is a lithium chloride solution with a salt concentration of 38% (at the LAMEE inlet 134) and a target fluid inlet temperature of 36.7 degrees Celsius (at the LAMEE inlet 134). The DEC 108 in the modeled system is an evaporative cooler LAMEE.

The characteristic values associated with the chart of FIG. 2 are as follows:

1. Hot Air Return (HAR)—Conditions of Inlet Air at Plenum Inlet 112

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/cu · m) | Vapor Pressure (mm Hg) | Absolute Humidity (g/cu · m) |
|---|---|---|---|---|---|---|---|---|---|---|
| 14,159 | 41.667 | 27.847 | 35.4 | 18.10 | 0.917 | 88.463 | 23.250 | 1.1097 | 21.4012 | 19.729 |

2. Fan 110—Conditions of Air at Outlet of Fan 110

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/cu · m) | Vapor Pressure (mm Hg) | Absolute Humidity (g/cu · m) |
|---|---|---|---|---|---|---|---|---|---|---|
| 14,159 | 42.500 | 28.036 | 33.8 | 18.10 | 0.920 | 89.328 | 23.250 | 1.1068 | 21.4012 | 19.677 |

Energy Change of Air (Sensible Heating) Across Fan 110

| Start Point Name | Total Heating (kW) | Total Energy (W) | Sensible Energy (W) | Latent Energy (W) | Moisture Difference (kg/hr) | Sensible Heat Ratio | Enthalpy/ Humidity Ratio (kJ/kg/g/kg) |
|---|---|---|---|---|---|---|---|
| HAR | 14.7 | 14,711 | 14,711 | 0 | 0.0 | 1.000 | N/A |

3. Desiccant Dryer LAMEE 106 (PreDry)—Conditions of Air at Outlet of LAMEE 106

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/cu · m) | Vapor Pressure (mm Hg) | Absolute Humidity (g/cu · m) |
|---|---|---|---|---|---|---|---|---|---|---|
| 14,159 | 39.100 | 24.503 | 30.2 | 13.40 | 0.903 | 73.701 | 18.483 | 1.1219 | 15.9606 | 14.835 |

Energy Change of Air Across Desiccant Dryer LAMEE 106

| Start Point Name | Total Energy (W) | Sensible Energy (W) | Latent Energy (W) | Moisture Difference (kg/hr) | Sensible Heat Ratio | Enthalpy/ Humidity Ratio (kJ/kg/g/kg) |
|---|---|---|---|---|---|---|
| FAN | −265,741 | −59,538 | −206,203 | −287.8 | 0.224 | N/A |

4. Evaporative Cooler LAMEE 108—Conditions of Air at Outlet of LAMEE 108

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/cu · m) | Vapor Pressure (mm Hg) | Absolute Humidity (g/cu · m) |
|---|---|---|---|---|---|---|---|---|---|---|
| 14,159 | 28.200 | 24.572 | 74.6 | 18.10 | 0.878 | 74.478 | 23.250 | 1.1593 | 21.4012 | 20.611 |

Energy Change of Air Across LAMEE 108

| Start Point Name | Total Energy (W) | Sensible Energy (W) | Latent Energy (W) | Moisture Difference (kg/hr) | Sensible Heat Ratio | Enthalpy/ Humidity Ratio (kJ/kg/g/kg) |
|---|---|---|---|---|---|---|
| Desiccant LAMEE | 13,207 | −192,498 | 205,705 | 287.8 | −14.576 | N/A |

5. Net Cooling of Conditioning System

| Start Point Name | Total Energy (W) | Sensible Energy (W) | Latent Energy (W) | Moisture Difference (kg/hr) | Sensible Heat Ratio | Enthalpy/ Humidity Ratio (kJ/kg/g/kg) |
|---|---|---|---|---|---|---|
| HAR | −237,833 | −237,833 | 0 | 0.0 | 1.000 | N/A |

Referring to the psychometric chart of FIG. 2, the hot return air (HAR), or hot process air, enters the conditioning system at a plenum inlet 112 at a dry bulb temperature of 41.7 degrees Celsius, a wet bulb temperature of 27.8 degrees Celsius and a relative humidity of 35.4%. A moisture content or humidity ratio of the HAR is 18.1 g/kg. After passing through a fan 110, a dry bulb temperature of the process air is 42.5 degrees Celsius and a humidity ratio remains at 18.1 g/kg. As illustrated by the chart of FIG. 2, the fan 110 results in a slight increase in the dry bulb temperature of the process air, and consequently a minor gain in the sensible energy of the process air.

After passing through a desiccant dryer LAMEE 106 (pre-dry), a dry bulb temperature of the process air is reduced from 42.5 degrees Celsius to 39.1 degrees Celsius. The humidity ratio is reduced from 18.1 g/kg to 13.4 g/kg, indicating that a significant amount of water has been removed from the process air passing through the desiccant dryer LAMEE 106. As illustrated by the chart of FIG. 2 and the values above, the desiccant dryer LAMEE can significantly decrease the enthalpy of the process air. The total energy of the process air is reduced by 265,741 Watts (W), and the reduction is predominately a reduction in latent energy.

Although not included in the values above, the temperature of the liquid desiccant at an inlet of the desiccant dryer LAMEE 106 is 36.7 degrees Celsius and the temperature of the desiccant at the outlet of the LAMEE 106 is 39.3 degrees Celsius. As such, the liquid desiccant can absorb a significant amount of water from the process air running the desiccant at a relatively high temperature (36.7) and without significantly increasing a temperature of the liquid desiccant as it flows through the LAMEE 106. The desiccant can be run at higher temperatures, as compared, for example, to water temperatures required in a cooling coil; moreover, this facilitates an easier rejection of the heat from the desiccant during cooling in the LAHX or LLHX. For example, a conventional chilled water system can require water at entering temperatures of about 24-26 degrees Celsius to cool the process air down to 28 degrees Celsius. It is not possible to produce chilled water at these temperatures with "free cooling" methods when the outdoor air is 32.2 degrees Celsius dry bulb and 29.4 degrees Celsius. Such systems would require mechanical cooling.

After passing through an evaporative cooler LAMEE 108, a dry bulb temperature of the process air is reduced from 39.1 degrees Celsius to 28.2 degrees Celsius. A wet bulb temperature of the process air remains essentially unchanged (24.5 degrees Celsius to 24.6 degrees Celsius). The net change in enthalpy is negligible—there is an increase in latent energy that is negated by a decrease in sensible energy.

After passing through the evaporative cooler LAMEE 108, the humidity ratio is increased from 13.4 g/kg to 18.1 g/kg as moisture from the cooling fluid in the evaporative cooler LAMEE 108 is added back to the process air. In the modeled conditioning system, there is not a net change in moisture between the plenum inlet and outlet. The moisture loss in the desiccant dryer LAMEE is 288 kg/hr and the moisture gain in the evaporative cooler LAMEE is 288 kg/hr.

The net cooling provided by the conditioning system is 237,833 Watts (W) of sensible cooling. This is defined as the cooling provided to the air stream passing between the inlet 112 and the outlet 114 of the conditioning system and is labeled in FIG. 2 as "Net Change".

It is recognized that in other examples or under other conditions, the conditioning system can be configured to have a net change in moisture of the process air. For example, if the enclosed space is experiencing increased humidity levels over time, the conditioning system can be configured to supply the process air back to the enclosed space at a moisture content less than the moisture content of the hot return air. Similarly, the conditioning system can be configured to supply the process air back to the enclosed space at a moisture content more than the moisture content of the hot return air.

Figure 3:
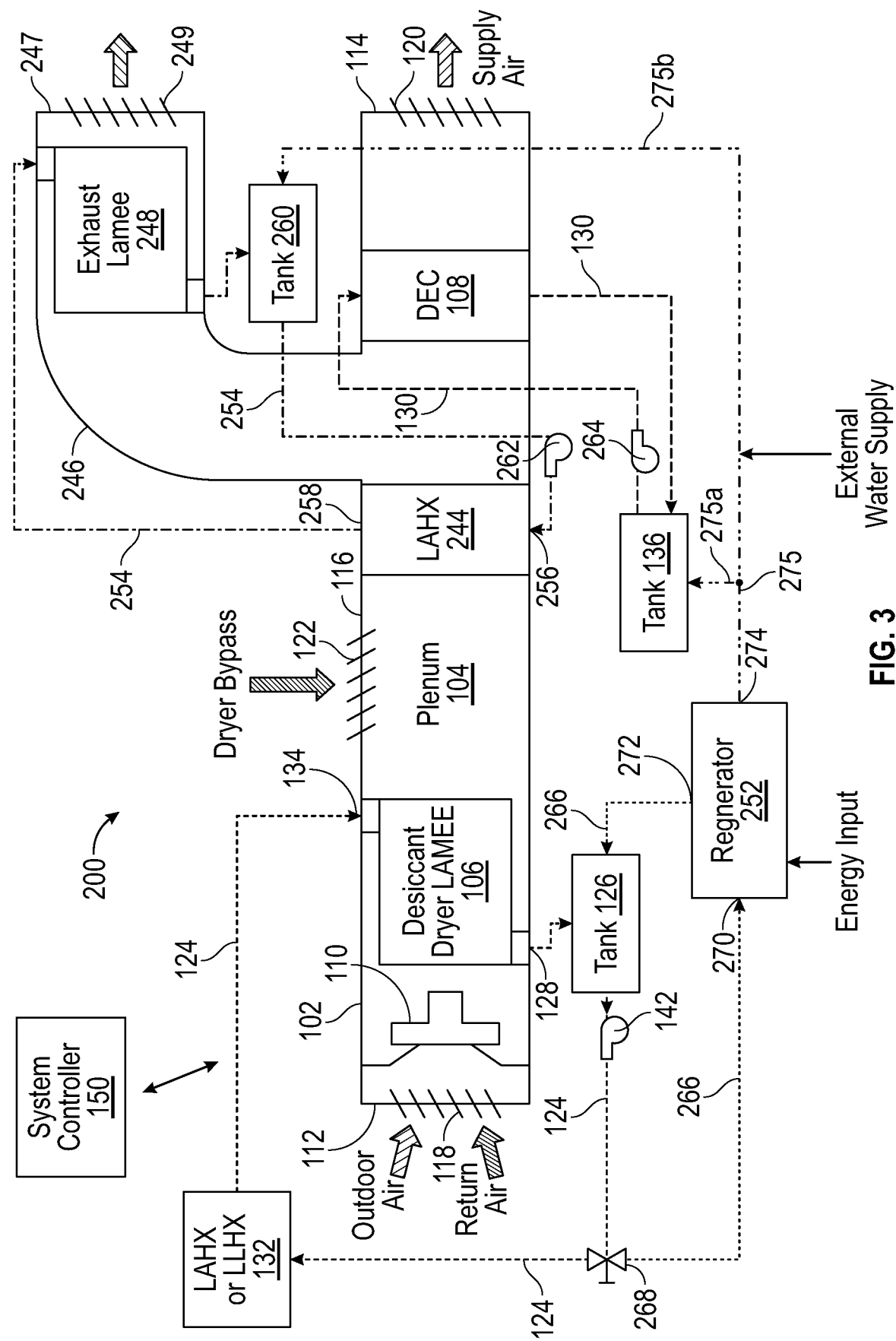
FIG. 3 schematically depicts another example conditioning system that uses outdoor air in combination with process air and includes a desiccant dryer LAMEE, a DEC and a pre-cooler disposed between the desiccant dryer LAMEE and DEC.

FIG. 3 depicts an example conditioning system 200, which can share many of the components and functions of the conditioning system 100 of FIG. 1. For example, the conditioning system 200 can include the system cabinet 102, the process plenum 104, the desiccant dryer LAMEE 106, the DEC 108, the fan 110, the first desiccant circuit 124, the first water circuit 130, the first tank 126 (and the pump 142), the second tank 136, the LAHX or LLHX 132, and the system controller 150. As provided above, the DEC 108 can be an evaporative cooler LAMEE. The process plenum 104 can include the inlet 112 and the outlet 114, as well as the bypass inlet 116. Associated and generally collocated with each of the inlet 112, outlet 114 and the bypass inlet 116 can be the dampers 118, 120 and 122, respectively.

In addition to the components in common with the conditioning system 100, the conditioning system 200 can include an LAHX 244 arranged inside the process plenum 104 between the desiccant dryer LAMEE 106 and the DEC 108, an exhaust plenum 246 in fluid connection with the process plenum 104, an exhaust LAMEE 248 arranged inside the exhaust plenum 246, and a regenerator 252. As described above, the conditioning system 200 can be suitable for residential applications as well as commercial or industrial applications, including, but not limited to, data centers, and can be designed to deliver the supply air at low temperatures and low to moderate humidity.

The conditioning system 200 can be designed to receive hot return air from an enclosed space. The conditioning system 200 can also be designed to receive outdoor air. The return air and outdoor air can mix together at the inlet 112 or inside the plenum 104 near the inlet 112 to form a mixed air stream. In FIG. 3, the hot return air (process air) and the outdoor air are shown being introduced into the plenum 104 at the plenum inlet 112 with one set of dampers 118. However, it is recognized that the process air and outdoor air may be introduced by way of separate dampers for the process air and the outdoor air. In an example, an amount of outdoor air introduced into the plenum 104 can be less than the amount of process air introduced into the plenum 104. In an example, the amount of outdoor air can be less than half of the amount of process air. In other examples, the conditioning system 200 can be designed to essentially only receive return air or essentially only receive outdoor air.

The addition of outdoor air into the plenum 104 can provide replenishment or make up air to the enclosed space and can eliminate or reduce the need for separate ventilation and make-up air units. As further described below, the outdoor air can be used to reject heat from the system 200 to the outside. In an example described further below, an exhaust air stream can provide additional cooling to other components within the conditioning system 200.

After entering the plenum 104, the mixed air stream can pass through the fan 110 and through the desiccant dryer LAMEE 106, as similarly described above under FIG. 1. Next, the mixed air stream can pass through the LAHX 244. The mixed air stream can be delivered to the LAHX 244 as relatively hot but relatively dry air. The LAHX 244 can function as a pre-cooler to reduce a dry bulb and wet bulb temperature of the mixed air prior to directing the air through the DEC 108.

In an example, the LAHX 244 can be a cooling coil that utilizes a cooling fluid (such as water) such that the mixed air stream can reject heat to the cooling fluid as the mixed air stream passes through the LAHX 244. It is recognized that other types of liquid to air heat exchangers that use a cooling fluid to reduce a temperature of air passing there through can be used as the LAHX 244.

The LAHX 244 can be included in a second water circuit 254 that can circulate the cooling fluid (water) for the LAHX 244. The cooling fluid can enter the LAHX 244 at an inlet 256 and at a first temperature. The cooling fluid can exit the LAHX 244 at an outlet 258 and at a second temperature that is higher than the first temperature. The cooling fluid can then be cooled in the exhaust LAMEE 248, which is described further below. The reduced temperature cooling fluid can be discharged to a third tank 260, where the cooling fluid can be stored. The cooling fluid can be transported from the third tank 260 back to the inlet 256 of the LAHX 244 via a pump 262.

As further described below, in an example, the second water circuit 254 can use water from the regenerator 252, which can be transported to the tank 260. Thus the recovered water from regeneration can be used to provide at least a portion of the water circulating through the LAHX 244.

The second water circuit 254 as described above and shown in FIG. 3 is one example of a fluid circuit for the cooling fluid for LAHX 244. It is recognized that other components and methods can be used to reduce the temperature of the cooling fluid for the LAHX 244 prior to recirculating the cooling fluid through the LAHX 244.

It is recognized that the LAHX 244 can optionally be included in the conditioning system 100 of FIG. 1 and can be located between the desiccant dryer LAMEE 106 and the DEC 108. Similar to its function in the conditioning system 200, the LAHX 244 can be included in the system 100 to provide pre-cooling to the air stream exiting the LAMEE 106, before passing the air stream through the DEC 108. In such a design that excludes the exhaust plenum 246, the LAHX 244 can use another type of cooling device, as an alternative to the exhaust LAMEE 248, to cool the water exiting the LAHX 244 prior to recirculating the water back through the LAHX 244.

In an example, the LAHX 244 can be excluded, depending, for example, on the type of application that the system 200 is intended for. For example, if the supply air can be delivered at moderate temperatures rather than at cool temperatures, the LAHX can be excluded. In other examples, the LAHX 244 can be included in the system 200 but can be turned off or bypassed under some conditions.

The mixed air stream can exit the LAHX 244 at a reduced temperature relative to a temperature at an inlet of the LAXH 244. In an example, the mixed air stream can be split into exhaust air and process air. The exhaust air can be discharged through the exhaust plenum 246, which can be fluidly connected to the process plenum 104. The process air can continue through the plenum 104 and pass through the DEC 108 before being supplied back to the enclosed space through the outlet 114 as cooled process air.

The DEC 108 can operate as described above under FIG. 1. Given the addition of LAHX 244 upstream of the DEC 108, the process air entering the DEC 108 can be at a lower dry bulb and wet bulb temperature. The DEC 108 can be controlled depending on the temperature or humidity set points for the enclosed space. A ratio of latent to sensible cooling can be controlled and varied in the DEC 108. The DEC 108 can be turned on or off, or its capacity can be staged depending, at least in part, on the required amount of sensible to latent cooling required. The first water circuit 130 for the DEC 108 can include the tank 136, as described above, and water can be delivered back to the DEC 108 via a pump 264. The first water circuit 130 can use water from the regenerator 252, as described below.

In an example, the amount of air delivered to the exhaust plenum 246 (from the mixed air stream) can be about equal to the amount of outdoor air input into the process plenum 104 at the inlet 112. In another example, the amount of exhaust air delivered to the exhaust plenum 246 can be more or less than the amount of outdoor air input into the process plenum 104. Having just exited the LAHX 244, the exhaust air can be cool and can be suitable for providing air cooling.

In an example, the exhaust air can pass through the exhaust LAMEE 248 arranged inside the exhaust plenum 246. The exhaust LAMEE 248 can be an evaporative cooler and the exhaust air can reduce a temperature of the water (in the second water circuit 254) passing there through. Moisture can be released into the exhaust air, which can then be discharged to the outside at an exhaust plenum outlet 247 through dampers 249. The exhaust air can thus provide cooling to the cooling fluid used in the LAHX 244. In an example, other types of evaporative coolers can be used for cooling the water in the second water circuit 254.

The regenerator 252 can be part of a second desiccant circuit 266 that can be in fluid connection with the first desiccant circuit 124. The regenerator 252 and the second desiccant circuit 266 can be part of a regeneration system that can be configured to regenerate the liquid desiccant before the desiccant is recirculated back to the desiccant dryer LAMEE 106. The regenerator 252 can receive a second portion of the liquid desiccant in the first desiccant circuit 124 that can be transported from the tank 126. A first portion of the liquid desiccant in the first desiccant circuit 124 can be transported to the LAHX or LLHX 132. The desiccant from the tank 126 can pass through a modulating valve 268 that can be controlled based on, at least in part, the latent or sensible cooling load of the system 200 or a condition of the hot return air and outdoor air. The modulating valve 268 can thus control the distribution of desiccant to the LAMEE 106 and to the regenerator 252. Other means can be used in addition to or as an alternative to the valve 268 to control a flow of desiccant from the tank 126 to the regenerator 252. As an example, a second pump can be included in the system 200 to pump desiccant to the regenerator 252 such that the pump 142 can only pump desiccant to the LAMEE 106; the operation of the second pump can control how much, if any, desiccant is transported to the regenerator 252. In another example, the tank 126 can be configured such that overflow of desiccant in the tank 126 can be directed to the regenerator 252.

As described above in reference to FIG. 1, because the LAMEE 106 can operate at high flow rates for the desiccant through the LAMEE 106, the reduction in concentration of the desiccant in the desiccant stream exiting the LAMEE 106, relative to the concentration at the inlet of the LAMEE 106, can be small. As such, a small portion of the desiccant from the tank 126 can be diverted to the regenerator 252 via the modulating valve 268. In an example, between about 1 and about 25 percent of the desiccant exiting the tank 126 can be diverted to the regenerator; consequently, about 75 to about 99 percent of the desiccant exiting the tank 126 can be recirculated back to the LAMEE 106. Due to the mixing in the tank 126 of concentrated desiccant from the regenerator 252, the desiccant leaving the tank 126 can be at a higher concentration than the concentration of the desiccant exiting the LAMEE 106.

The regenerator 252 can be configured to receive the liquid desiccant at an inlet 270 and separate the water and desiccant into a concentrated desiccant stream, which exits the regenerator 252 at an outlet 272, and a water stream, which exits the regenerator 252 at an outlet 274. The regenerator 252 can include an energy input to facilitate such separation of water and desiccant. The concentrated desiccant stream can be transported back to the desiccant tank 126 where it can mix with other desiccant in the tank 126, including the dilute desiccant exiting the LAMEE 106. The water can be transported from the regenerator 252 via a water line 275 to at least one of the tank 136 (via a line 275*a*) and the tank 260 (via a line 275*b*) for use in the DEC 108 and the LAHX 244/LAMEE 248, respectively. The water provides cooling to the air in the LAHX 244. The increased-temperature water can then pass through the LAMEE 248, which acts as an evaporative cooler to reduce a temperature of the water prior to recirculating the water through the LAHX 244. Thus the LAHX 244/LAMEE 248 can use water from the regenerator 252 as make up water due to water consumption through evaporation in the LAMEE 248. Depending on a volume of water available for separation from the liquid desiccant, the water exiting the regenerator 252 can reduce or eliminate an external water supply for one or both of the DEC 108 and the LAHX 244/LAMEE 248. As shown in FIG. 3, the system 200 can be configured for connection to an external water supply such that one or both of the tanks 136 and 260 can receive external water as needed for operation of the DEC 108 and LAHX 244/LAMEE 248, respectfully.

Additional details about the regenerator 252 and the modulating valve 268 are provided below in reference to FIG. 5.

As provided above under FIG. 1, the conditioning system 200 can include the bypass inlet such that the desiccant dryer LAMEE can be bypassed in some conditions.

The system controller 150 can be structured and operate in association with the conditioning system 200 in a manner similar to that described with reference to the conditioning system 100 of FIG. 1. For example, the controller 150 can be communicatively connected to the system 200, can control operation of components thereof, and can control the components to maintain a low humidity level or low temperature of the supply air. Such control can be based on variable sensible and latent loads in the enclosed space. The controller 150 can respond to changing outdoor air conditions or changing requirements for ventilation to the enclosed space. In an example, the system controller 150 can control or vary an amount of outdoor air added to the plenum 104. In an example, the system controller 150 can operate the modulating valve 268 to control or vary an amount of desiccant passing to the regenerator 252.

Although not shown in FIG. 3, the conditioning system 200 can include an air to air heat exchanger for the outside air prior to directing the outside air into the inlet 112. In an example, the exhaust air from the exhaust LAMEE 248 can be used to pre-cool the outdoor air designated for intake before the outdoor air enters the plenum 104 or after the outdoor air enters the plenum 104, but before it mixes with the return air.

Figure 4:
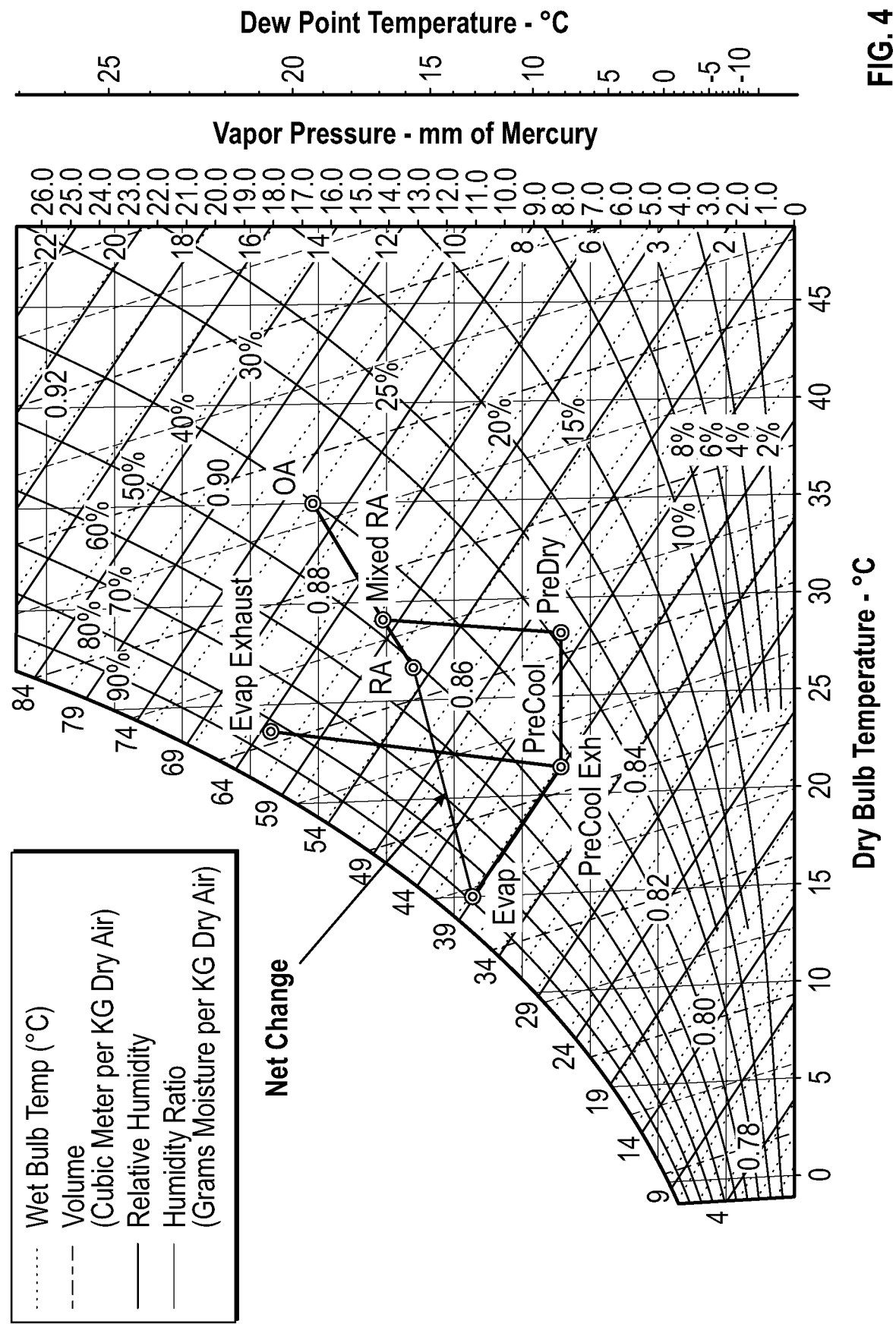
FIG. 4 is a psychometric chart for a modeled conditioning system similar to the conditioning system of FIG. 2.

FIG. 4 is a psychometric chart for a theoretical system substantially similar to example conditioning system 200 of FIG. 3. The psychometric chart illustrates the conditions of a modeled conditioning system, and in particular, conditions of the working fluid(s) thereof at different components of the system and/or at different points during operation. The various components of the modeled system are designated below using the reference labels of the system 200 of FIG. 3. The chart depicted in FIG. 4 was created using various numerical, analytical, algorithmic, etc. methods, tools, etc. to estimate the physical characteristics of a system in accordance with this disclosure when operated under certain initial conditions.

The example modeled system is operated at ambient conditions including an outdoor air dry bulb temperature of 35.0 degrees Celsius, an outdoor air wet bulb temperature of 23.9 degrees Celsius and a relative humidity of 39.8%. The altitude of the modeled system is sea level (0 meters), the barometric pressure is 760 mm Hg, and the atmospheric pressure is 101.325 kPa. The target temperature for the air being delivered to the enclosed space is about 15 degrees Celsius. The air is delivered at about 88.8% relative humidity; however, as the cold air moves into the enclosed space, it heats up and the relative humidity decreases. The return air from the enclosed space is 26.7 degrees Celsius and 51.1% relative humidity (and thus the relative humidity the occupants of the space would experience.)

The liquid desiccant employed in the LAMEE 106 is a lithium chloride solution with a salt concentration of 38% (at the LAMEE inlet 134) and a target fluid inlet temperature of 27 degrees Celsius (at the LAMEE inlet 134). The DEC 108 in the modeled system is an evaporative cooler LAMEE.

The characteristic values associated with the chart of FIG. 4 are as follows:

1. Outdoor Air (OA) at Plenum Inlet 112

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/cu · m) | Vapor Pressure (mm Hg) | Absolute Humidity (g/cu · m) |
|---|---|---|---|---|---|---|---|---|---|---|
| 236 | 35.000 | 23.889 | 39.8 | 14.14 | 0.892 | 71.378 | 19.328 | 1.1364 | 16.8252 | 15.844 |

2. Return Air (RA) at Plenum Inlet 112

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/cu · m) | Vapor Pressure (mm Hg) | Absolute Humidity (g/cu · m) |
|---|---|---|---|---|---|---|---|---|---|---|
| 566 | 26.667 | 19.444 | 51.1 | 11.23 | 0.864 | 55.354 | 15.744 | 1.1699 | 13.4183 | 12.988 |

3. Mixed Air Stream

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/cu · m) | Vapor Pressure (mm Hg) | Absolute Humidity (g/cu · m) |
|---|---|---|---|---|---|---|---|---|---|---|
| 802 | 29.127 | 20.836 | 47.6 | 12.08 | 0.873 | 60.067 | 16.878 | 1.1598 | 14.4236 | 13.847 |

4. Desiccant Dryer LAMEE 106 (PreDry)—Conditions of Air at Outlet of LAMEE 106

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/cu · m) | Vapor Pressure (mm Hg) | Absolute Humidity (g/cu · m) |
|---|---|---|---|---|---|---|---|---|---|---|
| 802 | 28.200 | 16.405 | 28.7 | 6.84 | 0.863 | 45.727 | 8.339 | 1.1670 | 8.2345 | 7.928 |

Energy Change of Air across Desiccant Dryer LAMEE 106

| Start Point Name | Total Energy (W) | Sensible Energy (W) | Latent Energy (W) | Moisture Difference (kg/hr) | Sensible Heat Ratio | Enthalpy/ Humidity Ratio (kJ/kg/g/kg) |
|---|---|---|---|---|---|---|
| Mixed RA | −13,819 | −909 | −12,910 | −18.2 | 0.066 | N/A |

5. LAHX 244 (PreCool)—Conditions of Air at Outlet of LAHX 244

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/jg) | Dew Point (° C.) | Density (kg/cu · m) | Vapor Pressure (mm Hg) | Absolute Humidity (g/cu · m) |
|---|---|---|---|---|---|---|---|---|---|---|
| 802 | 21.400 | 13.888 | 43.1 | 6.84 | 0.843 | 38.807 | 8.339 | 1.1940 | 8.2345 | 8.111 |

Energy Change of Air Across LAHX 244

| Start Point Name | Total Cooling (kW) | Total Energy (W) | Sensible Energy (W) | Latent Energy (W) | Moisture Difference (kg/hr) | Sensible Heat Ratio | Enthalpy/ Humidity Ratio (kJ/kg/g/kg) |
|---|---|---|---|---|---|---|---|
| PreDry | −6.7 | −6,664 | −6,664 | 0 | 0.0 | 1.000 | N/A |

6. DEC 108 (Evap)—Conditions of Air at Outlet of DEC 108

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/kg) | Dew Point (° C.) | Density (kg/cu · m) | Vapor Pressure (mm Hg) | Absolute Humidity (g/cu · m) |
|---|---|---|---|---|---|---|---|---|---|---|
| 566 | 15.000 | 13.888 | 88.8 | 9.48 | 0.828 | 38.962 | 13.167 | 1.2186 | 11.3576 | 11.439 |

Energy Change of Air across DEC 108

| Start Point Name | Total Energy (W) | Sensible Energy (W) | Latent Energy (W) | Cooling Effectiveness (%) | Evaporation Rate - Mass (kg/hr) | Evaporation Rate - Volume (L/hr) | Sensible Heat Ratio |
|---|---|---|---|---|---|---|---|
| PreCool | 149 | −6,304 | 6,453 | 85.2 | 9.1 | 9.1 | −42.3 |

7. Supply Air (SA) at Plenum Outlet 114
Energy Change of the Air Stream from Plenum Inlet to Outlet (Net Cooling)

| Start Point Name | Total Energy (W) | Sensible Energy (W) | Latent Energy (W) | Moisture Difference (kg/hr) | Sensible Heat Ratio | Enthalpy/ Humidity Ratio (kJ/kg/g/kg) |
|---|---|---|---|---|---|---|
| RA | −11,128 | −8,114 | −3,014 | −4.3 | 0.729 | N/A |

8. Exhaust LAMEE 248 (Evap Exhaust)—Conditions of Air at Outlet of Exhaust LAMEE 248

| Air Flow (Standard) (L/s) | Dry Bulb (° C.) | Wet Bulb (° C.) | Relative Humidity (%) | Humidity Ratio (g/kg) | Specific Volume (cu · m/kg) | Enthalpy (kJ/kg) | Dew Point (° C.) | Density (kg/cu · m) | Vapor Pressure (mm Hg) | Absolute Humidity (g/cu · m) |
|---|---|---|---|---|---|---|---|---|---|---|
| 236 | 23.680 | 21.568 | 83.3 | 15.40 | 0.861 | 62.912 | 20.672 | 1.179 | 18.286 | 17.879 |

Energy Change of Air Across LAMEE 248

| Start Point Name | Total Energy (W) | Sensible Energy (W) | Latent Energy (W) | Moisture Difference (kg/hr) | Sensible Heat Ratio | Enthalpy/ Humidity Ratio (kJ/kg/g/kg) |
|---|---|---|---|---|---|---|
| PreCool Exh | 6,832 | 668 | 6,165 | 8.7 | 0.098 | N/A |

Referring to the psychometric chart of FIG. 4, the return air (RA) enters the conditioning system at a plenum inlet 112 at a dry bub temperature of 26.7 degrees, a wet bulb temperature of 19.4 degrees Celsius and a relative humidity of 51.1%; the outdoor air (OA) enters the conditioning system at a dry bulb temperature of 35 degrees Celsius, a wet bulb temperature of 23.9 degrees Celsius, and a relative humidity of 39.8%. The flow rate of the return air is 566 L/s and the flow rate of the outdoor air is 236 L/s; thus the flow of return air is more than two times greater than the flow rate of outdoor air.

The outdoor and return air mix at or downstream of the plenum inlet 112 and the mixed air stream has a dry bulb temperature of 29.1 degrees Celsius, a wet bulb temperature of 20.8 degrees Celsius and a relative humidity of 47.6% with a humidity ratio of 12.1 g/kg. As shown in the psychometric chart, there is an increase in enthalpy of the mixed air stream, relative to the return air, and a decrease in enthalpy relative to the outdoor air.

After passing through a desiccant dryer LAMEE 106 (pre-dry), a dry bulb temperature of the mixed air is reduced from 29.1 degrees Celsius to 28.2 degrees Celsius, whereas the wet bulb temperature is reduced from 20.8 degrees Celsius to 16.4 degrees Celsius. The humidity ratio is reduced from 12.1 g/kg to 6.8 g/kg. There is a significant reduction in enthalpy of the mixed air. More specifically, there is a significant reduction in latent energy. Although not included in the values above, a temperature of the desiccant at the inlet of the LAMEE 106 is 27 degrees Celsius and a temperature of the desiccant at the outlet of the LAMEE 106 is 29.1 degrees Celsius.

After passing through a LAHX 244 (pre-cool), a dry bulb temperature of the mixed air is reduced from 28.2 degrees Celsius to 21.4 degrees Celsius, whereas a wet bulb temperature is reduced from 16.4 degrees Celsius to 13.9 degrees Celsius. The humidity ratio is unchanged at 6.8 g/kg. The total energy reduction of the mixed air at 6,664 W is a reduction that is essentially all sensible energy.

Next the mixed air is split into a process air stream and an exhaust air stream. A flow rate of the process air is 566 L/s, which is the same flow rate as the return air entering the plenum inlet 112. The process air stream passes through a DEC 108 (Evap) to evaporatively cool the process air. After passing through the DEC 108, the process air has a dry bulb temperature reduced from 21.4 degrees Celsius to 15.0 degrees Celsius and a wet bulb temperature that is essentially unchanged. Through evaporative cooling, moisture is added to the process air in the DEC 108 such that the humidity ratio is increased from 6.8 g/kg to 9.5 g/kg. The net enthalpy is essentially unchanged after passing through the DEC 108. A reduction in sensible energy is equal to 6,304 W and an increase in latent energy is equal to 6,453 W.

The process air exiting the DEC 108 becomes the supply air (SA) for the enclosed space. Section 7 of the tables above shows the conditions of the supply air for delivery to the enclosed space, as well as the net change in energy between the return air (RA) and the supply air (SA), which is also shown by a line labeled "Net Change" in FIG. 4. There is a total energy reduction, or net cooling, of 11,128 W, which includes a sensible energy reduction of 8,114 W and a latent energy reduction of 3,014 W. (This amount of cooling is generally equivalent to about 3 tons of refrigeration, which is a common peak cooling capacity for a conventional residential air conditioner.) The return air is at a humidity level of 11.2 g/kg, compared to a reduced humidity level of the supply air at 9.5 g/kg. The conditioning system is removing 4.3 kg/hr of water from the air, so there is a relatively high level of latent cooling as well as sensible cooling.

The exhaust air stream at the outlet of the LAHX 244 (section 5) is split into separate exhaust and process air streams. The exhaust air passes through an exhaust LAMEE 248 that also circulates a cooling fluid for evaporative cooling. The cooling fluid is the water from the LAHX 244. The cooling fluid is primarily cooled by evaporation in the LAMEE 248. The temperature of the water entering the LAMEE 248 is at 26.1 degrees Celsius and a dry bulb temperature of the exhaust air entering the LAMEE 248 is 21.4 degrees Celsius. The temperature of the water exiting the LAMEE 248 is at 19.7 degrees Celsius and is delivered to a tank 260 to store the reduced-temperature water until it is recirculated back through the LAHX 244. A dry bulb temperature of the air exiting the LAMEE 248 is 23.7 degrees Celsius and the humidity ratio is increased to 15.4 g/kg. The exhaust air is outlet to the outside via dampers 249. FIG. 4 shows the significant increase in enthalpy of the exhaust air as the heat from the water is rejected to the exhaust air in the LAMEE 248 (Evap Exhaust). A majority of the enthalpy increase to the air is latent heat.

The combination of the LAHX 244 and DEC 108 downstream of the desiccant dryer LAMEE 106 can allow the system 200 to adjust to the required sensible and latent loads. The system 200 can have humidity control in addition to temperature control. Thus the supply air returned to the enclosed space can be at comfortable conditions. Because the system 200 can deliver the supply air at low humidity levels, in some examples, a higher temperature may still feel comfortable since humidity is moderate. The system 200 can be suitable for residential applications or commercial applications in which low to moderate temperatures and moderate humidity can be desirable.

The combination of the desiccant dryer 106 with the LAHX 244 and DEC 108 can facilitate operation of the system 200 with little to no water input. In an example, the desiccant dryer 106 can remove enough water from the air stream such that the regenerator 252 can supply sufficient water for operation of the LAHX 244 and the DEC 108, without requiring water from an external water supply to be added to the tanks 136 and 260 for make up water for the DEC 108. This is described further below.

Figure 5:
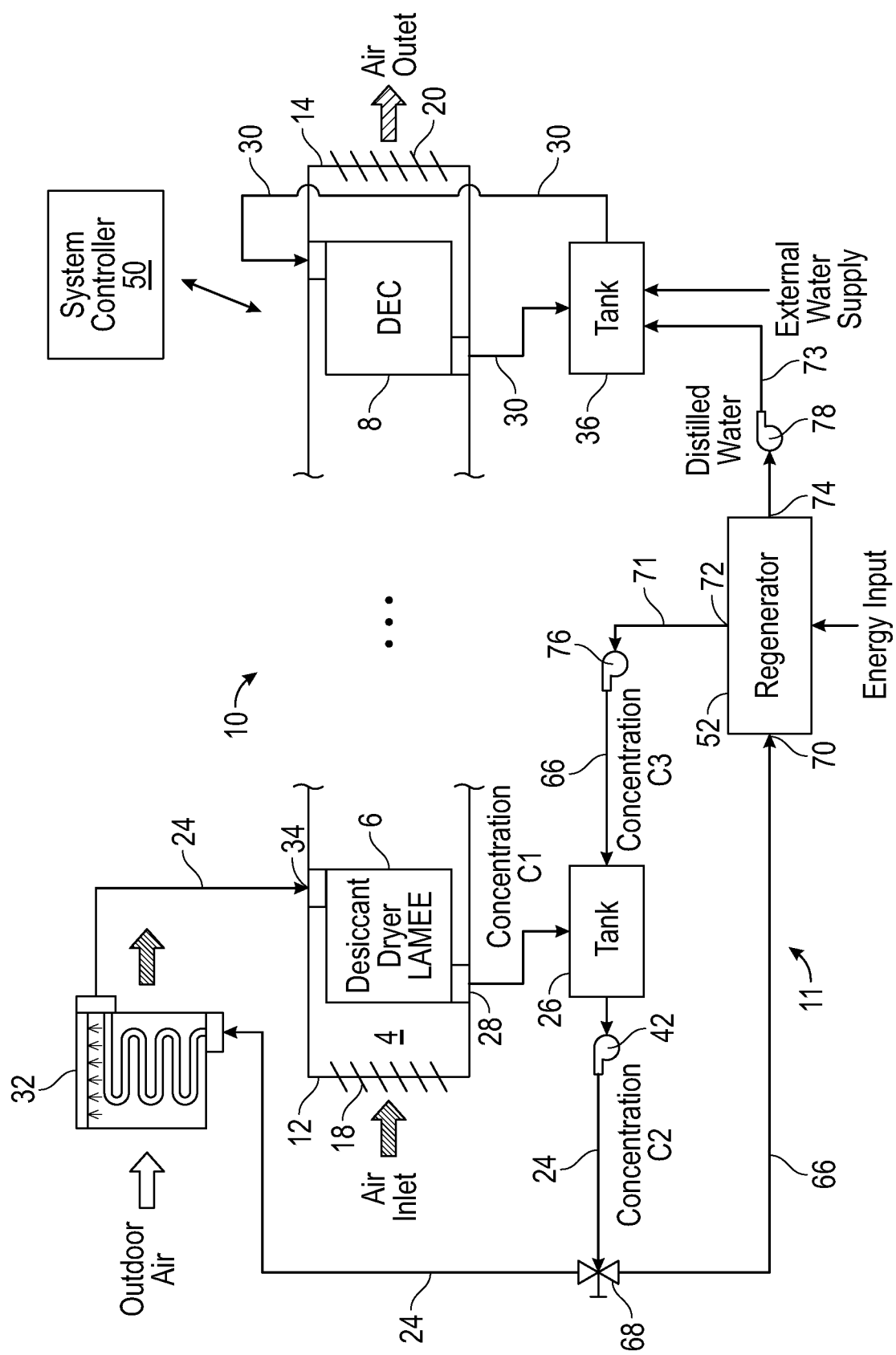
FIG. 5 schematically depicts an example regeneration system for use in a conditioning system.

FIG. 5 depicts an example regeneration system 11, which can be part of a conditioning system 10 for conditioning air for delivery to an enclosed space. The conditioning system 10 can include a desiccant dryer LAMEE 6 arranged in a plenum 4 and a DEC 8 arranged in the plenum 4 downstream of the LAMEE 6. The conditioning system 10 can also include the same or similar components to the conditioning system 100 of FIG. 1 or the conditioning system 200 of FIG. 3. The plenum 4 can be configured to receive an air stream through a plenum inlet 12 and release the air stream through a plenum outlet 14. Associated and generally collocated with the inlet 12 and outlet 14 can be dampers 18 and 20, respectively. Although not shown in FIG. 5, a fan can be arranged inside the plenum 4 upstream of the desiccant dryer LAMEE 6 or in some other location.

The conditioning system 10 can circulate a liquid desiccant through the LAMEE 6 to reduce a humidity level of the air stream entering the plenum 4, prior to passing the air stream through the DEC 8. After circulating through the LAMEE 6, the liquid desiccant can be diluted due to absorbed moisture from the air. A reduction in the concentration of the desiccant can thereby reduce the drying ability of the LAMEE 6. The regeneration system 11, which can include a regenerator 52, can be configured to regenerate the liquid desiccant prior to recirculating the liquid desiccant back through the LAMEE 6.

After the liquid desiccant exits the LAMEE 6 at a LAMEE outlet 28, the liquid desiccant can be discharged into a desiccant tank 26 configured for storage of the liquid desiccant. The desiccant can be transported from the desiccant tank 26, via a pump 42, to the regenerator 52 and a LAHX or LLHX 32. The LAHX or LLHX 32 can be configured to reduce a temperature of the desiccant prior to passing the desiccant into the LAMEE 6 at a LAMEE inlet 34. The LAHX or LLHX 32 and the regenerator 52, in combination, can thus decrease a temperature and increase a concentration of the liquid desiccant prior to circulating the desiccant through the LAMEE 6. Both capabilities can be important in order for the desiccant to effectively remove moisture from the air stream passing through the LAMEE 6. A modulating valve 68 can control and vary a distribution of the desiccant from the tank 26 to the regenerator 52 and the LAHX or LLHX 32, as described further below.

The regeneration system 11 can include a portion of a first desiccant circuit 24 and a second desiccant circuit 66 in fluid connection with the first desiccant circuit 24. The first desiccant circuit 24 can be similar to the first desiccant circuit 124 of the system 200 of FIG. 3. The LAHX or LLHX 32 can be part of the first desiccant circuit 24. The second desiccant circuit 66 can be similar to the second desiccant circuit 266 of the system 200 of FIG. 3. The tank 26 can be part of the first desiccant circuit 24 and the second desiccant circuit 66. The regenerator 52 can be part of the second desiccant circuit 66 and can be similar to the regenerator 252 of FIG. 3.

The desiccant exiting the tank 26 can be transported to the regenerator 52 via the second desiccant circuit 66 and enter the regenerator 52 at an inlet 70. The regenerator 52 can separate the water from the desiccant such that a first exit stream 71 exiting the regenerator 52 at a first outlet 72 can be concentrated desiccant and a second exit stream 73 exiting the regenerator 52 at a second outlet 74 can be distilled water. (Concentration levels C1-C3 of the desiccant are described below.) The first exit stream 71 can be part of the second desiccant circuit 66. In an example, the first exit stream 71 can be transported back to the tank 26 via a pump 76.

The second exit stream 73 (distilled water) can be transported to a tank 36 for the DEC 8, via a pump 78, and used in a first water circuit 30 for the DEC 8. Thus the water in the air stream passing through the plenum 4 can be absorbed by the desiccant in the desiccant dryer LAMEE 6, separated from the desiccant in the regenerator 52, and then used as make up water for the DEC 8. The DEC 8 can still be connected to an external water supply—this is shown in FIG. 5 as external water supply to the tank 36. External water can be provided to the DEC 8 as needed; however the use by the DEC 8 of the recovered water from the desiccant can result in a significant reduction or elimination of water for operation of the DEC 8. In other examples, the water in the second exit stream 73 can be used by more than one cooling unit in a conditioning system—see, for example, the conditioning system 200 of FIG. 3.

The dilute desiccant exiting the LAMEE 6 at the LAMEE outlet 28 can have a first desiccant concentration C1. The dilute desiccant can be mixed with existing desiccant in the tank 26 such that a concentration of desiccant in the tank 26 can be at a second concentration C2 that is greater than the first concentration C1. In an example, a difference in concentration between the first concentration C1 and the second concentration C2 can be small. The desiccant at the second concentration C2 can be regenerated in the regenerator 52 such that a third concentration C3 of the desiccant in the first exit stream 71 can be markedly greater than the second concentration C2. The concentrated desiccant in the first exit stream 71 (at the third concentration C3) can then be mixed with the dilute desiccant exiting the tank 26 (at the first concentration C1), and with the desiccant already in the tank 26, to increase the second concentration C2 of the mixed desiccant. As such, the second concentration C2 in the tank 26 can depend on the concentrations C1 and C3, and the volume/flow rate of each, as well as the volume of desiccant in the tank 26.

Figure 6:
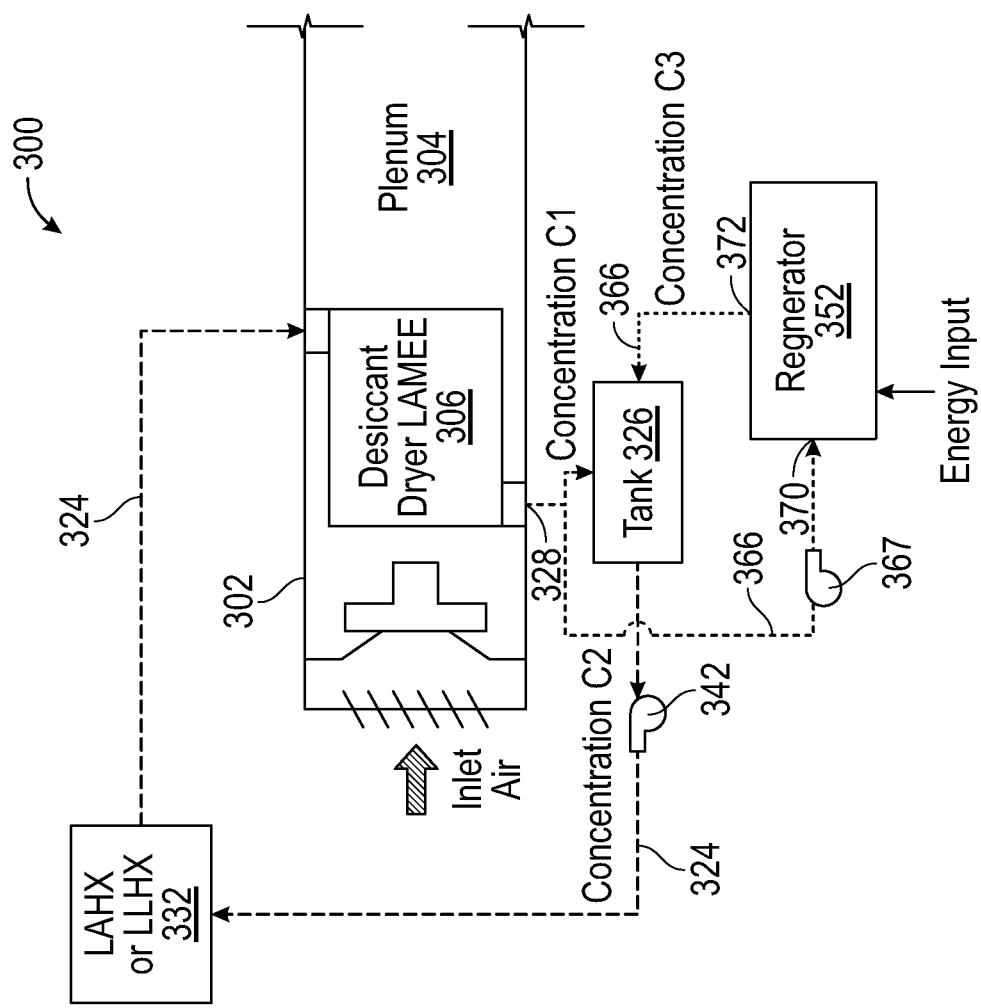
FIG. 6 schematically depicts another example regeneration system for use in a conditioning system.

FIG. 5 shows an exemplary design for the regeneration system 11 in which the dilute desiccant exiting the LAMEE 6 can be mixed with the concentrated desiccant from the regenerator 52, and a portion of the desiccant exiting the tank 26 can be circulated back through the LAMEE 6 and a portion can be regenerated. The valve 68 can control a distribution of the desiccant exiting the tank 26 to the LAMEE 6 and to the regeneration system 11. In other examples, the conditioning system 10 can be configured such that all or a portion of the dilute desiccant exiting the LAMEE 6 can be transported directly to the regenerator 52, rather than mixing the dilute desiccant in the tank 26 with the concentrated desiccant coming back from the regenerator 52. This is shown in FIG. 6 and described below.

A dehumidification capacity of the LAMEE 6 can depend on a flow rate, a temperature, and a concentration of the liquid desiccant passing through the LAMEE 6. In an example, the conditioning system 10 can operate with a set point temperature and a set point concentration of the liquid desiccant at the LAMEE inlet 34; the flow rate of the desiccant through the LAMEE 6 can be generally constant. The load on the LAMEE 6 can vary as the conditions of the air stream passing through the plenum 4 vary. If the air stream increases in humidity, the load on the LAMEE 6 can increase. As a result, the liquid desiccant exiting the LAMEE 6 at the outlet 28 can require more regeneration, relative to if the LAMEE 6 receives a low humidity air stream. The regeneration system 11 can be configured such that as additional regeneration of the desiccant is required, the flow rate of liquid desiccant to the regenerator 52 can be increased via the modulating valve 68. In an example, the modulating valve 68 can be controlled by a system controller 50 that is similar to the system controller 150 described above.

An increase in the flow rate of liquid desiccant to the regenerator 52 can result in an increase in the flow rate of concentrated liquid desiccant back to the tank 26 at the concentration C3. The increased amount of concentrated liquid desiccant can mix with the liquid desiccant in the tank 26 to increase the concentration C2 of the liquid desiccant that is transported back to the LAMEE 6 (after passing through the LAHX or LLHX 32). The flow rate of desiccant to the regenerator 52 can be controlled such that the concentration C2 can be at or near the set point concentration for the LAMEE 6 at the LAMEE inlet 34. In an example, the concentration C2 can vary (up or down) depending, at least in part, on the load of the system (i.e. the outdoor air conditions).

As an alternative or in addition to using a regeneration system, the concentration of the liquid desiccant in the first desiccant circuit 24 can be increased by introducing a concentrated desiccant into the desiccant tank 26. This can be done intermittently as needed or throughout operation of the system 10.

In an example, the flow of liquid desiccant to the LAHX or LLHX 32 can be relatively constant and the flow of liquid desiccant through the modulating valve 68 can be variable. It is recognized that in other examples the flow of liquid desiccant to the LAHX or LLHX 32 can also be variable.

The regenerator 52 can include any type of device capable of separating liquid water from the liquid desiccant. For example, the regenerator 52 can include, but is not limited to, vacuum multi-effect membrane distillation (VMEMD), electro-dialysis, reverse osmosis filtration, a gas boiler with condenser, a vacuum assisted generator, multi-stage flash, membrane distillation, and combinations thereof. The type of energy input to the regenerator 52 can include, for example, electrical power, mechanical power, or heat. The type of energy input depends on the technology used for regeneration of the liquid desiccant. Although the regenerator 52 is shown as a single unit in FIG. 5, the regenerator 52 can represent more than one unit operation. For example, the regeneration system 11 can include a heat recovery unit upstream of the regeneration or separation unit.

The LAHX or LLHX 32 can include any type of device suitable for cooling the liquid desiccant. For example, the LAHX or LLHX 32 can include, but is not limited to, a polymer fluid cooler (with evaporative cooling capability), a plate exchanger, and combinations thereof. In an example, the LAHX or LLHX 32 can provide air cooling to the liquid desiccant, using the outdoor air outside of the conditioning system 10. In another example, the LAHX or LLHX 32 can provide liquid cooling to the liquid desiccant using another cooling fluid. In an example, the LAHX or LLHX 32 can be located external to the process plenum 4 or the other components of the conditioning system 10. In an example, the LAHX or LLHX 32 can be supplemented with an evaporative cooler for use as needed, depending on outdoor air conditions. For example, the LAHX can be supplemented with evaporative cooling sprays such that the tubes can be sprayed with water to enhance the cooling. In an example, an evaporative cooler LAHX 32 can use water recovered from the regeneration system 11 as make up water for the LAHX 32.

The design of the regeneration system 11 in combination with the desiccant dryer LAMEE 6 can facilitate operation of the conditioning system 10 with little to no external water consumption. The LAMEE 6 can remove the water from the air stream and use that water (which is separated from the desiccant for regeneration of the desiccant) as the make up water supply for one or more evaporative coolers in the conditioning system 10. The recovered water can be stored in the tank 36 and can be used as needed. Operation of evaporative coolers, like the DEC 8, can commonly require a significant amount of water. The conditioning system 10 having the regeneration system 11 can eliminate or markedly decrease the external water needed to operate the system 10. In an example, the system 10 can be generally water neutral. In an example, the system 10 can include an external water supply as back up in the event that additional water is needed.

In an example, the LAHX or LLHX 32 may require make up water in an example in which the LAHX or LLHX 32 includes evaporative cooling for use as needed. The evaporative cooling can be utilized when the outdoor air is at high dry bulb temperatures and air cooling of the liquid desiccant is not sufficient to meet a set point temperature for the desiccant delivered to the LAMEE 6. It is recognized that the recovered water from the regenerator system 11 can be sufficient in some cases to provide the make up water requirements for the DEC 8, as well as an evaporative cooler LAHX 32.

The design of the regeneration system 11 in combination with the desiccant dryer LAMEE 6 can also improve operation of the DEC 8 since water can be collected directly from the atmosphere. As such, the water recovered from the liquid desiccant in the regenerator 52 can be high quality water, which can be ideal for many cooling applications, including evaporative coolers. Such high quality water can increase the lifespan of the media in the DEC 8 and can decrease required maintenance on the cooler. In contrast, if the water supplied to the DEC 8 is potable water from wells or surface water sources, in some cases, mineral build up or scaling can occur, which may require the system 10 to include management of mineral concentrations or other water treatment units. In summary, the design described herein can reduce or eliminate overall water consumption of the conditioning system 10, as well as improve operation of the evaporative cooler 8.

FIG. 6 shows an example conditioning system 300 that can be similar to the conditioning systems 10, 100 and 200 but can include an alternative design for the fluid circuits for regeneration. Only a portion of the system 300 is shown in FIG. 6 for simplicity and it is recognized that additional components can be included. For example, only a portion of a system cabinet 302 and plenum 304 is shown in FIG. 6, but it is recognized that the plenum 304 can include some or all of the additional components shown and described above in reference to FIGS. 1, 3 and 5.

The desiccant dryer LAMEE 306 can operate similar to the desiccant dryer LAMEEs described above. The dilute desiccant exiting the desiccant dryer LAMEE 306 at an outlet 328 can be split into two flow paths—a first flow path to a tank 326 or a second flow path directly to a regenerator 352 (via a desiccant circuit 366). The regenerator 352 can operate similar to the regenerators described above. The desiccant entering the regenerator 352 at an inlet 370 can be at a first concentration C1. The concentrated desiccant exiting the regenerator 352 at an outlet 372 can be at a third concentration C3 and can be transported to the tank 326 for mixing with the desiccant already in the tank 326. As such, the desiccant in the tank 326 can be at a second concentration C2 that is greater than the first concentration C1 and less than the third concentration C3.

In contrast to the designs shown in FIGS. 1, 3 and 5, instead of the dilute desiccant (at the concentration C1) mixing with the desiccant in the tank and then flowing to the regenerator (at the second concentration C2), the dilute desiccant exiting the LAMEE 306 in FIG. 6 is transported directly to the regenerator 352 at the first concentration C1 (via a pump 367). All of the desiccant exiting the tank 326 at the second concentration C2 is circulated through the heat exchanger 332 and back through the LAMEE 306, rather than selectively directing a portion of the desiccant at the second concentration C2 to the regenerator 352. Thus in the design of FIG. 6 the split of the desiccant flow path is at the outlet 328 of the LAMEE 306, rather than at an outlet of the tank 326.

The pump 367 is shown in the desiccant circuit 366 and is an example of a device for regulating or controlling a flow of the dilute desiccant to the regenerator 352. As described above in reference to the other example conditioning systems, in an example, generally during operation of the system only a portion of the dilute desiccant exiting the LAMEE 306 is sent to the regenerator 352. The amount of desiccant transported to the regenerator 352 can be variable and a percentage of the desiccant at the outlet 328 can be directed to the regenerator and a remaining percentage of the desiccant at the outlet 328 can be directed to the tank 326. Such percentages can depend in part on a load of the conditioning system 300.

Figure 7:
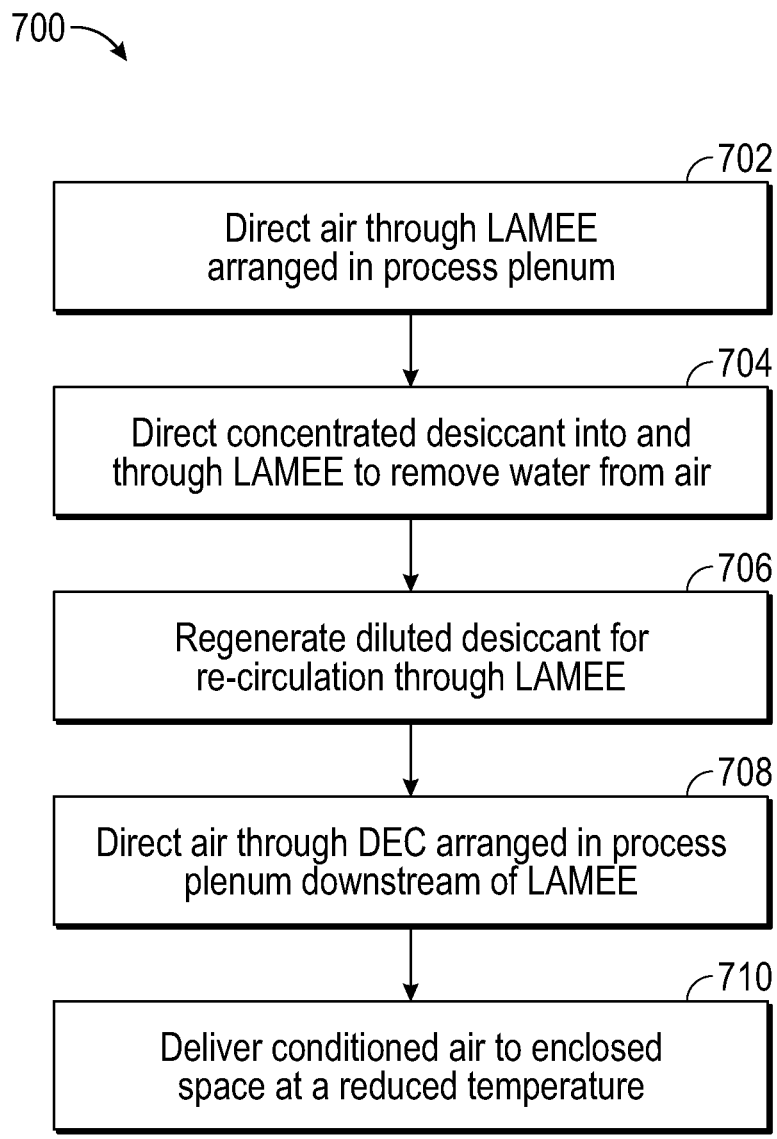
FIG. 7 is a flowchart depicting a method of operating a conditioning system in accordance with this disclosure.

FIG. 7 illustrates an example method 700 for conditioning air for delivery to an enclosed space according to the example systems described above. The method 700 can include at 702 directing air through a desiccant dryer LAMEE arranged in a process plenum and at 704 directing a concentrated desiccant into and through the LAMEE to remove moisture from the air. The air can be outdoor air, hot supply air from the enclosed space, or a combination thereof. The method 700 can include at 706 regenerating the diluted desiccant exiting the LAMEE before recirculating the desiccant back through the LAMEE. The method 700 can include at 708 directing the air through a DEC arranged in the process plenum downstream of the LAMEE and at 710 delivering the conditioned air to the enclosed space at a reduced temperature.

It is recognized that the method 700 for conditioning the air can include other steps not included in FIG. 7. Such other steps can include, but are not limited to, directing air through a pre-cooler arranged in the process plenum downstream of the LAMEE and upstream of the DEC, utilizing water removed from the desiccant in the regenerating steam as make up water for the DEC or other components in the system. In an example, directing air through the LAMEE in 702 can include mixing process air with outdoor air upstream of the LAMEE to create a mixed air stream that passes through the process plenum. In an example, the method 700 can include removing a portion of the air in the mixed stream, at a location downstream of a pre-cooler and upstream of the DEC, to create an exhaust air stream and utilizing the exhaust air stream to cool the cooling fluid circulating through the pre-cooler.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The present application provides for the following exemplary embodiments or examples, the numbering of which is not to be construed as designating levels of importance:

Example 1 provides a system for conditioning air for an enclosed space. The system can include a process plenum having a plenum inlet and outlet, the process plenum configured to direct air in an air flow path from the plenum inlet to the plenum outlet. The system can further include a liquid-to-air membrane energy exchanger (LAMEE) arranged inside the process plenum, the LAMEE comprising a desiccant flow path separated from the air flow path by a membrane, the LAMEE configured to circulate a desiccant through the desiccant flow path and remove water from the air in the air flow path. A moisture content of the air at a LAMEE outlet can be lower than a moisture content of the air at a LAMEE inlet. The system can further include a direct evaporative cooler (DEC) arranged inside the process plenum downstream of the LAMEE, the DEC configured to evaporatively cool the air. A temperature of the air at a DEC outlet can be lower than a temperature of the air at a DEC inlet.

Example 2 provides the system of Example 1 optionally configured such that the LAMEE is a first liquid-to-air membrane energy exchanger (LAMEE1) and the DEC is a second liquid-to-air membrane energy exchanger (LAMEE2).

Example 3 provides the system of Example 2 optionally configured such that water removed from the air by the desiccant in the LAMEE1 is transported to the LAMEE2 and used to supply at least a portion of the make up water required for operation of the LAMEE2.

Example 4 provides the system of Example 1 optionally configured such that the DEC is a direct-contact DEC.

Example 5 provides the system of Example 4 optionally configured such that the direct-contact DEC includes at least one of wetted-media and a spray atomizer.

Example 6 provides the system of any of Examples 1-5 optionally further comprising a heat exchanger configured to cool the desiccant prior to recirculating the desiccant through the desiccant flow path of the LAMEE.

Example 7 provides the system of Example 6 optionally configured such that the heat exchanger is external to the process plenum.

Example 8 provides the system of Example 6 or 7 optionally configured such that the heat exchanger is a polymer fluid cooler.

Example 9 provides the system of any of Examples 6-8 optionally configured such that the heat exchanger is a liquid to air heat exchanger (LAHX) that uses outdoor air to cool the desiccant.

Example 10 provides the system of Example 6 or 7 optionally configured such that the heat exchanger is a liquid to liquid heat exchanger (LLHX).

Example 11 provides the system of any of Examples 1-10 optionally further comprising a regeneration system configured to increase a concentration of at least a portion of the desiccant exiting the LAMEE.

Example 12 provides the system of Example 11 optionally configured such that the regeneration system comprises a regeneration unit in fluid connection with the LAMEE. The regeneration unit is configured to receive a desiccant stream and separate water from the desiccant. A first output stream of the regeneration unit is concentrated desiccant and a second output stream of the regeneration unit is distilled water.

Example 13 provides the system of Example 12 optionally configured such that the second output stream is used as make up water for operation of the DEC.

Example 14 provides the system of Example 12 or 13 optionally configured such that the first output stream is transported to a desiccant tank configured to receive the first output stream and the desiccant exiting the LAMEE.

Example 15 provides the system of Example 14 optionally configured such that a desiccant output stream exiting the desiccant tank is transported to at least one of the regeneration unit and a heat exchanger configured to reduce a temperature of the desiccant before the desiccant circulates through the LAMEE.

Example 16 provides the system of Example 15 optionally further comprising a modulating valve configured to control a distribution of desiccant from the desiccant tank to the heat exchanger and the regeneration unit.

Example 17 provides the system of any of Examples 1-16 optionally configured such that the LAMEE is configured such that the desiccant circulating through the desiccant flow path removes heat from the air to reduce a temperature of the air.

Example 18 provides the system of any of Examples 1-17 optionally configured such that the process plenum is configured to receive hot process air from an enclosed space and condition the process air such that reduced-temperature air can be returned to the enclosed space.

Example 19 provides the system of any of Examples 1-17 optionally configured such that the process plenum is configured to receive outdoor air and condition the outdoor air such that reduced-temperature air can be delivered to the enclosed space.

Example 20 provides the system of any of Examples 1-17 optionally configured such that the process plenum is configured to receive outdoor air that mixes with process air in the air flow path, and wherein the process air is from the enclosed space.

Example 21 provides the system of any of Examples 1-20 optionally further comprising a pre-cooler arranged between the LAMEE and the DEC and configured to reduce a temperature of the air passing through the pre-cooler.

Example 22 provides the system of any of Examples 1-21 optionally configured such that the system operates at or near atmospheric pressure.

Example 23 provides a system for conditioning air for an enclosed space and the system can include a process plenum configured to direct air from a process inlet to a process outlet, the process inlet receiving air at a first temperature and the process outlet supplying air to the space at a second temperature that is lower than the first temperature. The system can further include a first liquid-to-air membrane energy exchanger (LAMEE1) arranged inside the process plenum, the LAMEE1 configured to use a liquid desiccant flowing through the LAMEE1 to reduce the humidity of the air, a first concentration of water in the liquid desiccant at a fluid inlet of the LAMEE1 being lower than a second concentration of water in the liquid desiccant at a fluid outlet of the LAMEE1. The system can further include a second LAMEE (LAMEE2) arranged inside the process plenum downstream of the LAMEE1, the LAMEE2 configured to use water flowing there through to evaporatively cool the air, a temperature of the air at an air outlet of the LAMEE2 being lower than a temperature of the air at an air inlet of the LAMEE2.

Example 24 provides the system of Example 23 optionally configured such that at least a portion of the water flowing through the LAMEE2 is water removed from the air by the liquid desiccant in the LAMEE1.

Example 25 provides the system of Example 24 optionally configured such that a quantity of the water removed from the air by the liquid desiccant in the LAMEE1 is sufficient as the make-up water for operation of the LAMEE2.

Example 26 provides the system of any of Examples 23-25 optionally configured such that the LAMEE1 is configured to use the liquid desiccant flowing through the LAMEE1 to remove heat from the air, a temperature of the desiccant at a desiccant outlet of the LAMEE1 being higher than a temperature of the desiccant at a desiccant inlet of the LAMEE1.

Example 27 provides the system of any of Examples 23-26 optionally further comprising a regenerator system in fluid connection with a desiccant flow path through the LAMEE1, the regenerator system configured to increase a concentration of the liquid desiccant at the fluid inlet of the LAMEE1 relative to the fluid outlet of the LAMEE1.

Example 28 provides the system of Example 27 optionally configured such that the regenerator system comprises a regeneration unit configured to receive a desiccant stream at an inlet of the regeneration unit and separate the desiccant and water in the desiccant stream, wherein a first outlet of the regeneration unit includes a concentrated desiccant stream and a second outlet of the regeneration unit includes a distilled water stream.

Example 29 provides the system of Example 28 optionally configured such that the distilled water stream is in fluid connection with the LAMEE2.

Example 30 provides the system of Example 28 or 29 optionally configured such that the concentrated desiccant stream is transported to a desiccant storage tank configured to receive the desiccant exiting the LAMEE1, and the concentrated desiccant stream mixes with the desiccant exiting the LAMEE1.

Example 31 provides the system of Example 30 optionally configured such that a desiccant output stream exiting the desiccant storage tank is delivered to at least one of the LAMEE1 and the regeneration unit.

Example 32 provides the system of Example 31 optionally configured such that a modulating valve in the desiccant stream controls a distribution of the desiccant in the desiccant output stream to the LAMEE1 and to the regeneration unit.

Example 33 provides the system of any of Examples 23-32 optionally further comprising a make-up air unit configured to provide replenishment air to the enclosed space.

Example 34 provides the system of any of Examples 23-33 optionally further comprising a liquid-to-air heat exchanger LAHX arranged between the LAMEE1 and the LAMEE2, the LAHX configured to reduce a temperature of the air flowing there through.

Example 35 provides the system of Example 34 optionally configured such that a first portion of the air exiting the LAHX is configured to flow through the LAMEE2 and a second portion of the air exiting the LAHX is configured to flow through a third liquid-to-air membrane energy exchanger (LAMEE3) arranged inside an exhaust plenum in fluid connection with the process plenum.

Example 36 provides the system of Example 35 optionally configured such that a volume of air in the second portion is less than a volume of air in the first portion.

Example 37 provides the system of Example 35 or 36 optionally configured such that a cooling liquid circulating through the LAHX is in fluid connection with the LAMEE3, wherein the cooling liquid exits the LAHX and passes through the LAMEE3, and wherein the air from the exhaust plenum cools the cooling liquid in the LAMEE prior to recirculating the cooling liquid through the LAHX.

Example 38 provides the system of any of Examples 23-37 optionally configured such that the process plenum receives outdoor air at the process inlet, and the outdoor air mixes with process air from the enclosed space prior to passing through the LAMEE1.

Example 39 provides the system of any of Examples 23-38 optionally further comprising a heat exchanger configured to cool the liquid desiccant prior to flowing the liquid desiccant through the LAMEE1, wherein the heat exchanger is a liquid-to-air heat exchanger or a liquid-to-liquid heat exchanger.

Example 40 provides the system of Example 39 optionally configured such that the heat exchanger is located external to the process plenum.

Example 41 provides a method of conditioning air for an enclosed space. The method can include directing air through a process plenum having a plenum inlet and outlet, directing the air through a liquid-to-air energy exchanger (LAMEE) arranged inside the plenum, and directing a desiccant through the LAMEE. The desiccant and air are separated by a membrane of the LAMEE, the LAMEE configured to remove water from the air using the desiccant, a first concentration of water in the desiccant being lower at a LAMEE inlet compared to a second concentration of water in the desiccant at a LAMEE outlet. A first moisture content of the air is higher at a LAMEE inlet compared to a second moisture content of the air at a LAMEE outlet. The method can further include directing the air through a direct evaporative cooler (DEC) arranged inside the process plenum downstream of the LAMEE, to cool the air, and delivering the air to the enclosed space. The air enters the plenum inlet at a first temperature and exits the plenum outlet at a second temperature lower than the first temperature.

Example 42 provides the method of Example 41 optionally configured such that the LAMEE is configured to remove heat from the air using the desiccant as the desiccant and the air are directed through the LAMEE, and wherein a temperature of the desiccant at the LAMEE outlet is higher than a temperature of the desiccant at the LAMEE inlet.

Example 43 provides the method of Example 41 or 42 optionally configured such that directing the air through a DEC comprises directing the air through an evaporative cooler LAMEE configured to adiabatically cool the air.

Example 44 provides the method of Example 41 or 42 optionally configured such that directing the air through a DEC comprises directing the air through a direct-contact DEC configured to cool the air through direct contact of an evaporative fluid with the air.

Example 45 provides the method of any of Examples 41-44 optionally further comprising directing the air through a pre-cooler arranged inside the process plenum downstream of the LAMEE and upstream of the DEC.

Example 46 provides the method of Example 45 optionally configured such that the pre-cooler is a cooling coil. The method can optionally further comprise directing a portion of the air exiting the pre-cooler into an exhaust plenum and through a second LAMEE arranged inside the exhaust plenum, and directing water exiting the cooling coil through the second LAMEE. The second LAMEE can be configured to cool the water using the air, the water at an outlet of the second LAMEE at a reduced temperature relative to the water at an inlet of the second LAMEE. The method can optionally further comprise recirculating the water to the cooling coil.

Example 47 provides the method of any of Examples 41-46 optionally further comprising regenerating at least a portion of the desiccant exiting the LAMEE.

Example 48 provides the method of Example 47 optionally configured such that regenerating at least a portion of the desiccant comprises transporting the dilute desiccant exiting the LAMEE to a desiccant storage tank, and transporting a portion of the desiccant from the desiccant storage tank to a regeneration unit.

Example 49 provides the method of Example 48 optionally further comprising separating at least a portion of the water from the desiccant by directing the desiccant through the regeneration unit, wherein a first output stream of the regeneration unit is concentrated desiccant and a second output stream of the regeneration unit is distilled water.

Example 50 provides the method of Example 49 optionally further comprising transporting at least a portion of the distilled water in the second output stream to the DEC to provide at least a portion of make-up water for operation of the DEC.

Example 51 provides the method of Example 49 or 50 optionally further comprising transporting a portion of the distilled water in the second output stream to a fluid circuit that includes a pre-cooler and an exhaust cooler and utilizing the distilled water as make-up water in the fluid circuit. The pre-cooler is arranged inside the process plenum downstream of the LAMEE and upstream of the DEC, and the exhaust cooler is an evaporative cooler configured to cool increased-temperature water exiting the pre-cooler.

Example 52 provides the method of any of Examples 49-51 optionally further comprising transporting the concentrated desiccant in the first output stream to the desiccant storage tank and mixing the concentrated desiccant with the dilute desiccant from the LAMEE. A concentration of the desiccant inside the desiccant storage tank has a desiccant concentration higher than the dilute desiccant and lower than the concentrated desiccant.

Example 53 provides the method of Example 48 optionally further comprising transporting a portion of the desiccant from the desiccant storage tank to the LAMEE for recirculation of the desiccant through the LAMEE.

Example 54 provides the method of Example 53 optionally further comprising directing the desiccant through a heat exchanger upstream of the LAMEE to cool the desiccant prior to recirculation of the desiccant through the LAMEE.

Example 55 provides the method of Example 53 or 54 optionally further comprising controlling a volume distribution of desiccant transported from the desiccant storage tank to the LAMEE and to the regeneration unit.

Example 56 provides the method of Example 55 optionally configured such that controlling the volume distribution of desiccant to the LAMEE and to the regeneration unit comprises using a modulating valve located in a desiccant output stream of the desiccant storage tank.

Example 57 provides a system or method of any one or any combination of Examples 1-56, which can be optionally configured such that all steps or elements recited are available to use or select from.

Various aspects of the disclosure have been described. These and other aspects are within the scope of the following claims.

What is claimed is:
1. A system for conditioning air for an enclosed space, the system comprising:
a process plenum having a plenum inlet and outlet, the process plenum configured to direct air in an air flow path from the plenum inlet to the plenum outlet;
a liquid-to-air membrane energy exchanger (LAMEE) arranged inside the process plenum, the LAMEE comprising a desiccant flow path separated from the air flow path by a membrane, the LAMEE configured to circulate a desiccant through the desiccant flow path and remove heat and water from the air in the air flow path, a moisture content of the air at a LAMEE outlet being lower than a moisture content of the air at a LAMEE inlet; and a direct evaporative cooler (DEC) arranged inside the process plenum downstream of the LAMEE, the DEC configured to evaporatively cool the air, a temperature of the air at a DEC outlet being lower than a temperature of the air at a DEC inlet.

2. The system of claim 1 wherein the LAMEE is a first liquid-to-air membrane energy exchanger (LAMEE1) and the DEC is a second liquid-to-air membrane energy exchanger (LAMEE2).

3. The system of claim 2 wherein water removed from the air by the desiccant in the LAMEE1 is transported to the LAMEE2 and used to supply at least a portion of the make up water required for operation of the LAMEE2.

4. The system of claim 1 further comprising a heat exchanger configured to cool the desiccant prior to recirculating the desiccant through the desiccant flow path of the LAMEE.

5. The system of claim 4 wherein the heat exchanger is external to the process plenum.

6. The system of claim 4 wherein the heat exchanger is a polymer fluid cooler.

7. The system of claim 4 wherein the heat exchanger is a liquid to air heat exchanger (LAHX) that uses outdoor air to cool the desiccant.

8. The system of claim 4 wherein the heat exchanger is a liquid to liquid heat exchanger (LLHX).

9. The system of claim 1 further comprising:
a regeneration system configured to increase a concentration of at least a portion of the desiccant exiting the LAMEE.

10. The system of claim 9 wherein the regeneration system comprises a regeneration unit in fluid connection with the LAMEE, wherein the regeneration unit is configured to receive a desiccant stream and separate water from the desiccant, and wherein a first output stream of the regeneration unit is concentrated desiccant and a second output stream of the regeneration unit is distilled water.

11. The system of claim 10 wherein the second output stream is used as make up water for operation of the DEC.

12. The system of claim 10 wherein the first output stream is transported to a desiccant tank configured to receive the first output stream and the desiccant exiting the LAMEE.

13. The system of claim 12 wherein a desiccant output stream exiting the desiccant tank is transported to at least one of the regeneration unit and a heat exchanger configured to reduce a temperature of the desiccant before the desiccant circulates through the LAMEE.

14. The system of claim 13 further comprising a modulating valve configured to control a distribution of desiccant from the desiccant tank to the heat exchanger and the regeneration unit.

15. The system of claim 1 further comprising a pre-cooler arranged between the LAMEE and the DEC and configured to reduce a temperature of the air passing through the pre-cooler.

16. A system for conditioning air for an enclosed space, the system comprising:
a process plenum configured to direct air from a process inlet to a process outlet, the process inlet receiving air at a first temperature and the process outlet supplying air to the space at a second temperature that is lower than the first temperature;

a first liquid-to-air membrane energy exchanger (LAMEE1) arranged inside the process plenum, the LAMEE1 comprising a first permeable membrane and configured to use a liquid desiccant flowing through the LAMEE1 to reduce the humidity of the air, a first concentration of water in the liquid desiccant at a fluid inlet of the LAMEE1 being lower than a second concentration of water in the liquid desiccant at a fluid outlet of the LAMEE1; and a second LAMEE (LAMEE2) arranged inside the process plenum downstream of the LAMEE1, the LAMEE2 comprising a second permeable membrane and configured to use water flowing through the LAMEE2 to evaporatively cool the air, a temperature of the air at an air outlet of the LAMEE2 being lower than a temperature of the air at an air inlet of the LAMEE2.

17. The system of claim 16 wherein at least a portion of the water flowing through the LAMEE2 is water removed from the air by the liquid desiccant in the LAMEE1.

18. The system of claim 16 wherein the LAMEE1 is configured to use the liquid desiccant flowing through the LAMEE1 to remove heat from the air, a temperature of the desiccant at a desiccant outlet of the LAMEE1 being higher than a temperature of the desiccant at a desiccant inlet of the LAMEE1.

19. The system of claim 16 further comprising a regenerator system in fluid connection with a desiccant flow path through the LAMEE1, the regenerator system configured to increase a concentration of the liquid desiccant at the fluid inlet of the LAMEE1 relative to the fluid outlet of the LAMEE1.

20. The system of claim 16 further comprising:
a make-up air unit configured to provide replenishment air to the enclosed space.

21. The system of claim 16 further comprising a liquid-to-air heat exchanger (LAHX) arranged between the LAMEE1 and the LAMEE2, the LAHX configured to reduce a temperature of the air flowing there through.

22. The system of claim 21 wherein a first portion of the air exiting the LAHX is configured to flow through the LAMEE2 and a second portion of the air exiting the LAHX is configured to flow through a third liquid-to-air membrane energy exchanger (LAMEE3) arranged inside an exhaust plenum in fluid connection with the process plenum.

23. A method of conditioning air for an enclosed space, the method comprising:
directing air through a process plenum having a plenum inlet and outlet, the air entering the plenum inlet at a first temperature;

directing the air through a liquid-to-air energy exchanger (LAMEE) arranged inside the plenum, a first moisture content of the air being higher at a LAMEE inlet compared to a second moisture content of the air at a LAMEE outlet;

directing a desiccant through the LAMEE, the desiccant and air separated by a membrane of the LAMEE, the LAMEE configured to remove heat and water from the air using the desiccant, a first concentration of water in the desiccant being lower at a LAMEE inlet compared to a second concentration of water in the desiccant at a LAMEE outlet, the desiccant at the LAMEE outlet being a dilute desiccant;

directing the air through a direct evaporative cooler (DEC) arranged inside the process plenum downstream of the LAMEE to cool the air; and delivering the air to the enclosed space, the air exiting the plenum outlet at a second temperature lower than the first temperature.

\* \* \* \* \*